US009106362B2

(12) United States Patent
Matsumoto et al.

(10) Patent No.: US 9,106,362 B2

(45) Date of Patent: Aug. 11, 2015

(54) OPTICAL UNIT FOR WAVELENGTH SELECTING SWITCH AND WAVELENGTH SELECTING SWITCH

(71) Applicant: JDS Uniphase Corporation, Milpitas, CA (US)

(72) Inventors: Koji Matsumoto, Tokyo (JP); Toshiro Okamura, Tokyo (JP); Satoshi Watanabe, Tokyo (JP); Takeshi Yamazaki, Tokyo (JP)

(73) Assignee: JDS Uniphase Corporation, Milpitas, CA (US)

( * ) Notice: Subject to any disclaimer, the term of this patent is extended or adjusted under 35 U.S.C. 154(b) by 0 days.

(21) Appl. No.: 14/015,377

(22) Filed: Aug. 30, 2013

(65) Prior Publication Data

US 2014/0037288 A1 Feb. 6, 2014

Related U.S. Application Data

(63) Continuation of application No. PCT/JP2012/001323, filed on Feb. 27, 2012.

(30) Foreign Application Priority Data

Mar. 2, 2011 (JP) ................................ 2011-045713
Mar. 24, 2011 (JP) ................................ 2011-066160
Mar. 24, 2011 (JP) ................................ 2011-066541

(51) Int. Cl.
*G02B 6/35* (2006.01)
*H04J 14/02* (2006.01)

(52) U.S. Cl.
CPC ............... *H04J 14/02* (2013.01); *G02B 6/3504* (2013.01)

(58) Field of Classification Search
CPC ..... G02B 6/3518; G02B 6/356; G02B 6/3548
See application file for complete search history.

(56) References Cited

U.S. PATENT DOCUMENTS 7,630,599 B2 12/2009 McLaughlin et al.
7,720,329 B2 * 5/2010 Presley et al. .................. 385/18
7,769,255 B2 * 8/2010 Nagy et al. ...................... 385/18
7,808,705 B2 * 10/2010 Kobayashi et al. ........... 359/618
8,036,502 B2 * 10/2011 Duricic et al. .................. 385/16
2009/0154876 A1 6/2009 McLaughlin et al.

FOREIGN PATENT DOCUMENTS

JP 2000-181377 A 6/2000
JP 2001-141971 A 5/2001

(Continued)

OTHER PUBLICATIONS

International Search Report dated May 29, 2012 issued in PCT/JP2012/001323.

*Primary Examiner* — Omar R Rojas

(74) *Attorney, Agent, or Firm* — Matthew A. Pequignot; Pequignot + Myers LLC

(57) ABSTRACT

An optical unit for a wavelength-selecting switch according to the present invention comprises: an input port; a dispersion section that produces wavelength dispersion of input light that is input from the input port; a light-collecting element that collects the light dispersed by the dispersion section; an output port; an optical path correction section that shifts the light that is dispersed by the dispersion section; an adjustment section that changes the amount of shift produced by the optical path correction section; and a casing that hermetically seals the input port, dispersion section, light-collecting element, output port, and optical path correction section. The casing has an optically transparent section in a location onto which the light that is collected by the light-collecting element is directed. The adjustment section is arranged outside the casing. The optical path correction section can be controlled from outside the casing by the adjustment section.

10 Claims, 36 Drawing Sheets

(56) References Cited

FOREIGN PATENT DOCUMENTS

| | | | |
|---|---|---|---|
| JP | 2007-101670 | A | 4/2007 |
| JP | 2008-164630 | A | 7/2008 |
| JP | 2008-310244 | A | 12/2008 |
| JP | 2009-134294 | A | 6/2009 |
| JP | 2009-145887 | A | 7/2009 |
| WO | WO 2010/001734 | A1 | 1/2010 |

* cited by examiner

ADJUSTING PORTION
121
109
110
111
113a
116
117
122
113b
112
113c
100
114
115
118
X
Y
a
b 209
221
ADJUSTING PORTION
210
211
213a
215
214
X
Y
213b
217
212b
212C
212a
200
218
a
b 200
201
209
210
210a
210b
211
213a
214
213b
212a
118
220
215
219
X
Z 409
410
411
413a
416
a
b
413b
412
413c
400
414
415
418
X
Y 560d
570
570c
552
560
562
563
550
560g
551a
540
560b
560e
562
530
531
560f
521a
521b
521c
521d
521e
520
511
510
510a
510b
510c
510d
510e
570a
560c
Z
Y
X 560
560d
560e
561
562
551e
551d
551c
552
551b
551a
550
570
540
570c
560a
570b
531
570a
512
520
530
511
510
560c
560f
Z
X
Y 560
560d
570
570c
560h
552
563
562
550
580
551a
540
560b
560e
562
531
530
560f
521a
521b
521c
521d
521e
520
511
510
510a
510b
510c
510d
510e
570a
560c
Z
Y
X 560
560d
552
561
562
550
560e
580
570
540
562
561
570c
560a
570b
531
570a
512
520
530
511
510
560c
560f
Z
X
Y 560d
571
571a
581
551a
550
540
560b
560
531
533
530
531
562
570
560f
540
560e
F
571
571b
570d
562
541
521a
521b
521c
520
521e
510a
521d
511
510b
560c
510
510c
510d
510e 560
560d
560a
560e
560c
560f
533
570e
531
530
562
561
570d
540
570
581
571a
F
571b
571
541
520
510
512
511

560
560d
560a
533
570e
531
530
562
561
570d
540
560e
570
562
581
561
572b
572a
541
520
510
560c
572
512
511
560f 601
610
610a
610b
610c
610d
610e
611
612
613
614
615
616
617
618
O
Y1
Y2
f1
f3
f3
f4
f4
Sf
Sm
y
z f4
f4
618a 618b 618c 618d 618e
617
616
615
614
613
612
611
610
x
z 601
615
623
623a
622b
622
622a
Li
Ln
621
Ls
618
619
617
613
612
611
610
x
z 623a
623
622e
622
622d
$\phi_3$ ($\lambda_2$)
$\phi_4$ ($\lambda_2$)
$\theta_{10}$ ($\lambda_3$)
$\theta_{10}$ ($\lambda_2$)
$\phi_5$ ($\lambda_2$)
$\phi_1$ ($\lambda_2$)
$\phi_6$ ($\lambda_2$)
$\theta_{10}$ ($\lambda_1$)
$\phi_2$ ($\lambda_2$)
$L_i$
$L_{n1}$
$L_{n2}$
$L_{s1}$
$L_{s2}$
$L_{s3}$ 633
632
632b
632a
634
β
α
γ
L i
θ14(λ2)
θ12(λ2)
θ13(λ2)
θ17(λ2)
θ15(λ2)
θ16(λ2)
θ11(λ2)
θ18(λ2)
φ7(λ2)
Ls1
Ls2
Ln
Ls3

1100
1110
1111
1112
1113
1117
1118
1121
1122
1123
1123a
X
Z

OPTICAL UNIT FOR WAVELENGTH SELECTING SWITCH AND WAVELENGTH SELECTING SWITCH

CROSS-REFERENCE TO RELATED APPLICATIONS

The present application is a Continuing Application based on International Application PCT/JP2012/001323 filed on Feb. 27, 2012, which in turn, claims the benefit of priority from the prior Japanese Patent Application No. 2011-045713 filed on Mar. 2, 2011, Japanese Patent Application No. 2011-066160 filed on Mar. 24, 2011, and Japanese Patent Application No. 2011-066541 filed on Mar. 24, 2011, the entire contents of which are incorporated herein by reference.

TECHNICAL FIELD

The present invention relates to an optical unit for a wavelength selecting switch and the wavelength selecting switch.

The wave length selecting switch has a function of dispersing light on the basis of a frequency so as to output. The wavelength selecting switch is provided, for example, in a node which connects ring networks, and a metro network is constructed by connecting a plurality of ring networks. At this time, the wavelength selecting switch operates so as to switch a route of the incident light from an optical fiber constructing the ring network on the basis of the frequency.

BACKGROUND ART

Conventionally, as the wavelength selecting switch, there has been proposed a wavelength selecting switch in which a dispersive element, a plurality of optical parts, and a micro electro mechanical systems (MEMS) array (a mirror array) are accommodated in a state of being sealed in an internal portion of a casing (for example, refer to patent document 1). In the wavelength selecting switch mentioned above, if a light path is appropriately adjusted so as to be fixed and the casing is sealed in a manufacturing stage, fluctuation of refraction factor due to change of air pressure can be avoided, and the light path within the casing is appropriately maintained.

FIG. 26 is an exploded perspective view showing an outline structure of a wavelength selecting switch disclosed in patent document 1. In the wavelength selecting switch, various optical parts constructing an optical system of the wavelength selecting switch are mounted to a flat optical bench 1000. Further, a casing 1001 is hermetically sealed by fixing the optical bench 1000 to which the optical system is mounted, to a bottom portion within the casing 1001, and covering an upper opening portion of the casing 1001 by a lid 1002.

Further, the wavelength selecting switch generally employs an apparatus which is provided with at least one input port, at least one output port, a dispersing portion, a converging portion and a deflecting portion. In this apparatus, the wavelength multiplexed light input into the wavelength selecting switch from one optical fiber of the input port is dispersed per wavelength by the dispersion portion such as a diffraction grating, and is converged into a different mirror element in the deflecting portion such as the MEMS mirror array. The light converged into each of the mirror elements is deflected and output in a predetermined output port direction per wavelength by controlling each of the mirror elements to a predetermined angle. Generally, the mirror array is constructed by mirror elements which are arranged in one line in a direction of x axis on a plane which is approximately vertical to the incident light. A light flux wavelength dispersed in the direction of x axis is incident on the mirror element. A wavelength of the light coming to a center of each of the mirror elements is preferably close to a predetermined value which is defined by a standard.

Further, as the dispersing portion, there has been various structures for obtaining a great dispersion by a reduced number of optical parts. For example, in a wavelength selecting switch having a dispersion portion of so-called Littman-Metcalf configuration in which the diffraction grating and the mirror are arranged in a mutually inclined manner, a great dispersing effect is obtained by converting the wavelength multiplexed light into parallel light by the lens or the mirror so as to enter into the diffraction grating, temporarily bringing the light dispersed by the diffraction grating to the mirror so as to be reflected, and thereafter again entering into the diffraction grating (for example, refer to patent document 2).

Patent Document 1: JP-A-2009-145887

Patent Document 2: U.S. Pat. No. 7,630,599

SUMMARY OF THE INVENTION

In the case that the mirror array is bonded and fixed to the casing, there is a risk that a position of the mirror array is displaced about 10 μm entirely at a coagulating time of a pressure sensitive adhesive. Further, since the deflecting portion such as the mirror array provided in the wavelength selecting switch is structured movable, the deflecting portion has a higher risk of damage and failure in comparison with the other optical elements provided in the inner portion of the casing of the wavelength selecting switch. Therefore, in design of the wavelength selecting switch, it is thinkable to facilitate replacement and repair at a time of the damage and the failure, as the structure which is provided with the mirror array in the outer portion of the casing. Further, it is thinkable to design the other optical systems than the mirror array as an optical unit for the wavelength selecting switch hermetically embedded in the casing, and detachably mount the mirror array to the optical unit for the wavelength selecting switch, thereby serving as the wavelength selecting switch.

In the structure mentioned above, the disperse element, a plurality of optical parts and the mirror array are not sealed in one casing in a state of being appropriately light path adjusted at the manufacturing time, as is different from the wavelength selecting switch described in the patent document 1. In other words, the wavelength selecting switch mentioned above is structured such that the dispersion portion and the optical system for converging are sealed in the casing, and the mirror array is attached to the outer portion of the casing. Therefore, in the wavelength selecting switch mentioned above, it is desired to adjust the dispersing portion and the optical system for converging (hereinafter, the dispersing portion is called as "optical system in casing" in conjunction with the optical system for converging) which are sealed in the casing, in relation to the mirror array which is provided in the outer portion of the casing.

It is preferable to provide a wavelength selecting switch which can solve the problem mentioned above and can adjust the light path of the optical system in the casing of the wavelength selecting switch from the outer portion of the casing.

Further, it is necessary for the wavelength selecting switch to compensate a stable operation in temperature and humidity ranges of the specification. Accordingly, it is important to precisely arrange various optical parts constructing the optical system in the optical bench 1000. However, if the optical bench 1000 is thin, distortion or deformation is generated in the optical bench 1000 by attachment of the optical parts, and it becomes hard to arrange the optical parts at a desired precision. Further, even if the optical parts can be arranged at the desired precision, in the case that the optical bench 1000 is thin, the distortion or the deformation is generated in the same manner in the optical bench 1000 by fixing the optical bench 1000 to the bottom portion of the casing 1001, for example, by general screw fastening and it becomes hard to maintain an arrangement precision of the optical parts. Therefore, the optical bench 1000 requires certain degree of thickness.

On the other hand, the wavelength selecting switch is required to be thinned the casing 1001. Here, in the structure in FIG. 26, the thickness of the casing 1001 needs to cover at least total of a thickness of the optical bench 1000, a clearance for avoiding interference between the optical bench 1000 and the casing 1001, a height of the optical parts, and a clearance for avoiding interference between the optical parts and the lid 1002. Accordingly, if the optical bench 1000 is thin, it becomes hard to thin the casing 1001.

As mentioned above, the convention wavelength selecting switch has a trade-off relationship between the thickness of the optical bench 1000 and the thinning of the casing 1001, and it is hard to satisfy both.

It is preferable to provide a wavelength selecting switch which can solve the problem and can thin the casing while securing the thickness of the optical bench.

Further, in the dispersing portion of Littman-Metcalf configuration, a transmission type diffraction grating is employed, and the dispersing portion transmits a diffraction grating surface of the diffraction grating two times. However, as a result of study by the inventors of the present invention, a noise light of a transmission diffraction light and a reflection diffraction light having different order may be generated in the diffraction grating surface, in addition to a transmission diffraction light (normal light) of a desired order based on the design of diffraction grating. If the noise light enters into the deflecting portion, and is coupled to an output port from which the normal light in the same wavelength band is output, an undesired output level fluctuation (ripple) may be generated due to a wavelength dependency of light path difference between the noise light and the normal light.

FIG. 27 is a view showing an outline structure of a wavelength selecting switch 1100 having a dispersing portion of Littman-Metcalf configuration. The dispersing portion is constructed by a diffraction grating 1122 and a mirror 1123. In the wavelength selecting switch 1100, an input light input from any input and output port of the input and output portion 1100 comes to a parallel light by a micro lens 1111 as shown its light path by a solid line, is temporarily converged by cylindrical lenses 1112 and 1113, and thereafter enters as a parallel beam into a diffraction grating 1122 by a lens 1121. The input light entering into the diffracting grating 1122 is exposed to a primary diffraction by the diffraction grating 1122 so as to transmit and be dispersed into lights per wavelength, is reflected by the mirror 1123 so as to be returned, and is exposed to a primary diffraction by the diffraction grating 1122 so as to transmit and be further dispersed. The light dispersed by the diffraction grating 1122 is converged per wavelength on a deflecting element (mirror) 1118 of a deflecting portion 1117 by the lens 1121. The light per wavelength is reflected at different angles per wavelength by the deflecting element 1118, is returned the light path until being reflected by the deflecting element 1118, and is output from a predetermined any output port of the input and output portion 1110.

However, if a part of the input light from the lens 1121 is primarily diffracted and reflected at a time when the input light from the lens 1121 first enters into the diffraction grating surface of the diffraction grating 1122, the input light comes to the noise light passing through a light path which is different from the normal light mentioned above. As shown by a broken line in FIG. 27, if a part of the noise light enters into any deflecting element 1118, the reflected light thereof is coupled to any output port at a higher coupling efficiency than the other noise components. In the case that the output port from which the noise light is output is the same port as the output port from which the normal light having the same wavelength is output, a ripple is generated due to interference between the normal light and the noise light.

Further, in the same manner, in the other structures of the dispersing portion, a light path difference caused by diffraction (including transmission and reflection) of a desired order and a different order in the diffraction grating deteriorates a transmission band characteristic of the wavelength selecting switch.

It is preferable to solve the problem and prevent the transmission band characteristic from being deteriorated due to an undesired diffraction on the diffraction grating of the wavelength selecting switch.

Accordingly, an object of the present invention made by taking the above circumstance into consideration is to provide a wavelength selecting switch having an excellent characteristic which solves at least one of the problems.

An optical unit for a wavelength selecting switch according to the present invention achieving the object mentioned above is provided with at least one input port, a dispersing portion which disperses a wavelength of an input light input from the input port, a converging element which converges the light dispersed by the dispersing portion, at least one output port, a light path compensating portion which shifts the light dispersed by the dispersing portion, an adjusting portion which changes a shift amount by the light path compensating portion, and a casing which seals the input port, the dispersing portion, the converging element, the output port and the light path compensating portion, wherein the casing has a transparent portion which is optically transparent at a position into which the light converged by the converging element enters, the adjusting portion is arranged in an outer portion of the casing, and the light path compensating portion can be controlled from the outer portion of the casing by the adjusting portion.

Accordingly, the light path of the optical system within the casing of the wavelength selecting switch can be adjusted from the outer portion of the casing.

Further, in the optical unit for the wavelength selecting switch according to the present invention, the light path compensating portion is preferably arranged in the light path between the input port and the dispersing portion.

Further, in the optical unit for the wavelength selecting switch according to the present invention, the light path compensating portion is preferably arranged in the light path between the dispersing portion and the transparent portion.

Further, in the optical unit for the wavelength selecting switch according to the present invention, the light path compensating portion is preferably provided with an optical element for compensating light path, and an actuator for driving the optical element, and the adjusting portion preferably adjusts the shift amount by driving the actuator.

Further, in the optical unit for the wavelength selecting switch according to the present invention, the dispersing portion is preferably constructed by a Littman-Metcalf configuration having a transmission type dispersing element and a reflecting element, the reflecting element preferably constructs the light path compensating portion, and the adjusting portion preferably adjusts the shift amount by displacing the reflecting element.

Further, in the optical unit for the wavelength selecting switch according to the present invention, the light path compensating portion is preferably provided with an electro-optic device, and the adjusting portion preferably adjusts the shift amount by controlling a voltage applied to the electro-optic device.

Further, in the optical unit for the wavelength selecting switch according to the present invention, the casing is preferably provided with a nonmagnetic material portion at least partly, the light path compensating portion is preferably provided with an optical element for compensating the light path, and a magnetic material or a magnet attached to the optical element, and the nonmagnetic material portion is preferably provided with a magnet or a magnetic material which adjusts the shift amount by displacing the optical element by a magnetic force in cooperation with the magnetic material or the magnet via the nonmagnetic material portion.

Further, in the optical unit for the wavelength selecting switch according to the present invention, the optical element for compensating the light path is preferably provided with parallel flat plates.

Further, in the optical unit for the wavelength selecting switch according to the present invention, the casing preferably has a transparent window for fixing the light path compensating portion to the casing by an ultraviolet light curable pressure sensitive adhesive.

A wavelength selecting switch according to the present invention achieving the object mentioned above is provided with any one optical unit for the wavelength selecting switch mentioned above, and a deflecting portion which is attached to an outer side of the casing and deflects the light converged by the converging element.

Further, in the wavelength selecting switch according to the present invention, the light path compensating portion preferably shifts an incident position of the light dispersed by the dispersing portion in relation to the deflecting portion.

Further, the invention of a wavelength selecting switch according to the present invention achieving the object mentioned above is provided with at least one input port, a dispersing portion which disperses a wavelength of an input light entering from the input port, a converging element which converges the light dispersed its wavelength by the dispersing portion, a deflecting portion which deflects the light converged by the converging element, at least one output port which outputs the light deflected by the deflecting portion as an output light, an optical bench which supports at least the dispersing portion and the converging element, and a casing which accommodates and retains the optical bench, wherein the optical bench is attached in such a manner that a support surface supporting the dispersing portion and the converging element intersects a surface having the greatest project area of the casing.

Accordingly, it is possible to provide the wavelength selecting switch which can achieve the thinning of the casing while securing the thickness of the optical bench.

The input port and the output port are preferably arranged linearly, the deflecting portion is preferably supported by a support portion which protrudes out of the support surface of the optical bench among the input port, the output port and the converging element, and a light transmission portion transmitting the input light and the output light is preferably formed in the support portion.

A primary converging lens forming a primary converging point is preferably provided among the input port, the output port and the converging element, the support portion is preferably arranged in such a manner that the light transmitting portion is positioned at the primary converging point or in the vicinity thereof, and the dispersing portion, the converging element and the deflecting portion are preferably arranged in such a manner that the input light from the input port is dispersed by the dispersing portion through the primary converging lens and the converging element, and the dispersed light is deflected by the deflecting portion through the converging element, and is output as the output light from the output port through the dispersing portion and the converging element.

Further, the invention of a wavelength selecting switch achieving the object mentioned above is provided with at least one input port which inputs a wavelength multiplexed light, a dispersing portion which disperses the wavelength multiplexed light input from the input port, a converging portion which converges the light dispersed by the dispersing portion per wavelength, a deflecting portion which can independently deflect the light converged by the converging portion per wavelength, and at least one output port which outputs the light deflected by the deflecting portion, wherein the dispersing portion includes a diffraction grating, and the light diffracted at a desired order by the diffraction grating and a noise light diffracted at least at a different order from the desired order, or in a different reflection or transmission mode are structured such that output angle ranges from the dispersing portion do not overlap.

Accordingly, since the light diffracted at the desired order by the diffraction grating and the noise light diffracted at least at the different order from the desired order, or in the different reflection or transmission mode are structured such that the output angle ranges from the dispersing portion do not overlap, it is possible to prevent the transmission band characteristic from being deteriorated by the undesired diffraction on the diffraction grating surface of the wavelength selecting switch.

The diffraction grating is preferably constructed by a transmission type diffraction grating, and the noise light is preferably constructed by the light reflected by the diffraction grating surface of the diffraction grating. Here, the reflected light includes not only the regular reflected light but also the reflection diffraction light.

Further, it is preferable that the dispersing portion further includes a reflection element, the wavelength multiplexed light input from the input port is structured such as to transmit the diffraction grating by a m-order diffraction, be reflected by the reflection element, and further transmit the diffraction grating by the m-order diffraction, and the noise light is constructed by a first noise light which is reflected by the m-order diffraction at a time when the wavelength multiplexed light enters into the diffraction grating surface of the diffraction grating first time, and a second noise light which is reflected by the m-order diffraction at a time when the light transmitting the diffraction grating enters into the diffraction grating second time after being reflected by the reflection element, is further reflected by the reflection element and transmits the diffraction grating by the m-order diffraction, in which m is the other integers than 0.

Further, in the case of setting the maximum value and the minimum value of a wavelength $\lambda$ of the wavelength multiplexed light to $\lambda_1$ and $\lambda_s$, and setting outgoing angles of the light diffracted by the desired order, the first noise light and the second noise light from the dispersing portion with regard to the wavelengths $\lambda$ of the wavelength multiplexed lights respectively to $\theta_o(\lambda)$, $\phi_{o1}(\lambda)$ and $\phi_{o2}(\lambda)$, it is preferable to satisfy the following expression.

$$\max_{\lambda_s \le \lambda \le \lambda_1} \phi_{o1}(\lambda) < \min_{\lambda_s \le \lambda \le \lambda_1} \theta_o(\lambda) \text{ or } \max_{\lambda_s \le \lambda \le \lambda_1} \theta_o(\lambda) < \min_{\lambda_s \le \lambda \le \lambda_1} \phi_{o1}(\lambda)$$

and $$\max_{\lambda_s \le \lambda \le \lambda_1} \phi_{o2}(\lambda) < \min_{\lambda_s \le \lambda \le \lambda_1} \theta_o(\lambda) \text{ or } \max_{\lambda_s \le \lambda \le \lambda_1} \theta_o(\lambda) < \min_{\lambda_s \le \lambda \le \lambda_1} \phi_{o2}(\lambda)$$

Alternatively, the dispersing portion may include a first reflection element and a second reflection element, the wavelength multiplexed light input from the input port may be structured such as to transmit the diffraction grating by the m-order diffraction, be sequentially reflected by the first reflection element and the second reflection element, and further transmit the diffraction grating by -m-order diffraction, and the noise light may be constructed by a noise light which is regularly reflected at a time when the wavelength multiplexed light enters into the diffraction grating surface of the diffraction grating first time, in which m is the other integers than 0.

In this case, in the case of setting the maximum value and the minimum value of the wavelength λ of the wavelength multiplexed light to $\lambda_1$ and $\lambda_s$, and setting the outgoing angles from the dispersing portion of the light diffracted by the desired order and the noise light with regard to the wavelengths λ of the wavelength multiplexed lights respectively to $\theta_o(\lambda)$ and $\phi_o(\lambda)$, it is preferable to satisfy the following expression.

$$\max_{\lambda_s \le \lambda \le \lambda_1} \phi_o(\lambda) < \min_{\lambda_s \le \lambda \le \lambda_1} \theta_o(\lambda) \text{ or } \max_{\lambda_s \le \lambda \le \lambda_1} \theta_o(\lambda) < \min_{\lambda_s \le \lambda \le \lambda_1} \phi_o(\lambda)$$

Further preferably, the deflecting portion is provided with a deflecting element which deflects the converged light, and a noise light suppressing portion which suppresses the outgoing of the noise light to the output port is provided in a portion in which the deflecting element is not arranged in the deflecting portion.

The noise light suppressing portion may be constructed by a light absorbing member which absorbs the noise light, and may have a reflecting surface which reflects the noise light in a direction which does not reflects the noise light.

Further, it is further preferable that the incident angle of the wavelength multiplexed light to the dispersing portion does not lap over the outgoing angle range of the noise light from the dispersing portion.

According to the present invention, the wavelength selecting switch having an excellent characteristic can be provided.

MODE FOR CARRYING OUT THE INVENTION

A description will be given below of embodiments according to the present invention with reference to the accompanying drawings.

First Embodiment

Figure 1A:
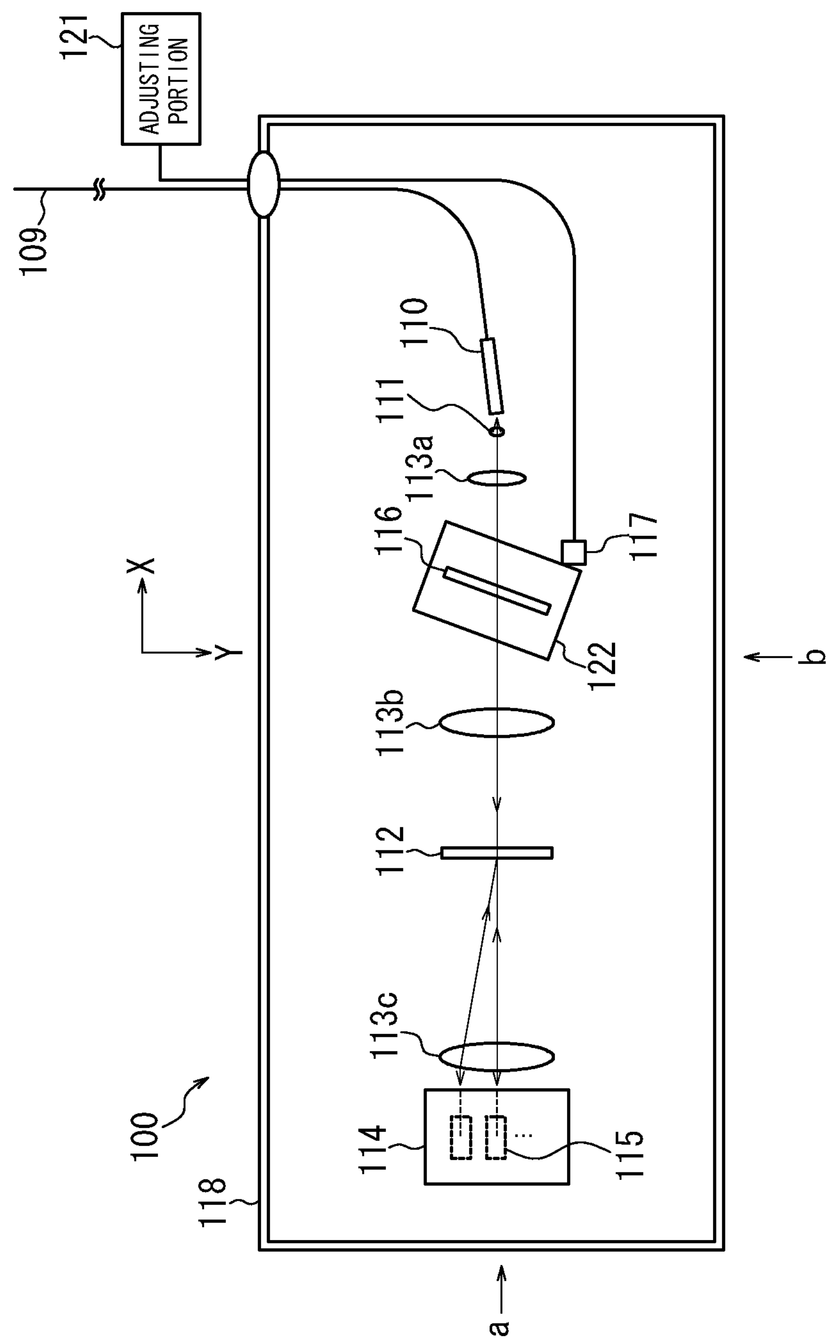
FIG. 1A is a plan view showing an outline structure of a wavelength selecting switch according to a first embodiment.
Figure 1B:
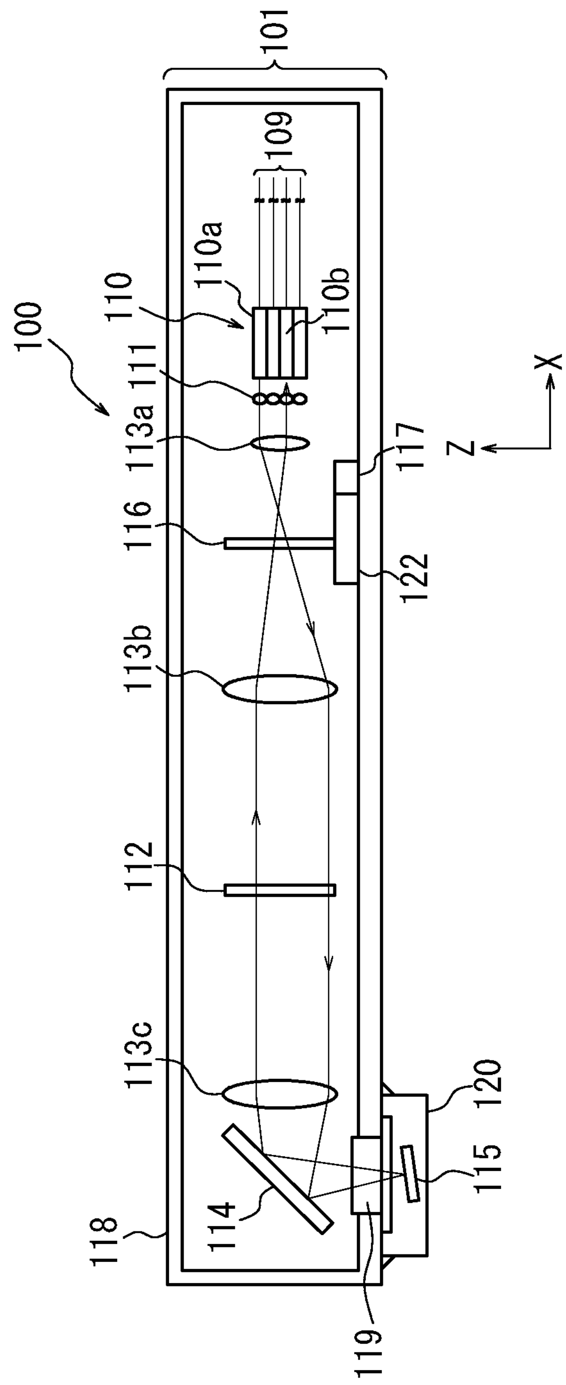
FIG. 1B is a side elevational view describing the outline structure of the wavelength selecting switch according to the first embodiment.

FIG. 1A is a plan view showing an outline structure of a wavelength selecting switch 100 according to a first embodiment of the present invention. FIG. 1B is a side elevational view describing the outline structure of the wavelength selecting switch 100 according to the present embodiment. In FIGS. 1A and 1B, for the purpose of clarifying, each of light fluxes is shown by a center line, and in at least one light fluxes which are dispersed by a dispersing portion 112, the light flux having a representative wavelength is shown by the center line.

The wavelength selecting switch 100 according to the present embodiment is provided with a casing 118 which hermetically embeds an optical fiber array 109, an input and output port 110, a lens array 111, a first converging element 113*a*, a second converging element 113*b*, a dispersing portion 112, a third converging element 113*c*, a mirror portion 114, a compensating plate 116, an actuator 117, and a support body 122, and has a window 119, an optical unit 101 for a wavelength selecting switch which is provided with an adjusting portion 121, and a deflecting portion casing 120 which embeds a deflecting portion 115.

The optical fiber array 109 is constructed by at least two fibers. Further, the optical fiber array 109 extends into an inner portion of the casing 118 from an outer portion via a through hole provided in the casing 118. Here, the through hole for passing the optical fiber array 109, the through hole being formed in the casing 118 and the optical fiber array 109 are arranged with no gap. Accordingly, in spite of extension of the optical fiber array 109 to the inner portion from the outer portion of the casing 118, the inner portion of the casing 118 keeps a sealed state.

The input and output port 110 is provided with at least one input port 110*a* and at least one output port 110*b*. The input port 110*a* inputs a wavelength multiplexed light signal from the optical fiber array 109 to an optical system of the wavelength selecting switch 100. The output port 110*b* outputs a light signal from the optical system of the wavelength selecting switch 100 to the optical fiber array 109.

In the present application, a description will be given on the assumption that the vicinity of a leading end of the optical fiber array 109 is particularly the input port 110*a* or the output port 110*b*. In other words, the input port 110*a* or the output port 110*b* is not limited to the other member than the optical fiber array 109. Further, in FIG. 1A, a portion of the input and output port 110 is made thicker in diameter than the portion of the optical fiber array 109, however, the diameter is not limited to have difference actually.

Further, the number of ports constructing the input and output port 110 is set, for example, to be equal to or more than two, and more input and output ports can be provided, however, for convenience of explanation, only four representative input and output ports are illustrated in FIG. 1B. Further, the number of the optical fibers constructing the optical fiber array 10 is changed in correspondence to the number of the ports constructing the input and output port 110. Further, it is possible to appropriately design which input and output ports are used for inputting or outputting. In other words, only one input and output port may be used for inputting and the other input and output ports may be used for outputting, or a plurality of ports for inputting and a plurality of ports for outputting may be provided.

The lens array 111 is provided with a plurality of spherical or aspherical micro lenses for converging the light flux returning from the deflecting portion 115 to the input and output port 110 as well as making the light flux from the input and output port 110 parallel lights. Each of the micro lenses constructing the lens array 111 forms a pair with each of the ports constructing the input and output port 110.

The first converging element 113*a* converges a light flux from each of the micro lenses of the lens array 111 into one point, and distributes the light flux turning back from the deflecting portion 115 to each of the micro lenses of the lens array 111.

The compensating plate 116 is arranged between the first converging element 113*a* and the second converging element 113*b*. The compensating plate 116 is driven by the actuator 117 so as to compensate the light path. The light path compensating portion is constructed by the compensating plate 116 and the actuator 117. The light path compensating portion shifts the light dispersed by the dispersing portion 112. Specifically, the light path compensating portion shifts a converging position of the light flux entering into the deflecting portion 115 arranged in the outer portion of the casing 118 in relation to the deflecting portion 115. A description will be given later of details of the light path compensating portion.

The second converging element 113*b* makes the light flux converged into one point by the first converging element 113*a* parallel lights, and converges the light flux turning back from the deflecting portion 115 to one point.

The dispersing portion 112 disperses per wavelength (wavelength disperses) the light flux which is made parallel by the second converging element 113*b*, and uniforms a forward moving direction of the light flux turning back from the deflecting portion 115 so as to input to the second converging element 113*b*. The dispersing portion 112 is constructed, for example, by a transmission type dispersing element (grating). Further, the dispersing portion 112 may be a Littman-Metcalf configuration type structure which is combined by the dispersing element and a mirror. Further, in this embodiment, the transmission type dispersing element is used, however, a reflection type diffraction grating, Grism, and a super prism may be used without being limited to the transmission type dispersing element.

The third converging element 113*c* converges the light flux dispersed by the dispersing portion 112 on the deflecting portion 115. Further, the third converging element 113*c* collimates the light flux turning back from the deflecting portion 115 so as to make the light flux enter into the dispersing portion 112.

The mirror portion 114 is structured such as to reflect the light from the converging element 113*c* so as to conduct to the deflecting portion 115 via the window 119. Since the deflecting portion 115 is not provided on the forward moving direction of the light from the converging element 113*c*, the mirror portion 114 is necessary, however, the present embodiment is not limited to this aspect. For example, in the case that the deflecting portion 115 is provided on the forward moving direction of the light from the converging element 113*c*, the mirror 114 can be omitted.

The deflecting portion 115 has one or more deflecting element which deflects at least one light flux converged by the third converging element 113*c* at different angles, reflects the light flux from the third converging element 113*c* at a different angle from the incident angle, and turns back the light flux to the third converging element 113*c*.

The deflecting portion 115 is constructed, for example, a liquid crystal on silicon (LOCS) which is a MEMS mirror array or a reflection type liquid crystal display panel. In the case that the deflecting portion 115 is the MEMS mirror array, the deflecting portion 115 is structured such that a plurality of micro mirrors corresponding to wavelengths are arranged like an array. Each of the micro mirrors is driven by a power supply from a cable (not shown), thereby changing an incline of the micro mirror itself and changing the forward moving direction of the light per wavelength. The number of the deflecting elements provided in the deflecting portion 115 is not particularly limited.

The light flux heading for the deflecting portion 115 and the light flux turning back from the deflecting portion 115 pass through each of the first, second and third converging elements 113*a*, 113*b* and 113*c*. In other words, the first, second third converging elements 113*a*, 113*b* and 113*c* serve as a converging element which converges the light flux, or a collimator element which makes the light flux from one point parallel lights, however, all of them is called as the converging element here.

The casing 118 hermetically embeds the input port 110, the lens array 111, the dispersing portion 112, the first, second and third converging elements 113*a*, 113*b* and 113*c*, the mirror portion 114, the light path compensating portion (the compensating plate 116 and the actuator 117) and the other elements arranged within the casing. A conducting wire supplying power supply to the optical fiber array 109 and the actuator 117 gets out of the casing 118 via a seal member, for example. Accordingly, it is possible to adjust the light path compensating portion from the outer portion of the casing 18 while keeping a sealing performance of the inner portion of the casing 118.

The window 119 constructs an optically transparent portion which is arranged at a position where the light converted by the third converge element 113*c* enters. Specifically, the window 119 is constructed by a transparent material which is formed in a part of the casing 118, and transmits the light reflected in a direct downward direction by the mirror portion 114. The window 119 is constructed, for example, by quartz. Further, in place of the window, a plate constructed by a transparent material may be provided in the casing 118. In this case, a member arranged in the casing 118 can be attached onto the plate.

The deflecting portion casing 120 embeds the deflecting portion 115. The deflecting portion casing 120 and the casing 118 are separate bodies, and the deflecting portion casing 120 can be later attached to the casing 118. Further, the deflecting portion casing 120 is detachable in relation to the casing 118, and if the deflecting portion 115*b* is in failure, a user can replace the deflecting portion casing 120.

The casing 118 and the deflecting portion casing 120 may be fixed by a pressure sensitive adhesive, or may be fixed by a fixing member such as a screw. Further, the casing 118 and/or the deflecting member 120 may be provided with an attaching member as occasion demands.

The adjusting portion 121 changes a shift amount by the light path compensating portion (the compensating plate 116 and the actuator 117). Specifically, the adjusting portion 121 drives the actuator 117 so as to adjust the shift amount of the incident position of the light dispersed by the dispersing portion 112 in relation to the deflecting portion 115. In the case that the actuator 117 is constructed by a piezoelectric element, the adjusting portion 121 makes the piezoelectric element expand and contract by controlling voltage applied to the piezoelectric element. On the basis of the expansion and contraction of the piezoelectric element, the compensating plate 116 is rotated at a desired rotating angle, and the incident position of the light in relation to the deflecting portion 115 is shifted at a desired amount.

As described above, the light flux from the input port 110*a* passes through the lens array 111, the first converging element 113*a*, the compensating plate 116, the second converging element 113*b*, the dispersing portion 112, the third converging element 113*c*, the mirror portion 114 and the window 119 sequentially, is reflected by the deflecting portion 115, passes through absolutely the inverse route to the above, and returns to the output port 110*b*.

Figure 2A:
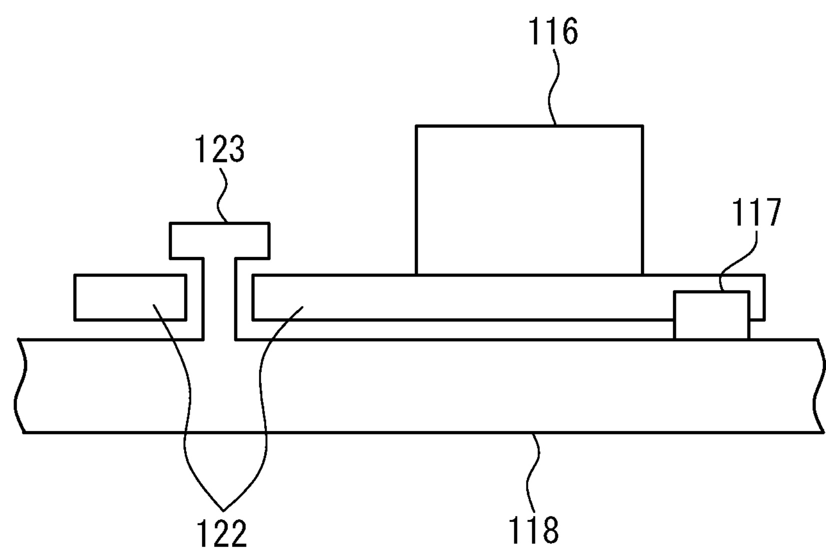
FIG. 2A is a view for describing an outline structure of a light path compensating portion in the wavelength selecting switch according to the first embodiment.

Next, a description will be given of an outline structure of the light path compensating portion with reference to FIGS. 2A and 2B. FIG. 2A is a view for describing the outline structure of the light path compensating portion. FIG. 2A is a view of the light path compensating portion as seen from a direction a in FIG. 1A. As mentioned above, the light path compensating portion is constructed by the compensating plate 116 and the actuator 117. The compensating plate 116 is constructed, for example, by parallel flat plates. The parallel flat plates are comparatively inexpensive. The compensating plate 116 is supported by the support body 122. The support body 122 is rotatable about a rotary shaft 123 which is fixed to the casing 118. The actuator 117 is arranged so as to come into contact with an end portion of the support body 122 in an opposite side to the rotary shaft 123. The actuator 117 is constructed, for example, by a piezoelectric element. Specifically, the piezoelectric element may be a laminated type PZT (lead zirconate titanate).

Figure 2B:
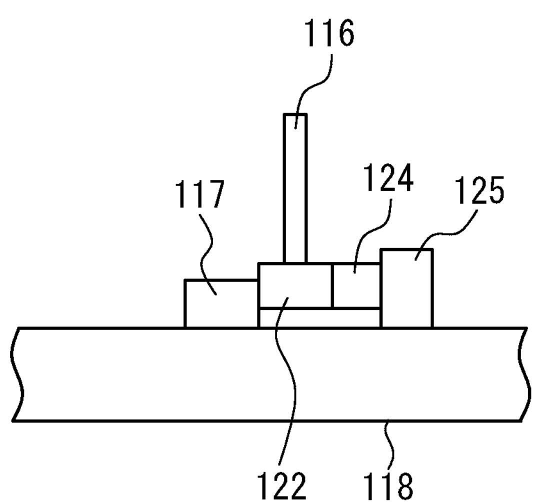
FIG. 2B is a view for describing the outline structure of the light path compensating portion in the wavelength selecting switch according to the first embodiment.

FIG. 2B is a view for describing the outline structure of the light path compensating portion. FIG. 2B is a view of the light path compensating portion as seen from a direction b in FIG. 1A. An elastic body 124 is arranged so as to come into contact with the support body 122. Further, a stopper 125 is arranged so as to come into contact with the elastic body 124. The actuator 117 is driven by the adjusting portion 121, whereby the support body 122 rotationally moves in relation to the rotary shaft 123. In the case that the actuator 117 is constructed by the piezoelectric element, the voltage applied to the piezoelectric element is changed, and the piezoelectric element expands and contracts in correspondence to the voltage so as to rotationally move the support body 122 in relation to the rotary shaft 123. In correspondence to the rotation of the support body 122, the incline of the compensating plate 116 changes.

Figure 2C:
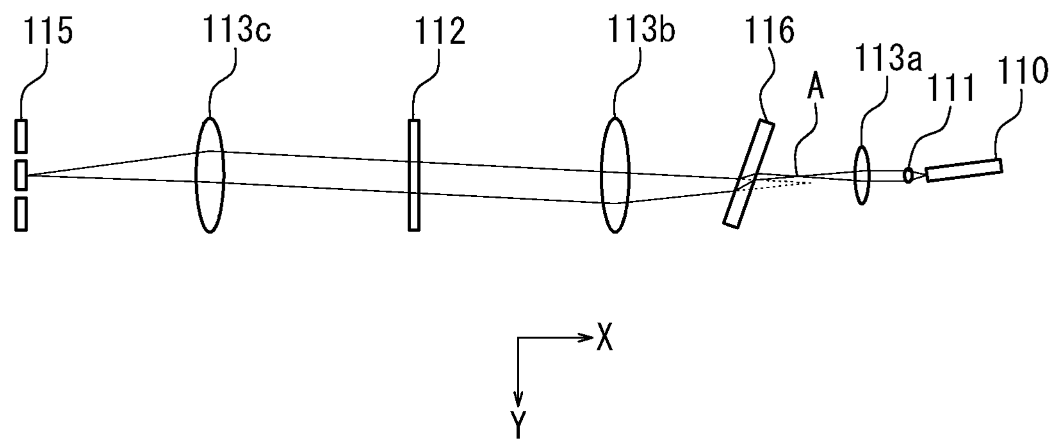
FIG. 2C is a view for describing a function of the light path compensating portion according to the first embodiment.

A description will be given of the shift of the converged position of the light flux entering into the deflecting portion 115 on the basis of the rotation of the compensating plate 116 with reference to FIG. 2C. FIG. 2C is a view for describing a function of the light path compensating portion according to the first embodiment. In FIG. 2C, the light flux dispersed by the dispersing portion 112 is constructed only by one light flux having a specific wavelength, and shows the light flux heading for the deflecting portion 115. The mirror portion 114 is omitted. By rotating the compensating portion 116, an apparent position of a point A where the light flux entering into the second converging element diverges is shifted as shown by a dotted line. A shift amount dx can be approximated by the following expression.

$$dx=t\theta/n$$

where n is refraction factor of the compensating plate 116, t is thickness and θ is rotating angle.

In other words, the shift amount dx is approximately in proportion to the rotating angle of the compensating plate 116. If the second converging element 113_b_ and the third converging element 113_c_ are equal in focal distance, the shift amount of the point where the light flux is converged by the third converging element 113_c_ becomes equal to the shift amount of the point A.

Accordingly, it is well known that the converging position of the light flux having the specific wavelength by the third converging element 113_c_ is shifted on the deflecting element of the deflecting portion 115 by the rotation of the compensating plate 116. Therefore, a whole of the light flux in the wavelength zone entering into the wavelength selecting switch 100 is shifted on most of the deflecting elements constructing the deflecting portion 115.

As mentioned above, the wavelength selecting switch 100 and the optical unit 101 for the wavelength selecting switch according to the present embodiment can shift the position where the light enters into the deflecting portion 115, by the light path compensating portion. Further, since the light path compensating portion is adjusted its shift amount by the adjusting portion 121 provided in the outer portion of the casing 118, the light path of the optical system in the casing can be adjusted, even after assembling the wavelength selecting switch 100 and the optical unit 101 for the wavelength selecting switch so as to be hermetically embedded in the casing 118. Accordingly, in the case that the deflecting portion casing 120 including the deflecting portion 115 is externally attached, in relation to the optical unit 101 for the wavelength selecting switch or the casing 118, it is possible to adjust the optical system of the optical unit 101 for the wavelength selecting switch or the optical system embedded in the casing 118 in conformity to the deflecting portion 115, even if the deflecting portion casing 120 slightly moves from the regular attaching position at the curing time of the pressure sensitive adhesive or the screwing time.

Figure 9:
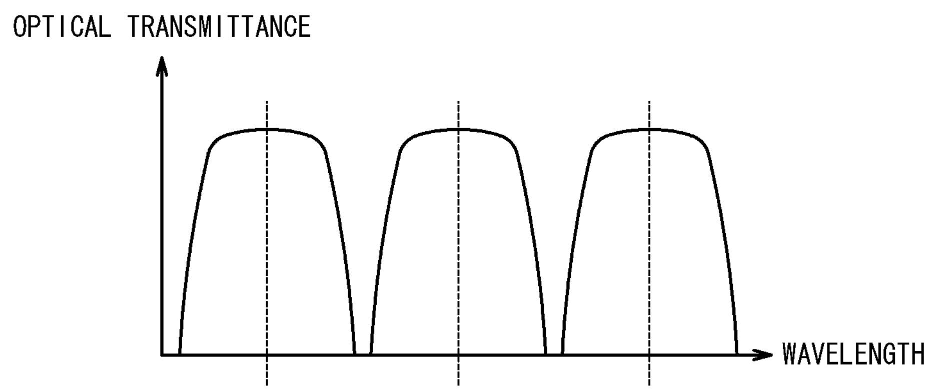
FIG. 9 is a view for describing a light flux adjusting method in the wavelength selecting switch according to the present invention.

As a specific method of adjusting the light flux, for example, methods described below can be listed up. After externally attaching the deflecting portion casing 120 which embeds the deflecting portion 115 in relation to the optical unit 101 for the wavelength selecting switch or the casing 118, the deflecting element of the deflecting portion 115 is inclined in such a manner that all the wavelengths are input to one output port 110_b_. The light signal output from one output port 110_b_ is observed by a light spectrum analyzer via the optical fiber array 109. Since the deflecting element of the deflecting portion 115 is discontinuous, the light having a wavelength of the discontinuous portion does not return, and a signal shown in FIG. 9 is observed. The wavelength of the light turning back from each of the deflecting elements of the deflecting portion 115 comes to a band of one channel. The wavelength at the center of the band is set to a center wavelength. The center wavelength is shifted by shifting the position where the light enters into the deflecting portion 115 by the light path compensating portion according to the method mentioned above. A state of the light path compensating portion is held in such a manner that the center wavelength of each of the channels becomes near the wavelength defined by the standard.

Further, in the present embodiment, since the light path compensating portion is arranged in the light path between the input and output port 110 and the dispersing portion 112, it is possible to make a magnitude of the compensating plate 116 provided in the light path compensating portion comparatively small. This is because it is not necessary to enlarge the magnitude of the compensating plate 116 such that the magnitude can receive all of a plurality of dispersed lights, as is different from the case that the light path compensating portion is arranged in the light path between the dispersing portion 112 and the deflecting portion 115, and shifts the light dispersed by the compensating plate 116. Making the magnitude of the compensating plate 116 comparatively small can contributes a downsizing of the wavelength selecting switch 100 and the optical unit 102 for the wavelength selecting switch according to the present embodiment.

Further, in the wavelength selecting switch 100 according to the present embodiment, since the light path compensating portion is provided with the compensating plate 116 which is the optical element for compensating the light path, and the actuator 117, and the actuator 117 is controlled by the electric signal from the adjusting portion 121 which is provided in the external portion of the casing 118, it is possible to drive the light path compensating portion while maintaining a sealing performance in the casing 118.

In the optical system in the casing, the first converging element 113*a* may be constructed by two cylindrical lenses which are different in diameter for forming an input light. For example, two cylindrical lenses are formed as an oval shape in a cross section of the light entering from the input port. Alternatively, the shape of the lens for forming the input light may be formed every shapes which can form the cross section of the light as an oval shape, without being limited to the cylindrical lens.

Second Embodiment

Figure 3A:
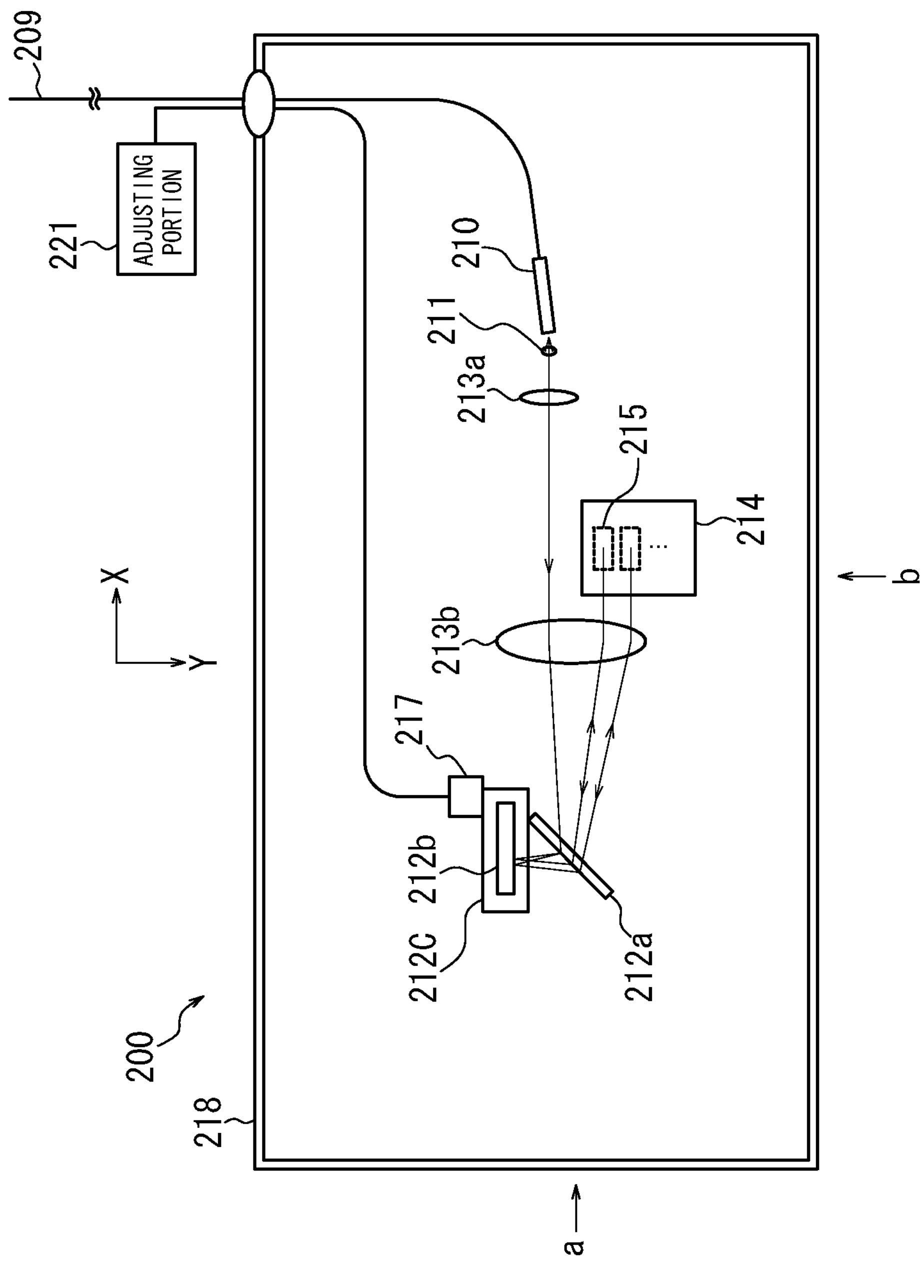
FIG. 3A is a plan view showing an outline structure of a wavelength selecting switch according to a second embodiment.
Figure 3B:
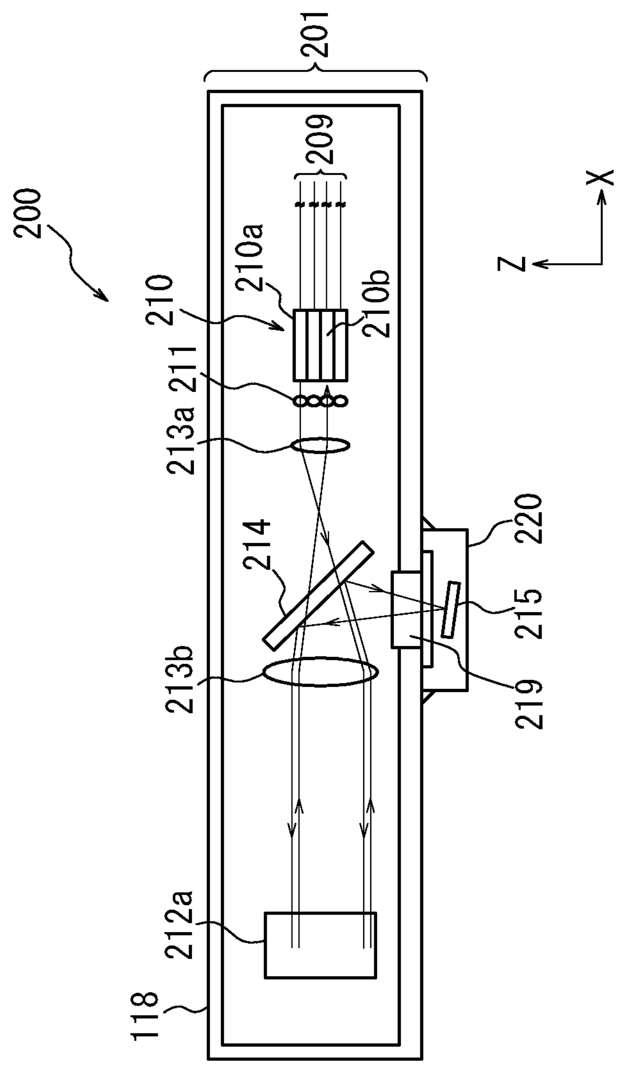
FIG. 3B is a side elevational view showing the outline structure of the wavelength selecting switch according to the second embodiment.

FIG. 3A is a plan view showing an outline structure of a wavelength selecting switch 200 according to a second embodiment of the present invention. FIG. 3B is a side elevational view showing the outline structure of the wavelength selecting switch 200 according to the present embodiment.

The wavelength selecting switch 200 according to the present embodiment is provided with an optical unit 201 for a wavelength selecting switch, the optical unit 201 being provided with a casing 218 which hermetically embeds an optical fiber array 209, an input and output port 210, a lens array 211, a first converging element 213*a*, a second converging element 213*b*, a dispersing element 212*a*, a reflection element 212*b*, a reflection element moving member 212*c*, a mirror portion 213 and an actuator 217 and has a window 219, and an adjusting portion 221, and the wavelength selecting switch 200 is also provided with a deflecting portion casing 220 which embeds a deflecting portion 215. Reference numerals obtained by adding 100 to the reference numerals in the first embodiment are attached to the same or corresponding constructing elements to those of the first embodiment, and a description thereof will be omitted.

Two converging elements 113*b* and 113*c* which are provided one by one in the front and rear sides of the dispersing portion 112 in the first embodiment, however, are in common to a converging element 213*b*. Further, the dispersing portion 112 is described in the first embodiment, however, in the present embodiment, a dispersing portion 212 is constructed by the dispersing element 212*a*, the reflection element 212*b* and the reflection element moving member 212*c*. Further, both of a light path between the input and output port 210 and the dispersing portion 212, and a light path between the dispersing portion 212 and the deflecting portion 215 pass through the converging element 213*b*.

In the wavelength selecting switch 200 according to the present embodiment, the dispersing element 212*a* of a transmission type and the reflection element 212*b*, which construct the dispersing portion 212 are arranged so as to form a Littman-Metcalf configuration. The reflection element 212*b* is attached to the reflection element moving member 212*c*. The actuator 217 is provided so as to come into contact with the reflection element moving member 212*c*. The actuator 217 is constructed, for example, by PZT, and expands and contracts in correspondence to applied voltage. Although an illustration is omitted, an elastic body is provided in an opposite side to the actuator 217 in relation to the reflection element moving member 212*c*. Further, a stopper (not shown) is arranged so as to come into contact with the elastic body.

The adjusting portion 221 of the wavelength selecting switch 200 and the optical unit 201 for the wavelength selecting switch according to the present embodiment controls the voltage applied to the actuator 217. In correspondence to the voltage applied by the adjusting portion 221, the actuator 217 is driven so as to rotate the reflection element moving member 212*c* around a rotary shaft (not shown). Further, a light flux entering into the deflecting portion 215 is shifted by the rotation of the reflection element moving member 212*c*. In other words, in the present embodiment, the reflection element 212*b*, the reflection element moving member 212*c* and the actuator 217 serve as a light path compensating portion.

Figure 3C:
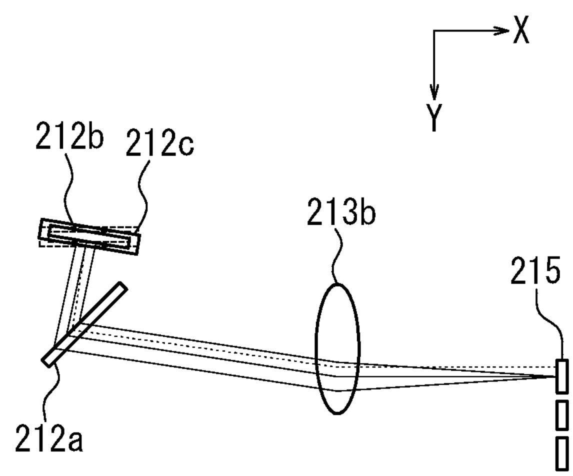
FIG. 3C is a view for describing a function of a light path compensating portion according to the second embodiment.

A description will be given of a principle that the light flux entering into the deflecting portion 215 is shifted by the rotation of the reflection element moving member 212*c* with reference to FIG. 3C. Since the light path from the input and output port 210 to the dispersing portion 212 is approximately the same as the first embodiment, the light path will be omitted. FIG. 3C only shows a light flux of particular one wavelength heading to the deflecting portion 215 from the reflection element 212*b*. After the light flux having the particular wavelength enters as the parallel light flux to the reflection element 212*b*, the incident light flux is reflected. The reflected light flux is deflected in a direction which is angularly different from the light flux coming from the input and output port 210 by the dispersing element 212*a*. The deflected light flux enters into the second converging element 213*b*, and is converged to one of deflecting elements constructing the deflecting portion 215 by the second converging element 213*b*. On the basis of the rotation of the reflection element moving member 212*c*, the reflection element 212*b* fixed to the reflection element moving member 212*c* rotates, and an incident angle of the light flux entering into the second converging element 213*b* changes. If the incident angle of the light flux entering into the second converging element 213*b* changes, a converging position of the light flux on the deflecting elements constructing the deflecting portion 215 changes. In other words, a shift amount of the converging position by the second converging element 213*b* is product of an angular change amount of the light flux entering into the second converging element 213*b* and a focal distance of the second converging element 213*b*. The angular change amount of the light flux entering into the second converging element 213*b* is twice the rotating angle of the reflection element moving member 212*c*. Accordingly, the converging point converged on the deflecting element of the deflecting portion 215 by the second converging element 213*b* is shifted by an amount which is in proportion to the rotating angle of the reflection element moving member 212*c*.

The wavelength selecting switch 200 according to the present embodiment is provided with the dispersing element 212*a* and the reflection element 212*b* which are arranged so as to form the Littman-Metcalf configuration, and the adjusting portion 221 provided in the external portion of the casing 218 of the wavelength selecting switch 200 shifts the incident position of the light relation to the deflecting portion 215 by displacing the reflection element 212*b*. Accordingly, the wavelength selecting switch 200 according to the present embodiment can drive the light path compensating portion from the external portion of the casing 218 while maintaining the sealing performance. Further, since it is not necessary to add any optical element for compensating the light path to the optical system in the casing 218, it is possible to apply the light flux adjusting function while suppressing an increase of the number of the parts constructing the wavelength selecting switch 200.

Third Embodiment

Figure 4A:
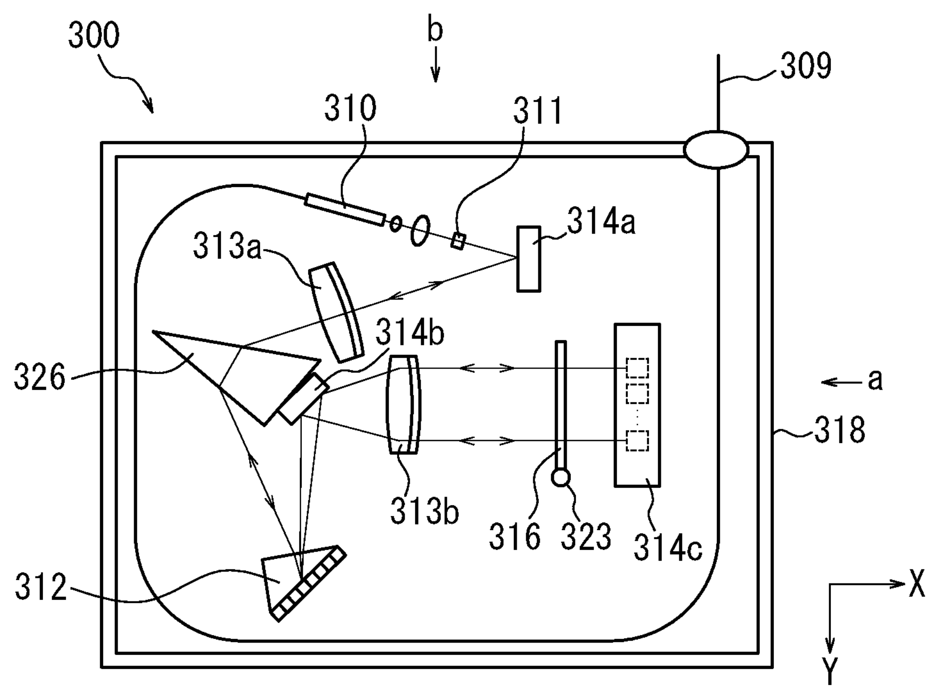
FIG. 4A is a plan view showing an outline structure of a wavelength selecting switch according to a third embodiment.
Figure 4B:
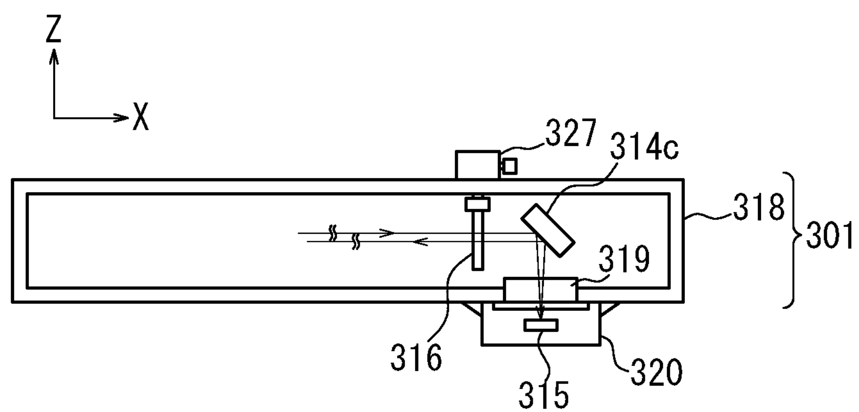
FIG. 4B is a side elevational view describing the outline structure of the wavelength selecting switch according to the third embodiment.

FIG. 4A is a plan view showing an outline structure of a wavelength selecting switch 300 according to a third embodiment of the present invention. FIG. 4B is a side elevational view describing the outline structure of the wavelength selecting switch 300 according to the present embodiment. The wavelength selecting switch 300 according to the present embodiment is provided with an optical unit 301 for a wavelength selecting switch, the optical unit 301 being provided with a casing 318 which hermetically embeds an optical fiber array 309, an input and output port 310, a lens array 311, a first converging element 313*a*, a first mirror portion 314*a*, a second converging element 313*b*, a temperature compensating prism 326, a Grism 312, a second mirror portion 314*b*, a third converting element 313*c*, a compensating plate 316, a rotary shaft 323 and a third mirror portion 314*c* and has a window 319, and an adjusting portion 221 which is constructed by a retaining portion 327 retaining a magnet (not shown), and the wavelength selecting switch 300 is also provided with a deflecting portion casing 320 which embeds a deflecting portion 315. Reference numerals obtained by adding 200 to the reference numerals in the first embodiment are attached to the constructing elements having the same functions as those of the first embodiment, and a description thereof will be omitted.

The temperature compensating prism 326 is a prism which deflects an input light so as to output to the Grism 312. The temperature compensating prism 326 may be set its shape, arrangement, medium and other conditions in such a manner that an incident angle of the light from the deflecting portion 315 to the output port becomes approximately fixed in relation to a temperature change in a used temperature range of the wavelength selecting switch 300 according to the present embodiment. The Grism 312 is one of the dispersing elements obtained by combining the prism and the diffraction grating. A light path compensating portion according to the present embodiment is provided with a compensating plate 316 which constructs an optical element for compensating the light path, and a magnetic body 330.

Figure 5A:
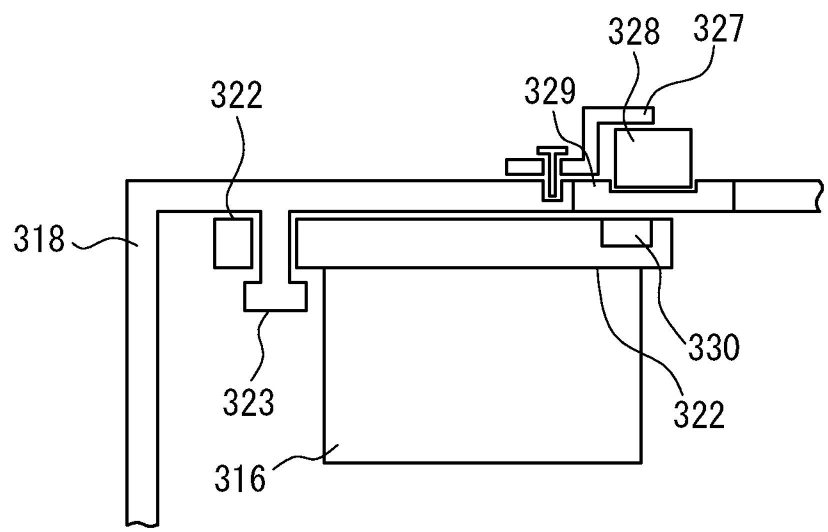
FIG. 5A is a view for describing an outline structure of a light path compensating portion according to the third embodiment.

Next, a description will be given of an outline structure of the light path compensating portion of the wavelength selecting switch 300 according to the present embodiment with reference to FIGS. 5A and 5B. FIG. 5A is a view for describing the outline structure of the light path compensating portion. FIG. 5A is a view of the light path compensating portion as seen from a direction a in FIG. 4A. In the same manner as the first embodiment, the compensating plate 316 is supported by a support body 322, and is constructed, for example, by parallel flat plates. The support body 322 can rotate about a rotary shaft 323 which is fixed to the casing 318. Here, in the present embodiment, the magnetic body 330 is provided in an end portion in an opposite side to the rotary shaft 323 in relation to the support body 322.

Further, in the vicinity of an upper portion of the magnetic body 330, a nonmagnetic material portion 329 is provided in the casing 318. Further, a magnet 328 constructing an adjusting portion which adjusts a shift amount of an incident position of the light in relation to the deflecting portion 315 by the light path compensating portion (the compensating plate 316 and the magnetic body 330) is arranged in a concave portion which is provided in the nonmagnetic material portion 329. The magnet 328 is retained by the retaining portion 327.

Figure 5B:
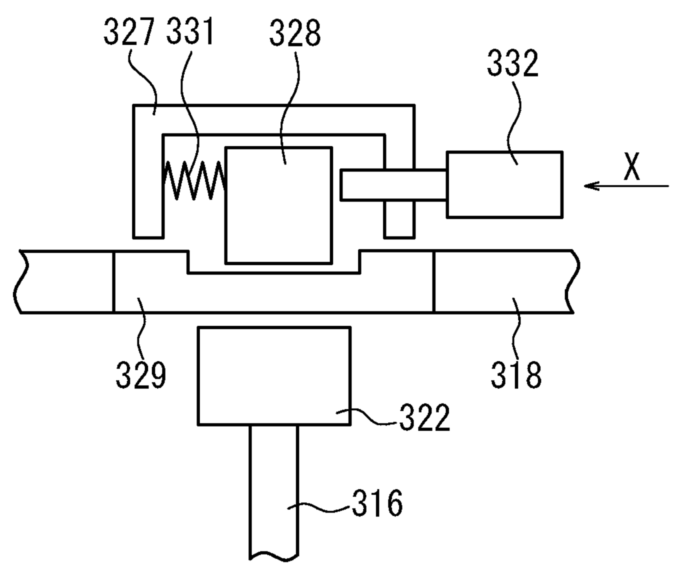
FIG. 5B is a view for describing the outline structure of the light path compensating portion according to the third embodiment.

FIG. 5B is a view for describing an outline structure of the light path compensating portion, and is a view of the light path compensating portion as seen from a direction b in FIG. 4A. An elastic member 331 is attached to one side surface of the magnet 328. The other end of the elastic member 331 is attached to the retaining portion 327. The magnet 328 moves in a direction of an illustrated arrow X by rotating a micrometer 332. In correspondence to the movement of the magnet 328, the compensating plate 316 rotates about the rotary shaft 323. On the basis of the rotation of the compensating plate 316, the light flux entering into the deflecting portion 315 is shifted.

Figure 5C:
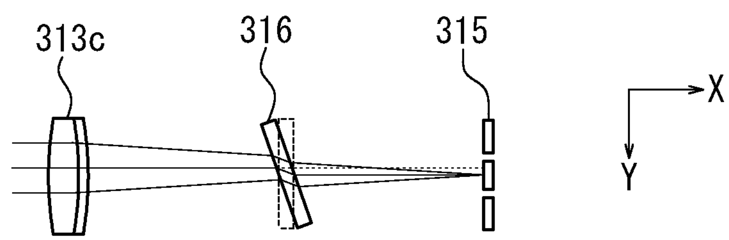
FIG. 5C is a view for describing a function of the light path compensating portion according to the third embodiment.

Here, with reference to FIG. 5C, a description will be given of the shift of the light flux entering into the deflecting portion 315 by the rotation of the compensating plate 316. Since the light path from the input and output port 319 to the third converging element 313*c* is approximately the same as the first embodiment, the light path will be omitted. In FIG. 5C, the light flux entering into the deflecting portion 315 is shown only by the light flux of one particular wavelength. The parallel light fluxes enter into the third converging element 313*c*, and are converged on one deflecting element of the deflecting portion 315. When the compensating plate 316 existing between the third converging element 313*c* and the deflecting portion 315 rotates, the converging position is shifted as is apparent from the drawing. A shift amount dx can be approximated by the following expression.

$$dx=t\theta/n$$

where n is refraction factor of the compensating plate 316, t is thickness thereof and θ is rotating angle.
The shift amount is in proportion to the rotating angle of the compensating plate 316. Accordingly, the light flux entering into the deflecting portion 315 by the rotation of the compensating plate 316 is shifted.

As mentioned above, in the wavelength selecting switch 300 and the optical unit 301 for the wavelength selecting switch according to the present embodiment, the incident position of the light in relation to the deflecting portion 315 is shifted by moving the magnet 328 constructing the adjusting portion. As mentioned above, according to the wavelength selecting switch 300 and the optical unit 301 for the wavelength selecting switch according to the present embodiment, it is possible to drive the light path compensating portion while maintaining a sealing performance in the casing 318. Further, in the wavelength selecting switch 300 according to the present embodiment, since the compensating portion 316 is rotated by the magnet 328, it is possible to reduce an electric power consumption.

In the wavelength selecting switch 300 and the optical unit 301 for the wavelength selecting switch according to the present embodiment, the compensating plate 316 is structured, for example, such that the compensating plate 316 is constructed by the parallel flat plates and is shifted by the magnet 328, however, the compensating plate 316 may be constructed by an electro-optic device (hereinafter, refer to as EOD). EOD is a device which is changed its refraction factor in correspondence to the applied voltage. In other words, EOD has a function of shifting the light path only at an amount corresponding to the applied voltage. In the case that the compensating plate 316 is constructed by the EOD, the compensating plate 316 is provided in an inclined manner. Further, in this case, the rotary shaft 323 is not necessary. As a representative EOD, KTN (potassium tantalate niobate), PZT (registered trademark) (lead zirconate titanate), lithium niobate ($LiNbO_3$), and KTP ($KTiOPO_4$) can be listed up.

In the case that the compensating plate 316 is constructed by EOD, the compensating plate 316 is connected to the adjusting portion which is provided in an outer portion of the casing 318, for example, by a conducting wire. At this time, the adjusting portion controls the voltage applied to the compensating plate 316 so as to change the refraction factor of the compensating plate 316, and changes the light path of the light passing through the compensating plate 316. Accordingly, the adjusting portion adjusts the shift amount of the incident position in relation to the deflecting portion 315. As mentioned above, the wavelength selecting switch 300 and the optical unit 301 for the wavelength selecting switch according to the present embodiment can adjust the light path compensating portion (the compensating plate 316) in the casing while maintaining the sealing performance.

In the present embodiment, the description is given on the assumption that the light path compensating portion has the magnetic body 330 and the adjusting portion has the magnet 328 respectively, however, the concept of the present invention exists in cooperation of the light path compensating portion and the adjusting portion by a magnetic force. Accordingly, the wavelength selecting switch according to the present embodiment may be structured such that the light path compensating portion has the magnet, and the adjusting portion has the magnetic body respectively. Further, in the present embodiment, the temperature adjusting prism 326 is arranged, however, the temperature adjusting prism is not necessarily arranged. Further, the various dispersing portions 112 exemplified in the first embodiment may be employed in place of the Grism 312.

Fourth Embodiment

Figure 6:
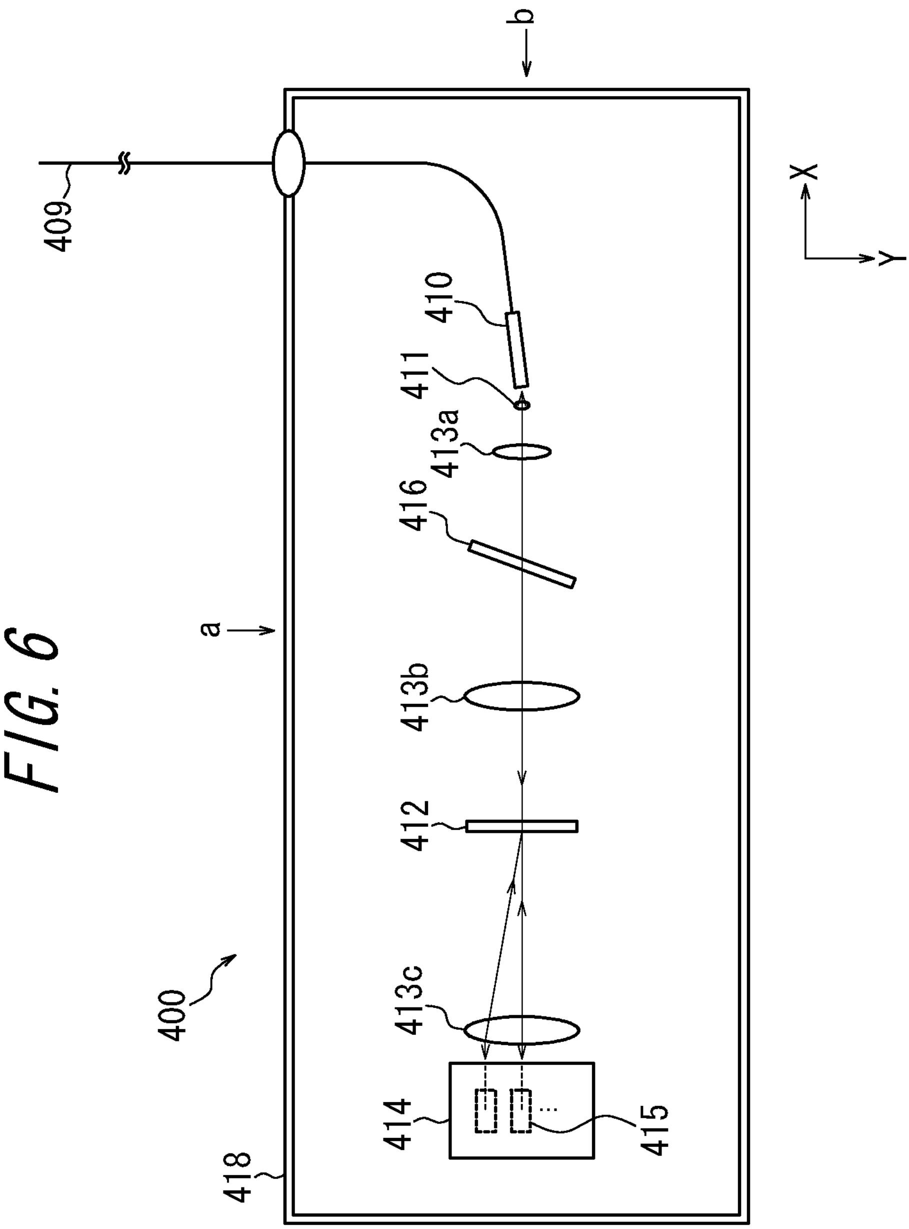
FIG. 6 is a plan view showing an outline structure of a wavelength selecting switch according to a fourth embodiment.

FIG. 6 is a plan view showing an outline structure of a wavelength selecting switch 400 according to a fourth embodiment of the present invention. Since a structure in a casing 418 is approximately the same as the first embodiment except a structure that the actuator is not provided, reference numerals obtained by adding 300 to the reference numerals in the first embodiment are attached to the same or corresponding constructing elements to the constructing elements of the first to third embodiments, and a description thereof will be omitted. Here, a description will be given only of different constructing elements from the first embodiment. Although not being illustrated, a wavelength selecting switch 400 according to the present embodiment is provided with an optical unit for a wavelength selecting switch, the optical unit being provided with a casing 418 which hermetically embeds various optical elements in common with the first embodiment and has a window (not shown), and an adjusting portion (not shown), and a deflecting portion casing (not shown) which embeds a deflecting portion.

Figure 7A:
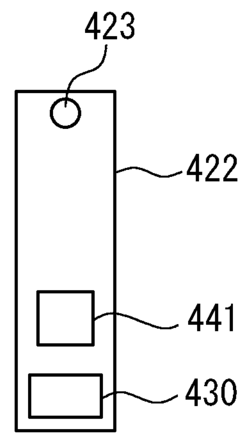
FIG. 7A is a view for describing an outline structure of a light path compensating portion according to the present embodiment.
Figure 7B:
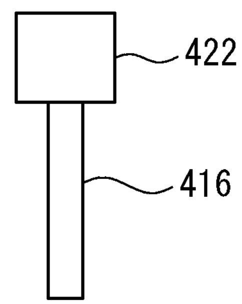
FIG. 7B is a view for describing the outline structure of the light path compensating portion according to the fourth embodiment.

FIGS. 7A and 7B are views for describing an outline structure of a light path compensating portion according to the fourth embodiment. FIG. 7A is a plan view of a support body 422 according to the present embodiment. FIG. 7B is a view of the light path compensating portion as seen from a direction a in FIG. 6. The support body 422 is provided with a magnetic body 430 in an upper surface (a surface in an opposite side to a surface supporting the compensating plate 416), and has a pressure sensitive adhesive sealing portion 441. An ultraviolet light curable pressure sensitive adhesive 442 is sealed in the pressure sensitive adhesive sealing portion 441.

Figure 7C:
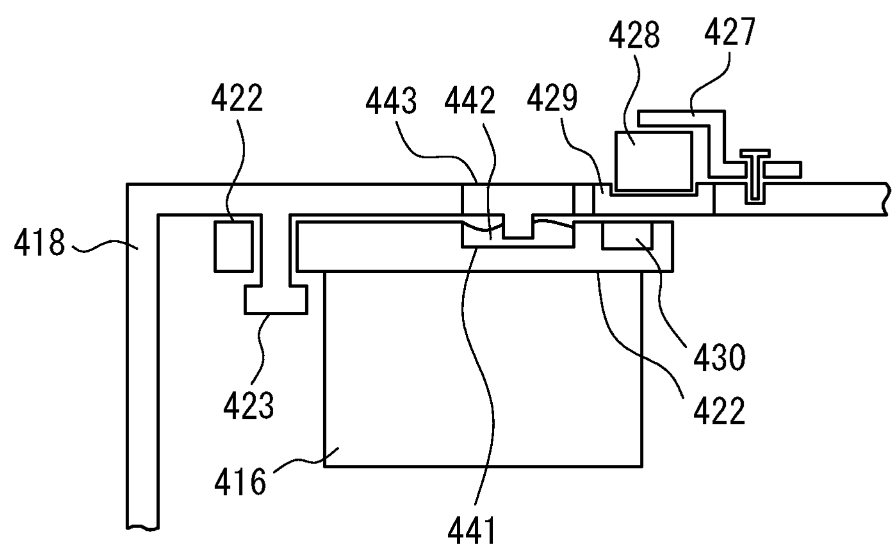
FIG. 7C is a view for describing the outline structure of the light path compensating portion according to the fourth embodiment.

FIG. 7C is a view of the light path compensating portion as seen from a direction b in FIG. 6. The casing 418 is provided with a transparent window 443 on the pressure sensitive adhesive sealing portion 441, and is provided with a magnet 428 on the magnetic body 430. The magnet 428 is retained by a retaining portion 427. An adjusting mechanism of the light path adjusting portion by the magnet 428 conforms to the same mechanism of the magnet 328 and the retaining portion 327 according to the third embodiment shown in FIGS. 5A and 5B.

A description will be given below of a fixing method of the wavelength selecting switch 400 and the light path compensating portion of the optical unit for the wavelength selecting switch according to the present embodiment. First of all, as mentioned above, the compensating plate 416 constructing the light path compensating portion is inclined at a desired angle by the magnet 428 constructing the adjusting portion. Further, the ultraviolet light curable pressure sensitive adhesive 442 sealed in the pressure sensitive adhesive sealing portion 441 is cured by irradiating the ultraviolet light via the transparent window 443. As mentioned above, in the wavelength selecting switch 400 and the optical unit for the wavelength selecting switch according to the present embodiment, it is possible to adjust the light path compensating portion within the casing 418 while maintaining a sealing performance of the casing 418, and it is possible to fix the light path compensating portion to the casing 418 in the adjusted state.

Further, in the present embodiment, the compensating plate 416 can be fixed at a desired inclined angle by replacing the pressure sensitive adhesive sealed in the pressure sensitive adhesive sealing portion 441 by a thermosetting type pressure sensitive adhesive, replacing the transparent window 443 by a high heat conducting member, making the compensating plate 416 incline at a desired angle and thereafter curing the thermosetting type pressure sensitive adhesive by heat.

Figure 8A:
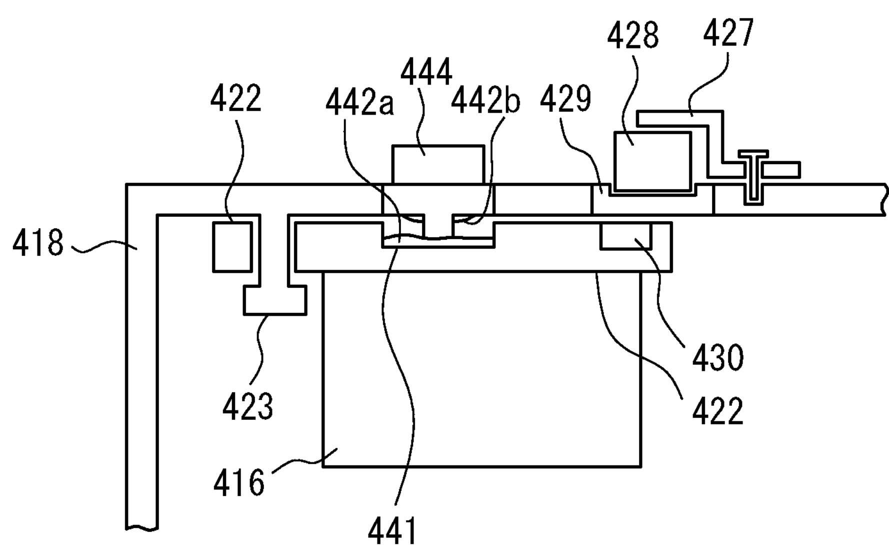
FIG. 8A is a view showing a modified example of the wavelength selecting switch according to the fourth embodiment.
Figure 8B:
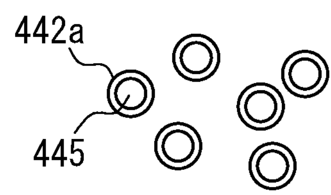
FIG. 8B is a view for describing an outline structure of a light path compensating portion according to a modified example shown in FIG. 8A.

FIG. 8A is a view showing a modified example of the wavelength selecting switch according to the fourth embodiment of the present invention. The pressure sensitive adhesive sealed in the pressure sensitive adhesive sealing portion 441 is constituted by a two-liquid curing type pressure sensitive adhesive. The two-liquid curing type pressure sensitive adhesive is constructed by a first liquid 442*a* and a second liquid 442*b*. The first liquid 442*a* is sealed in the pressure sensitive adhesive sealing portion 441. The second liquid 442*b* has a micro magnetic bead 445 and exists in a state in which the second liquid 442*b* is adsorbed around the magnetic bead 445, as shown in FIG. 8B. Further, the magnetic bead 445 to which the second liquid 442*b* is attached is attracted by a magnet 444 for the pressure sensitive adhesive from an external portion of the casing 418, and is fixed to an inner wall of the casing 418, such as the second liquid 442*b* shown in FIG. 8A. Further, after the compensating plate 416 is inclined at a desired angle by actuating the light path compensating portion by the magnet 428, the magnet 444 for the pressure sensitive adhesive is detached from the casing 418. Then, the magnetic bead 445 attracted by the magnet 444 for the pressure sensitive adhesive drops into the first liquid 442*a*, and the first liquid 442*a* and the second liquid 442*b* are mixed so as to be cured.

According to the present modified example, after adjusting the optical system in the casing 418 by the method as mentioned above, it is possible to fix the light path compensating portion having the adjusted light flux while maintaining the sealing performance, by utilizing the magnetic bead and the two-liquid curing type pressure sensitive adhesive.

As mentioned above, in the wavelength selecting switch 400 and the optical unit for the wavelength selecting switch according to the present embodiment, since the light path compensating portion is fixed by the pressure sensitive adhesive, the deflecting casing cannot replaced due to the failure of the deflecting portion 415, however, it is possible to adjust the optical system embedded in the casing 418 in conformity to the deflecting portion 415 in relation to a fine movement at the curing time of the pressure sensitive adhesive when the deflecting portion casing (not shown) is attached later. Since the light path compensating portion is fixed by the pressure sensitive adhesive, the magnet 428 outside the casing 418 can be detached after being adjusted. Further, any power for retaining the light path compensating portion is not necessary. Further, since the light path compensating portion is firmly fixed by the pressure sensitive adhesive, it is possible to suppress the movement of the light path compensating portion in relation to a shock from an external portion.

In the same manner as the third embodiment, in the present embodiment, the description is given on the assumption that the light path compensating portion has the magnetic body 430, and the adjusting portion has the magnet 428 respectively. However, the concept of the present invention exists in cooperation of the light path compensating portion and the adjusting portion by the magnetic force. Accordingly, the wavelength selecting switch according to the present embodiment may be structured such that the light path compensating portion has the magnet, and the adjusting portion has the magnetic body respectively.

Fifth Embodiment

Figure 10A:
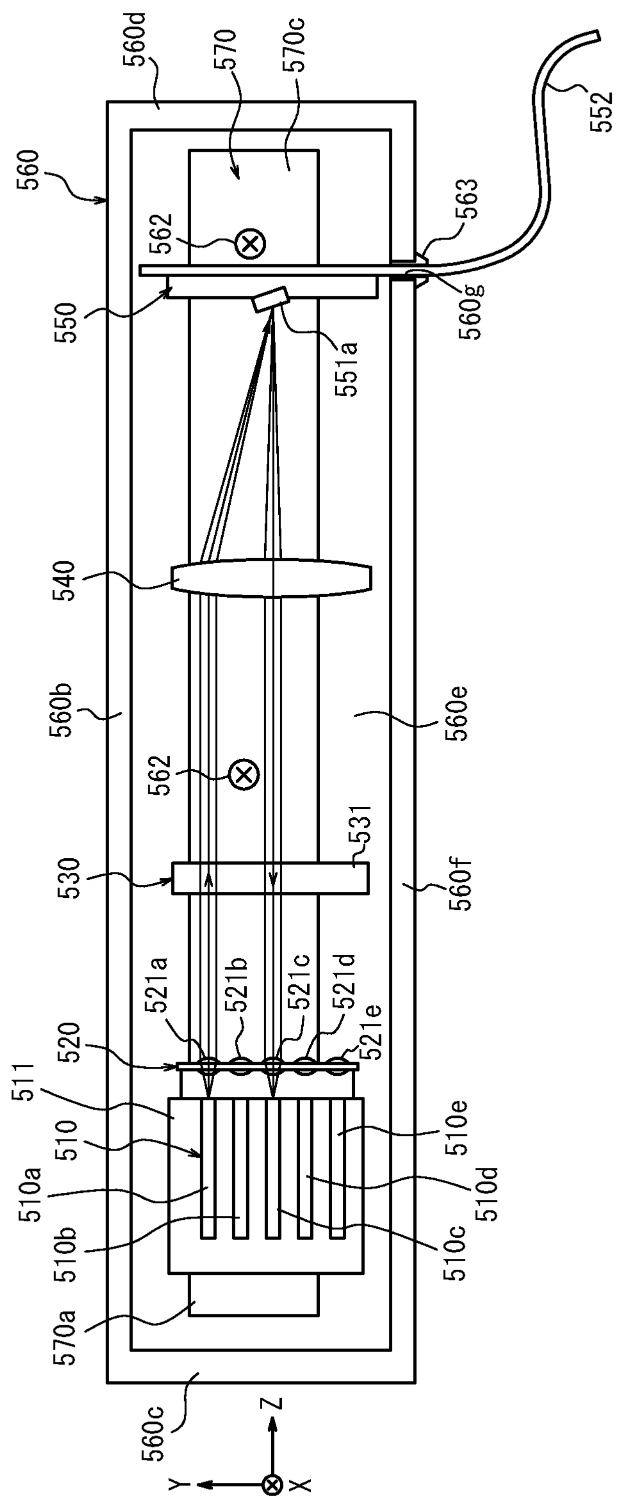
FIG. 10A is a view showing a structure of a substantial part of a wavelength selecting switch according to a fifth embodiment as seen from a wavelength dispersing direction by a dispersing portion.
Figure 10B:
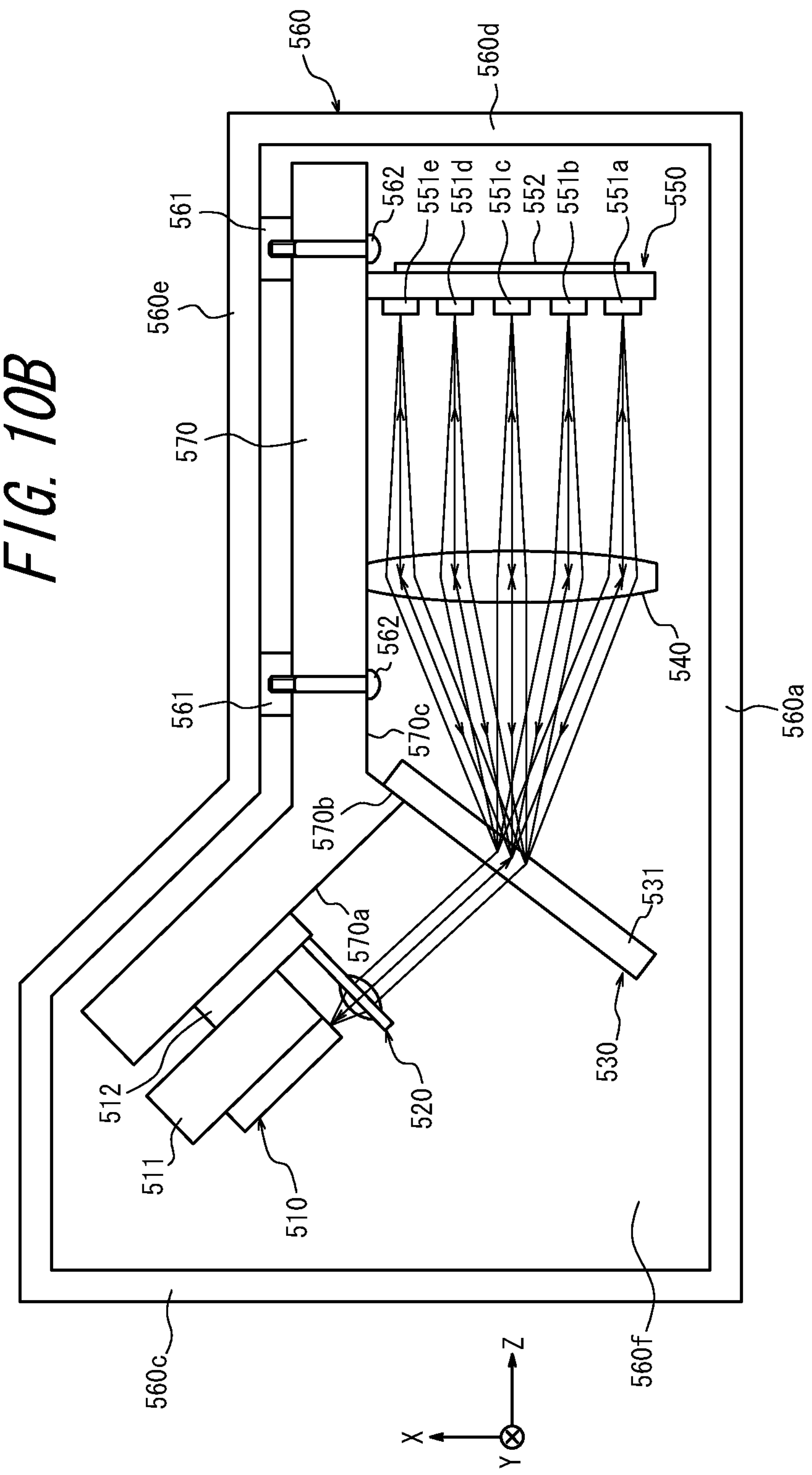
FIG. 10B is a view showing the structure of the substantial part of the wavelength selecting switch according to the fifth embodiment as seen from a direction which is orthogonal to the wavelength dispersing direction by the dispersing portion.

FIGS. 10A and 10B are views schematically showing a structure of a substantial part of a wavelength selecting switch according to a fifth embodiment of the present invention. FIG. 10A is a view of the wavelength selecting switch as seen from a wavelength dispersing direction by a dispersing portion, and FIG. 10B is a view of the wavelength selecting switch as seen from a direction which is orthogonal to the wavelength dispersing direction by the dispersing portion. In the following description, as a matter of convenience, FIG. 10A is assumed to be a front face side and FIG. 10B is assumed to be a plane side.

The wavelength selecting switch is provided with one input port 510*a*, four output ports 510*b* to 510*e*, a micro lens array 520, a dispersing portion 530, a converging lens 540 serving as a converging element, a deflecting portion 550 and a casing 560. In FIGS. 10A and 10B, for showing an internal structure of the casing 560, a front face plate 560*a* of the casing 560 is removed in FIG. 10A, and a top face plate 560*b* of the casing 560 is removed in FIG. 10B. Further, in FIGS. 10A and 10B, a wavelength dispersing direction by the dispersing portion 530 is set to an X direction, a vertical direction to a surface on which a dispersed light spatially expands on the basis of a wavelength dispersion of the dispersing portion 530 is set to a Y direction, and a direction which is orthogonal to the X direction and the Y direction is set to a Z direction. In the case that a deflecting portion material such as a mirror or a prism which is not illustrated is arranged in the light path of the actual wavelength selecting switch for folding the light path, the description of the X direction, the Y direction and the Z direction is used on the assumption of a virtual optical system having no deflecting portion material.

The input port 510*a* and the output ports 510*b* to 510*e* are arranged linearly in the Y direction. Hereinafter, for convenience of explanation, the input port 510*a* and the output ports 510*b* to 510*e* are collectively described as input and output ports 510 appropriately. An end portion of an optical fiber is retained to each of the input and output ports 510. The optical fiber is omitted its illustration for clarifying the drawings. The micro lens array 520 is provided with spherical or aspherical micro lenses 521*a* to 521*e* corresponding to the input ports 510.

A light signal (an input light) which is emitted from the input port 510*a* and is wavelength divided and multiplexed is converted into parallel lights by the corresponding micro lens 521*a* of the micro lens array 520, and is incident to the dispersing portion 530.

The dispersing portion 530 has a dispersing element 531, for example, constructed by a transmission type grating, and disperses the input light from the input port 510*a* to the light signal per wavelength. FIG. 10B exemplifies a case that the dispersing portion 530 can disperse the input light into the light signal per five wavelengths. In the present embodiment, only five wavelengths are exemplified as the dispersed wavelength, however, the number of the wavelengths is not limited to this number.

The converging lens 540 is arranged so that a front focal point position approximately coincides with a dispersing base point of the dispersing element 531, and converges the light signal which is wavelength dispersed by the dispersing portion 530 into the deflecting portion 550. Here, in the case that the input light is wavelength divided and multiplexed by a plurality of discrete wavelengths, the wavelength dispersed light signal is separated per wavelength and converged into the deflecting portion 550. Further, a plurality of light signals converged by the converging lens 540 preferably enter into the deflecting portion 550 approximately vertically as seen from a vertical direction to the wavelength dispersing direction.

The deflecting portion 550 is provided with a plurality of deflecting elements which are arranged linearly in the wavelength dispersing direction of the dispersing portion 530. In the present embodiment, the deflecting portion 550 is exemplified by the case that the deflecting portion is provided with five deflecting elements 551*a* to 551*e*, however, the number of the deflecting elements is not limited to this number. The deflecting elements 551*a* to 551*e* correspond to five wavelengths which are dispersed by the dispersing portion 530, and are structured such that the deflecting elements can be independently driven from each other. Accordingly, each of the light signals per wavelength entering into the deflecting portion 550 is deflected. The deflecting portion 550 which is provided with the array-like deflecting elements 551*a* to 551*e* is constructed, for example, by using a MEMS (micro electro mechanical systems) mirror, a liquid crystal device and an optical crystal.

The light signal per wavelength which is deflected by the deflecting portion 550 is incident as an output light to each of the desired output ports 510*b* to 510*e* via the converging lens 540 and the dispersing portion 530. FIG. 10A exemplifies a case that the output light is incident to the output port 510*c*.

The casing 560 has the front face plate 560*a*, the top face plate 560*b*, left and right side face plates 560*c* and 560*d*, a back face plate 560*e* and a bottom face plate 560*f*, and an area (a project area) of the top face plate 560*b* and the bottom face plate 560*f* is larger than an area (a project area) of the front face plate 560*a*, the left and right side face plates 560*c* and 560*d* and the back face plate 560*e*. Name of each of the faces of the casing 560 is put in the case that FIG. 10A is a front face side as a matter of convenience. Further, FIG. 10A is a view showing while removing the front face plate 560*a*, and FIG. 10B is a view showing while removing the top face plate 560*b*. In the wavelength selecting switch according to the present embodiment, an optical base plate 570 serving as an optical bench is attached to the back face plate 560*e* of the casing 560, the input and output port 510, the dispersing portion 530, the converting lens 540 and the deflecting portion 550 being supported to the optical base plate 570.

The optical base plate 570 is formed by a material having a comparatively small linear expansion coefficient, for example, metal or glass, and is attached to a plurality of (two in the drawing) support tables 561 provided in the back face plate 560*e* by screws 562. In other words, the optical base plate 570 is attached to the back face plate 560*e* in such a manner that support surfaces 570*a*, 570*b* and 570*c* mentioned later intersect, preferably are orthogonal in relation to the top face plate 560*b* and the back face plate 560*f* having the largest project area. In the present embodiment, in order to easily fasten the optical base plate 570 to the back face plate 560*e* of the casing 560, the screws 562 are used, however, the fastening may be achieved by using a pressure sensitive adhesive without being limited to the screws 562. Further, the number of the screws 562 is not limited.

Here, the input and output port 510 is fixed to an input and output unit substrate 512 via a port support substrate 511 by adhesive bonding. Further, the micro lens array 520 is fixed to the input and output unit substrate 512 by adhesive bonding in such a manner that the micro lenses 521*a* to 521*e* correspond to the respective ports 510*a* to 510*e* of the input and output port 510. Further, the input and output unit substrate 512 to which the input and output port 510 and the micro lens array 520 are fixed is supported to the support surface 570*a* of the optical base plate 570 by adhesive bonding. In other words, the input and output port 510 and the micro lens array 520 are unitized so as to be supported by the optical base plate 570. In the present embodiment, taking assembly easiness into consideration, the input and output port 510 and the micro lens array 520 are unitized by using the port support substrate 511 and the unit substrate 512 and are supported by the optical base plate, however, may be structured such that the input and output port 510 and the micro lens array 520 are directly supported by the optical base plate without being unitized and without using the port support substrate 511 and the unit substrate 512.

Further, the dispersing element 531 constructing the dispersing portion 530 is supported by the support surface 570*b* of the optical base plate 570. The dispersing element 531 is fixed to the support surface 570*b* of the optical base plate 570 by adhesive bonding. Each of the converging lens 540 and the deflecting portion 550 is fixed to the support surface 570*c* of the optical base plate 570 by adhesive bonding. A flexible substrate 552 connected to the deflecting portion 550 is derived to an external portion through an extraction port 560*g* formed in the bottom face plate 560*f*. In order to keep a sealing performance in an internal portion of the casing 560, a gap between the extraction port 560*g* and the flexible substrate 552 is filled by a sealant 563.

Figure 11A:
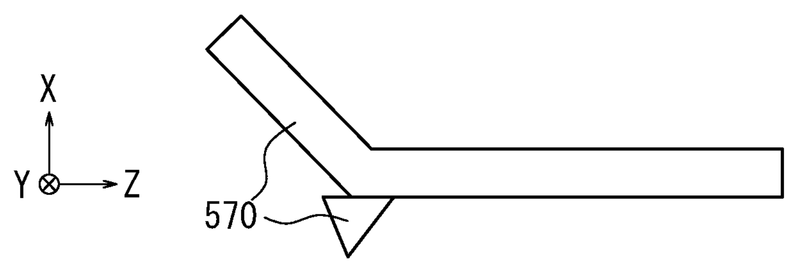
FIG. 11A is a view showing one modified example of an optical base plate of the wavelength selecting switch according to the fifth embodiment.
Figure 11B:
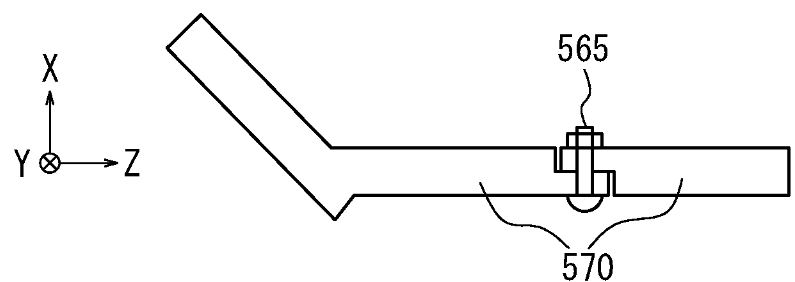
FIG. 11B is a view showing the other modified example of the optical base plate of the wavelength selecting switch according to the fifth embodiment.

The optical base plate 570 can be constructed by being separated into a plurality of members as shown in FIGS. 11A and 11B. At this time, a plurality of members can be coupled by various coupling methods, for example, can be coupled by a pressure sensitive adhesive as shown in FIG. 11A, or can be coupled by screws 565 as shown in FIG. 11B.

As shown in FIG. 10B, the optical base plate 570 is formed as a folded shape that the support surface 570*a* of the input and output unit substrate 512 is inclined in relation to the support surface 570*c* of the dispersing portion 530, the converting lens 540 and the deflecting portion 550 in such a manner that the optical axis of the converging lens 540 and the support surface 570*c* are approximately parallel. Accordingly, the back face plate 560*e* of the casing 560 is folded in conformity to the folded shape of the optical base plate 570. However, the back face plate 560*e* can be formed as a rectangular box shape as a whole of the casing 560, by elongating the support table 561 so as to form a flat shape which is parallel to the front face plate 560*a*. FIG. 10A shows so that the input light from the input port 510*a* enters into the dispersing portion 530, the output light from the dispersing portion 530 vertically emits, and the input and output port 510, the micro lens array 520, the dispersing portion 530, the converging lens 540 and the deflecting portion 550 are arranged linearly in the Z direction, for clarifying the drawing.

As mentioned above, in the present embodiment, the optical base plate 570 is attached to the back face plate 560*e* in such a manner that the support surfaces 570*a*, 570*b* and 570*c* intersect the top face plate 560*b* and the bottom face plate 560*f* having the largest project area. Accordingly, since it is possible to easily secure a necessary thickness of the optical base plate 570 without enlarging a height (thickness) of the casing 560, it is possible to easily thin the casing 560.

One input port 510*a* and four output ports 510*b* to 510*e* are exemplified in FIG. 10A, however, there is a case that the input port 510*a* comes to the output port, and the output ports 510*b* to 510*e* come to the input ports. Further, the numbers of the input port and the output port are not limited to the exemplification, but can be appropriately set. In other words, the wavelength selecting switch according to the present invention is not limited to the case that the input light which is wavelength divided and multiplexed is dispersed per wavelength so as to be output as mentioned above, but includes a case that the wavelength selecting switch is used so as to multiply a plurality of input lights per wavelength so as to output. Further, the input port and the output port are not limited to the case that the input port and the output port are arranged as an array at one position, but include a case that the input port and the output port are spatially separated so as to be arranged at different positions.

Sixth Embodiment

Figure 12A:
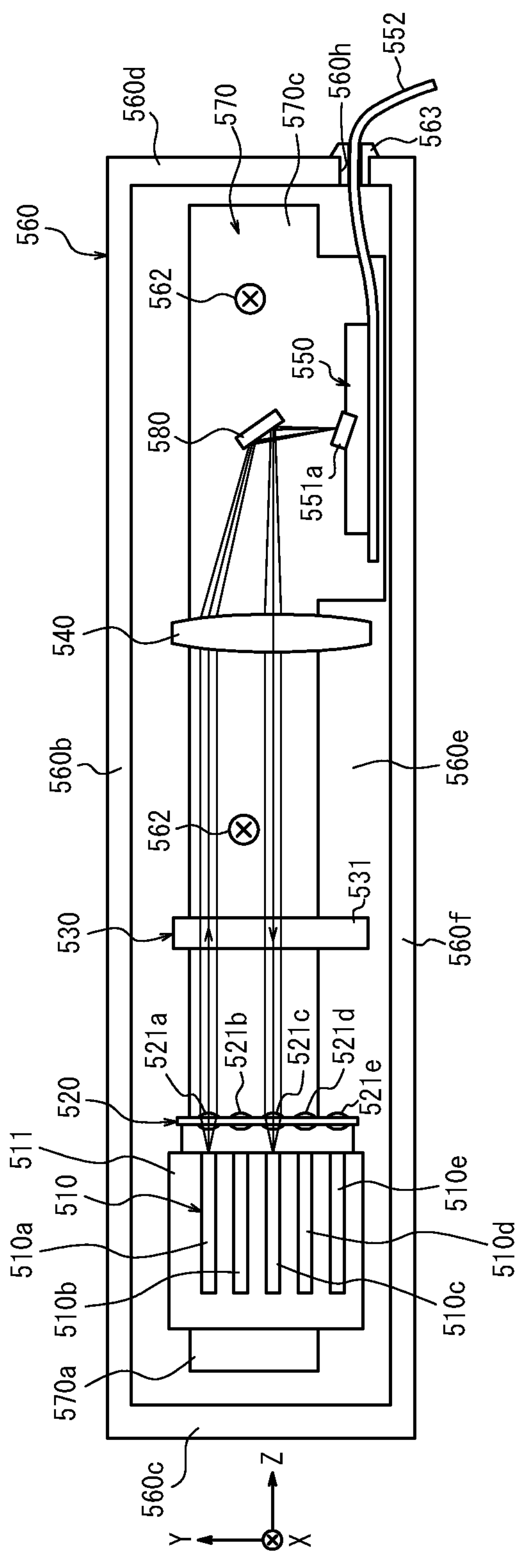
FIG. 12A is a view showing a structure of a substantial part of a wavelength selecting switch according to a sixth embodiment as seen from a wavelength dispersing direction by a dispersing portion.
Figure 12B:
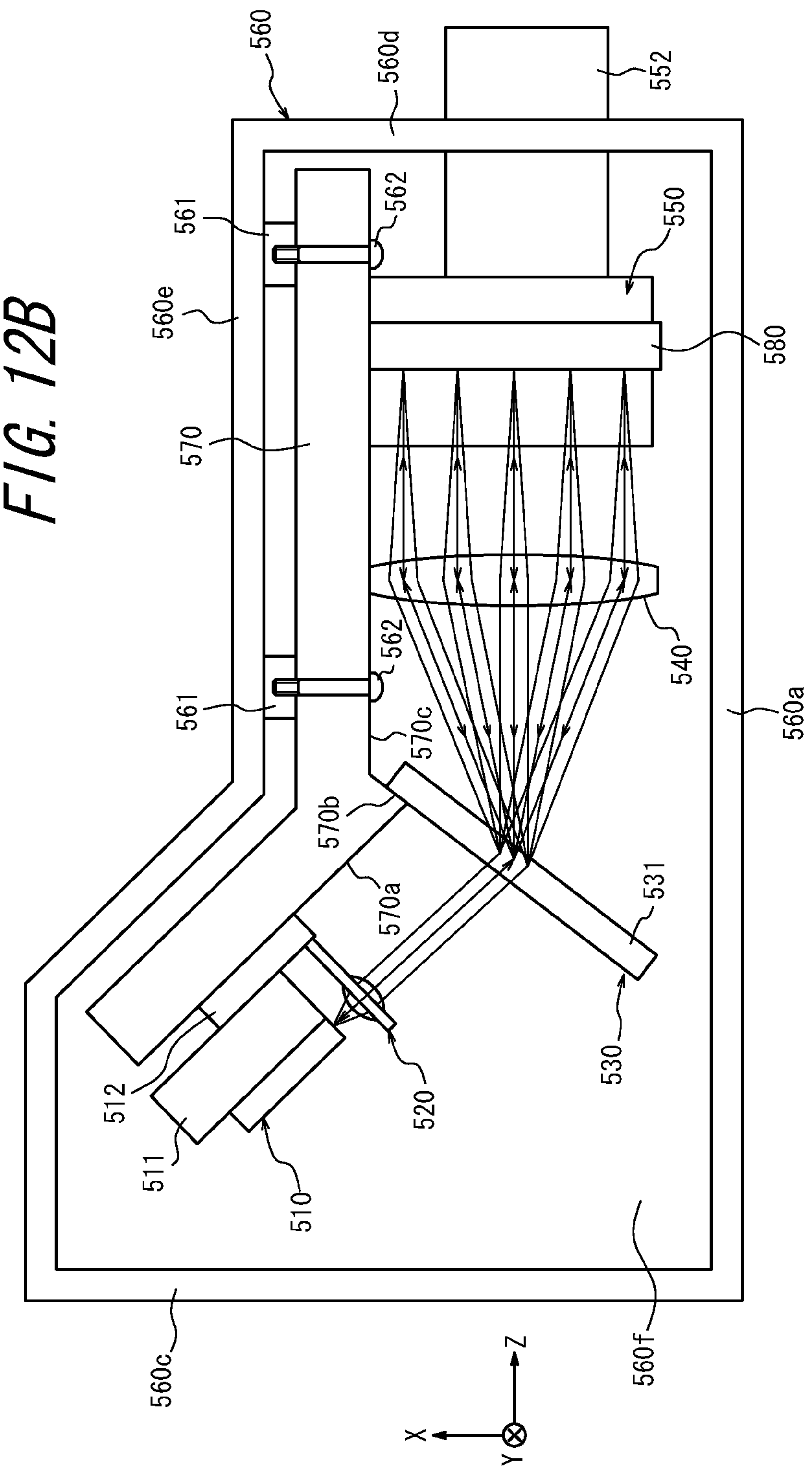
FIG. 12B is a view showing the structure of the substantial part of the wavelength selecting switch according to the sixth embodiment as seen from a direction which is orthogonal to the wavelength dispersing direction by the dispersing portion.

FIGS. 12A and 12B are views schematically showing a structure of a substantial part of a wavelength selecting switch according to a sixth embodiment of the present invention. FIGS. 12A and 12B correspond to FIGS. 10A and 10B, and the same reference numerals are attached to the constructing elements having the same actions as the constructing elements shown in FIGS. 10A and 10B and a description thereof will be omitted.

The wavelength selecting switch according to the present embodiment is structured such that a folding mirror 580 is arranged in a light path between the converging lens 540 and the deflecting portion 550 in the structure shown in FIGS. 10A and 10B, thereby folding the light path approximately at 90 degrees to the bottom face plate 560*f* side. The folding mirror 580 is firmly attached to the support surface 570*c* of the optical base plate 570 by adhesive bonding. Further, the deflecting portion 550 is firmly attached to the support surface 570*c* of the optical base plate 570 by adhesive bonding in a posture that the deflecting portion is rotated approximately at 90 degrees in relation to a posture of the fifth embodiment, in such a manner that the dispersed light which is reflected by the folding mirror 580 enters into the deflecting elements 551*a* to 551*e*. In other words, the deflecting portion 550 is supported to the optical base plate 570 in such a manner that the arranging direction of the deflecting elements 551*a* to 551*e* is approximately parallel to the bottom face plate 560*f*. Further, the flexible substrate 552 of the deflecting portion 550 is derived to the external portion through the extraction port 560*h* formed in the side face plate 560*d*. In order to keep the sealing performance in the internal portion of the casing 560, a gap between the extraction port 560*h* and the flexible substrate 552 is filled by the sealant 563.

As mentioned above, in the present embodiment, the deflecting portion 550 is supported by the optical base plate 570 in such a manner that the arranging direction of the deflecting elements 551*a* to 551*e* of the deflecting portion 550 becomes approximately parallel to the bottom face plate 560*f*, in the structure according to the fifth embodiment. Accordingly, since a magnitude of the deflecting portion 550 is not limited in the arranging direction (X direction) of the deflecting elements 551*a* to 551*e* and the Z direction which is orthogonal thereto, it is possible to easily cope with the increase of the wavelength dividing number, that is, the port number, in addition to the effects of the fifth embodiment.

Seventh Embodiment

Figure 13A:
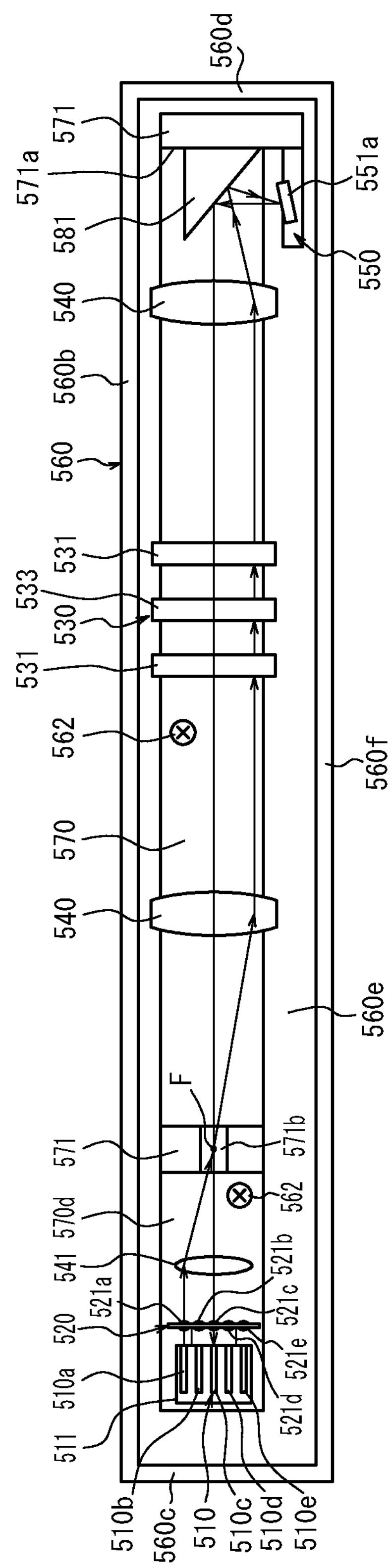
FIG. 13A is a view showing a structure of a substantial part of a wavelength selecting switch according to a seventh embodiment as seen from a wavelength dispersing direction by a dispersing portion.
Figure 13B:
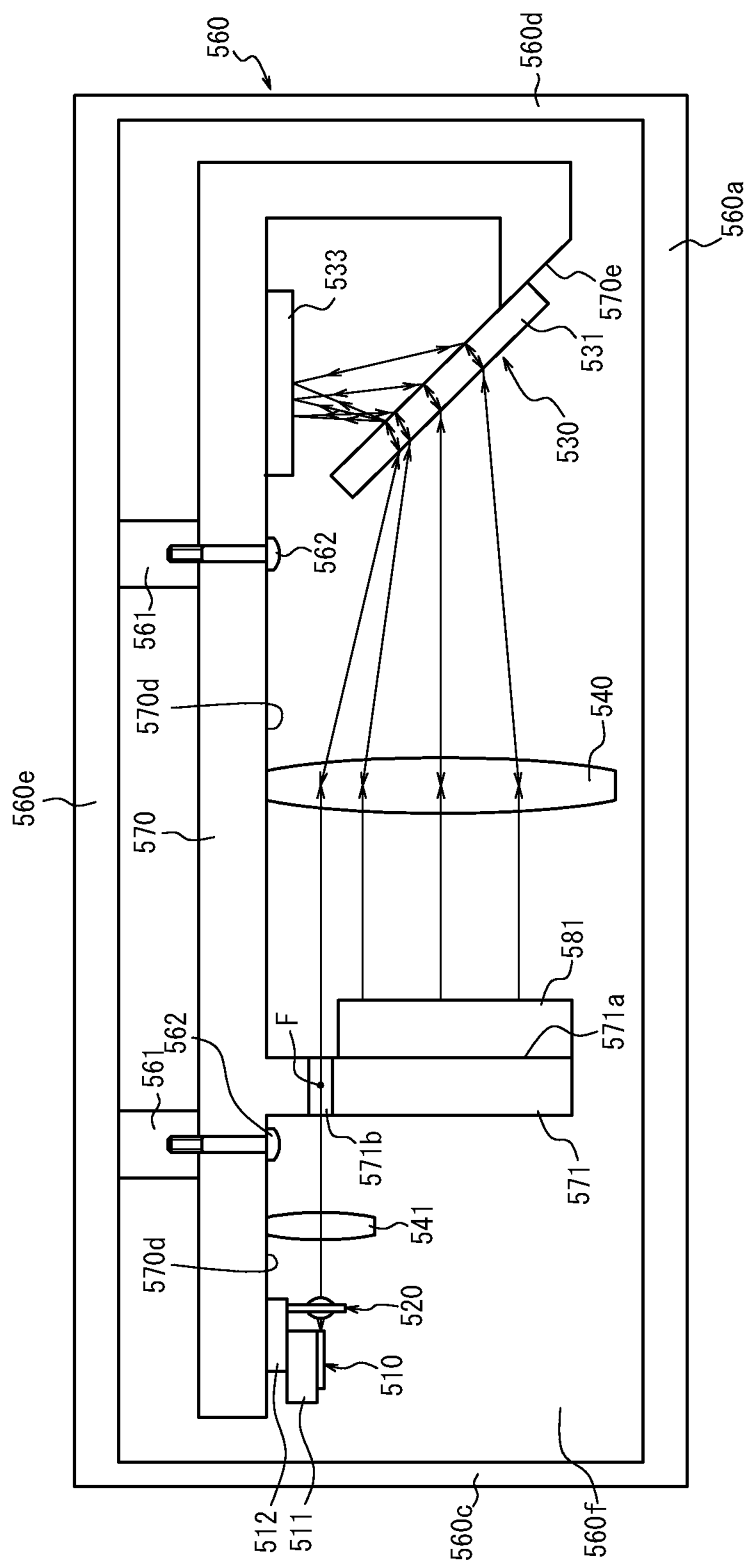
FIG. 13B is a view showing the structure of the substantial part of the wavelength selecting switch according to the seventh embodiment as seen from a direction which is orthogonal to the wavelength dispersing direction by the dispersing portion.

FIGS. 13A and 13B are views schematically showing a structure of a substantial part of a wavelength selecting switch according to a seventh embodiment of the present invention. FIGS. 13A and 13B correspond to FIGS. 10A and 10B, however, FIG. 13A shows by expanding an optical system in FIG. 13B. In the following description, the same reference numerals are attached to the constructing elements having the same actions as the constructing elements shown in FIGS. 10A and 10B and a detailed description thereof will be omitted.

In the wavelength selecting switch according to the present embodiment, a light signal (an input light) which is emitted from the input port 510*a* and is wavelength divided and multiplexed is converted into parallel lights by the corresponding micro lens 521*a*, and is thereafter incident to the converging lens 540 via a converging point F by a primary converging lens 541.

The converging lens 540 is arranged in such a manner that a front focal point position thereof is positioned in the vicinity of the converging point F of the input light by the primary converging lens 541, and makes the input light from the input port 510*a* entering via the converging point F enter into the dispersing portion 530.

The dispersing portion 530 is provided with a dispersing element 531 which is constructed by a transmission type grating, and a folded mirror 533 which is a reflection element, and has a Littman-Metcalf configuration which reflects the dispersed light by the dispersing element 531 by the folding mirror 533 and again makes the dispersed light enter into the dispersing element 531. The dispersing element 531 is arranged in such a manner that a dispersing base point is positioned in the vicinity of a rear focal point position of the converging lens 540.

The light which is wavelength dispersed by the dispersing portion 530 so as to be emitted is converged by the converging lens 540, is deflected approximately at 90 degrees by a reflection prism 581, and is entered into the deflecting elements 551*a* to 551*e* which correspond to the wavelength of the deflecting portion 550. Further, the light is independently deflected by the deflecting elements 551*a* to 551*e*, and is entered as an output light into the desired output ports 510*b* to 510*e* via the reflection prism 581, the converging lens 540, the dispersing portion 530, the converging lens 540 and the primary converging lens 541. FIG. 13A exemplifies a case that one of the dispersed lights by the dispersing portion 530 is entered into the output port 510*c*, and FIG. 13B exemplifies a case that one light is dispersed into three wavelengths by the dispersing portion 530.

In the structure mentioned above, the input and output port 510 and the micro lens array 520 are unitized into the input and output unit substrate 512 in the same manner as the fifth embodiment, and are supported to one end portion of the support surface 570*d* of the optical base plate 570. The primary converging lens 541 and the converging lens 540 are fixed to the support surface 570*d* of the optical base plate 570 by adhesive bonding in such a manner that each of optical axes is approximately parallel to the support surface 570*d*.

The dispersing element 531 constructing the dispersing portion 530 is supported to a support surface 570*e* in a leading end portion which extends approximately vertically from the support surface 570*c* in the other end portion of the support surface 570*d* of the optical base plate 570. Further, the folded mirror 533 is supported to the support surface 570*d* of the optical base plate 570. The dispersing element 531 is fixed to the support surface 570*d* of the optical base plate 570 by adhesive bonding. In the same manner, the folded mirror 533 is fixed to the support surface 570*d* by adhesive bonding.

Each of the reflection prism 581 and the deflecting portion 550 is fixed to a support surface 571*a* of a support portion 571 which is formed by protruding approximately vertically from the support surface 570*d* of the optical base plate 570 by adhesive bonding between the primary converging lens 541 and the converging lens 540, and is supported to the optical base plate 570. The support portion 571 is formed in the optical base plate 570 in such a manner as to cut across the primary converging point by the primary converging lens 541 or the light path in the vicinity thereof, and an opening portion 571*b* serving as a light transmitting portion is formed in a portion through which the input light and the output light in relation to the input and output port 510 pass.

Further, the optical base plate 570 is attached to the support table 561 provided in the back face plate 560*e* by screws 562 in such a manner that the support surfaces 570*d*, 570*e* and 571*a* intersect, preferably are orthogonal, in relation to the top face plate 560*b* and the bottom face plate 560*f* having the largest project area, in the same manner as the fifth embodiment. FIG. 13A shows the optical element on which the input light and the output light act, by expanding linearly in the Z direction, between the input and output port 510 and the reflection prism 581.

According to the present embodiment, since the optical base plate 570 is attached to the back face plate 560*e*, it is possible to easily secure a necessary thickness of the optical base plate 570 without enlarging the height (thickness) of the casing 560 in the same manner as the above embodiment. Accordingly, it is possible to easily thin the casing 560.

Further, in the present embodiment, the input light from the input port 510*a* is wavelength dispersed by the dispersing portion 530 having the Littman-Metcalf configuration via the primary converging lens 541 and the converging lens 540, and is thereafter deflected by the deflecting portion 550 via the reflection prism 581. Further, the deflected light is output from the output port 510*c* via the reflection prism 581, the dispersing portion 530, the converging lens 540 and the primary converging lens 541. Further, since the support portion 571 supporting the reflection prism 581 and the deflecting portion 550 is arranged at the primary converging point by the primary converging lens 541 or the position which cuts across the light path in the vicinity thereof, it is possible to make the opening portion 571*b* transmitting the input light and the output light small. As a result, it is possible to make the support portion 571 itself small. Therefore, it is possible to enlarge a spatial expanding width of the dispersing light in the disperse light path while being formed as a compact structure as a whole, and it is possible to achieve an improvement of S/N of the output light and a reduction of a cross talk.

Further, since the deflecting portion 550 is supported by the support portion 571 in such a manner that the arranging direction of the deflecting elements 551*a* to 551*e* is approximately parallel to the bottom face plate 560*f*, it is possible to easily cope with the increase of the wavelength dividing number, that is, the increase of the port number, in the same manner as the sixth embodiment.

Figure 14:
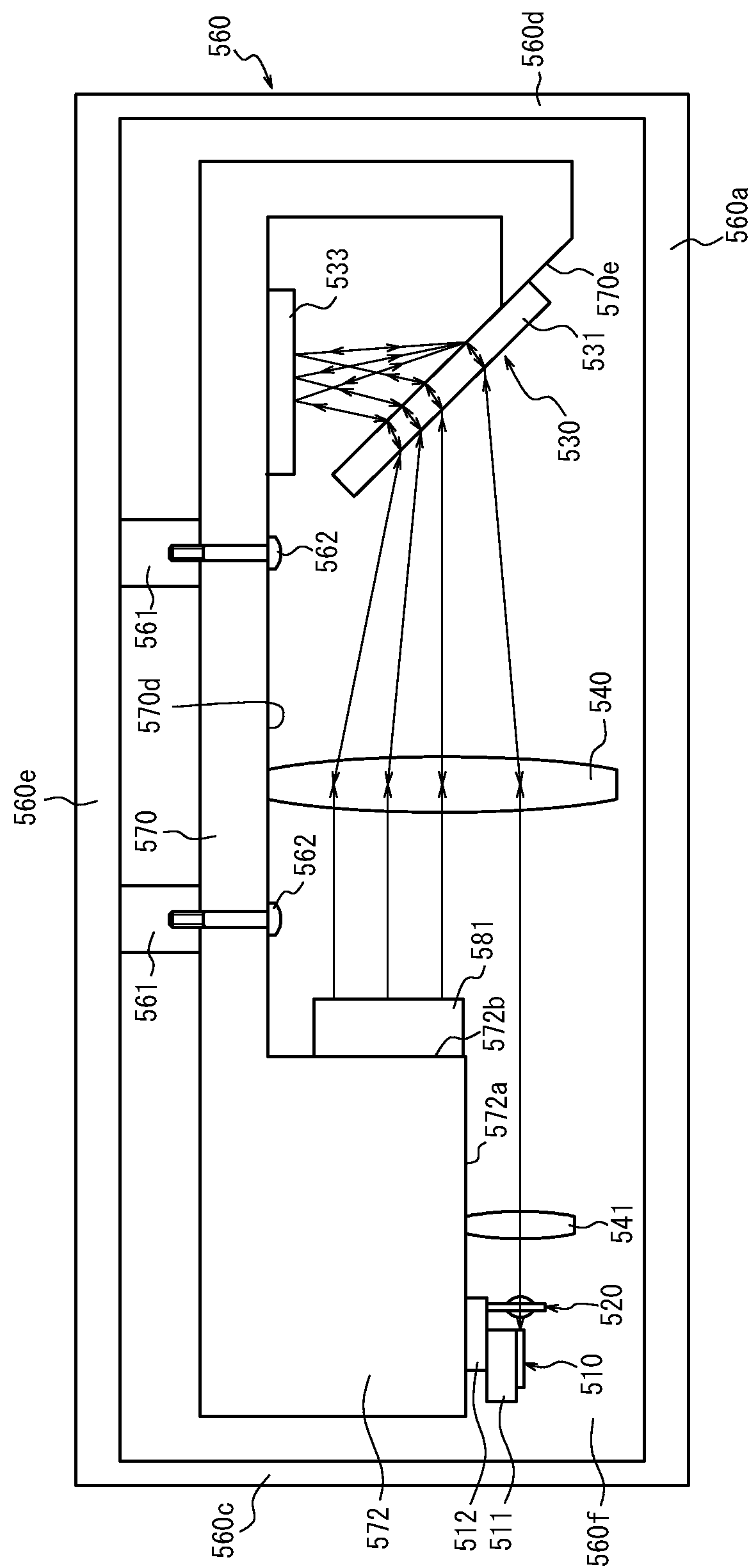
FIG. 14 is a view showing a modified example of the seventh embodiment.

In the wavelength selecting switch according to the seventh embodiment, as shown in FIG. 14, the light paths of the input light and the output light can be set to be spaced from a support post 572 by forming the block-shaped support post 572 in one end portion of the optical base plate 570, attaching the input and output unit substrate 512 obtained by unitizing the input and output port 510 and the micro lens array 520 to a front face side support surface 572*a* of the support post 572, and attaching the reflection prism 581 and the deflecting portion 550 (not shown) or only the deflecting portion 550 to a side face side support surface 572*b*.

Eighth Embodiment

Before describing in detail an eighth embodiment, a description will be given of basic structure and action of the wavelength selecting switch with reference to a side elevational view in FIG. 15A and a top elevational view in FIG. 15B.

A wavelength selecting switch 601 is structured such as to include an input and output portion 610, a micro lens array 611, cylindrical lens 612 and 613, a lens 614, a dispersing portion 615, a lens 616 constructing a converging portion, and a deflector 617 constructing a deflecting portion.

Figure 15A:
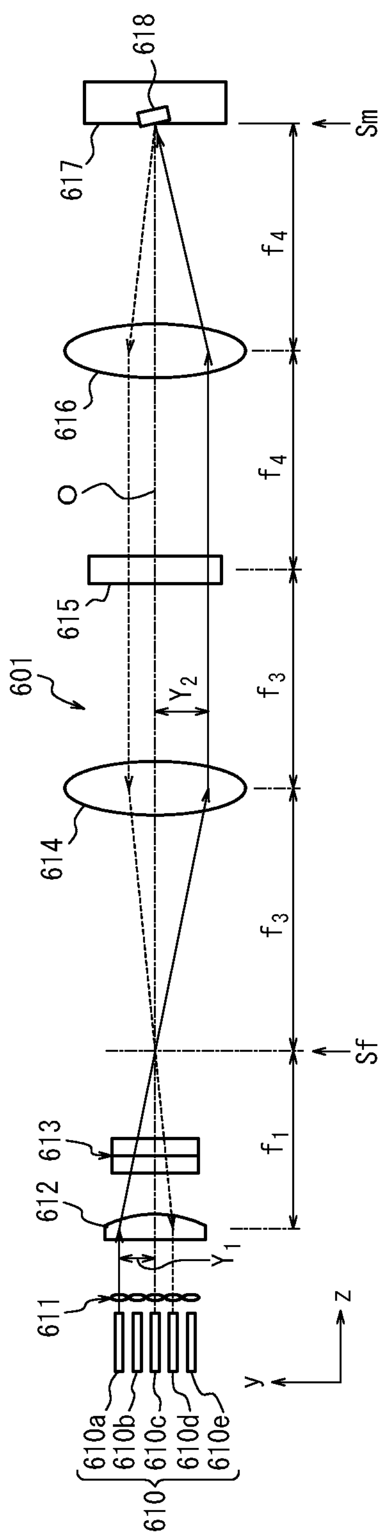
FIG. 15A is a side elevational view describing a basic structure of the wavelength selecting switch.
Figure 15B:
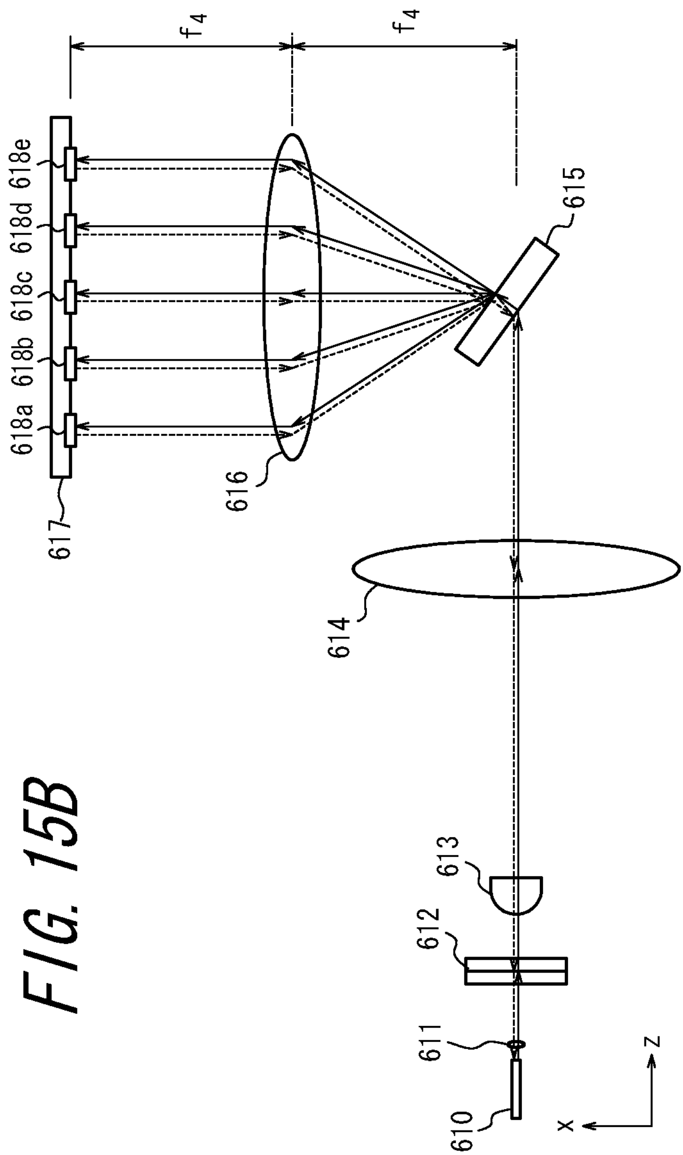
FIG. 15B is a top elevational view describing the basic structure of the wavelength selecting switch.

In FIGS. 15A and 15B, the input and output portion 610 is provided with an input port 610*a* and output ports 610*b* to 610*e* which are constructed by optical fibers arranged like an array. The input port 610*a* and the output ports 610*b* to 610*e* are structured respectively such as to input a wavelength multiplexed signal light from an external portion of the wavelength selecting switch 601 and output the signal light to the external portion. Hereinafter, for convenience of explanation, the input port 610*a* and the output ports 610*b* to 610*e* are collectively described the input and output ports 610*a* to 610*e* appropriately. One end portion of each of the optical fiber exists in the wavelength selecting switch 601, and the other end thereof is connected to the external portion of the wavelength selecting switch 601. The number of the input and output ports is set, for example, equal to or more than 10, and the number of the output ports can be set to be more than the number of the input ports. However, in FIG. 15A, for convenience of explanation, only five input and output ports 610*a* to 610*e* arranged in series centering on the input and output port 610*c* are illustrated.

Further, each of the input and output ports 610*a* to 610*e* and each of the micro lenses in the micro lens array 611 form a pair. Each of the micro lenses converts the light input from the input port 610*a* into parallel light fluxes, and couples the parallel light fluxes output toward the output ports 610*b* to 610*e* to the optical fiber. Further, the light which is input into the wavelength selecting switch 601 through the input port 610*a* and the micro lens of the micro lens array 611, and the light which is output toward the corresponding micro lens to the output ports 610*b* to 610*e* form the parallel light fluxes.

In the following description, a forward moving direction of the parallel lights passing through the input and output port 610*a* and the corresponding micro lens of the micro lens array 611 is set to an optical axis direction (z direction). The optical axis direction is also an optical axis direction of an optical system which is constructed by a combined lens constituted by the cylindrical lenses 612 and 613 and the lens 614. Further, a direction in which the input and output ports 610*a* to 610*e* and the micro lens array 611 are arranged is set to a first direction (y direction). The optical axis direction and the first direction (y direction) are orthogonal to each other. Further, a direction which is orthogonal to each of the optical axis direction (z direction) and the first direction (y direction) is called as a second direction (x direction).

The cylindrical lens 612 is a lens which contracts the light flux in the first direction (y direction), that is, has a refracting power in the first direction (y direction). A focal distance in the first direction (y direction) by the cylindrical lens 612 is $f_1$. Further, the cylindrical lens (anamorphic lens) 613 is a lens which contracts the light flux in the second direction (x direction), that is, has a refracting power only in the second direction (x direction). A focal distance in the second direction (x direction) by the cylindrical lens 613 is set such that a converging position coincides with the cylindrical lens 612. In other words, the focal distance of the cylindrical lens 613 is shorter than the focal distance $f_1$ of the cylindrical lens 612. Accordingly, the input light coming to the parallel lights by the micro lens 611 is converged approximately on a primary converging surface Sf by the cylindrical lenses 612 and 613.

A front focal point position of the lens 614 coincides with the converging position of the input light by the cylindrical lenses 612 and 613. In other words, the front focal point position of the lens 614 is positioned on the primary converging surface Sf. Further, the optical axis of the optical system including the cylindrical lenses 612 and 613 and the lens 614 is arranged so as to pass through the input and output port 610*c* along the z axis direction. Further, the dispersing portion 615 is arranged at a position where a distance between the primary converging surface Sf and the lens 614, and a distance between the lens 614 and the dispersing (diffracting) surface of the dispersing portion 615 are both equally a focal distance $f_3$ of the lens 614. The dispersing portion 615 is constructed, for example, by a diffraction grating in which parallel gratings in the first direction (y direction) are formed on the dispersing surface. As the dispersing portion 615, a resolving power of the light per wavelength is desirably higher and a dispersing angle is desirably larger.

As shown in FIG. 15B, the input light passing through the lens 614 enters as the approximately parallel lights into the dispersing portion 615, and is dispersed at different angles per wavelength in the x direction on the dispersing surface of the dispersing portion 615. In other words, the dispersing portion 615 separates the input light into the lights per wavelength included in the input light. For simplicity reason, the light path in the z direction from the input portion 610 to the deflector 617 is linearly shown in FIG. 15A.

Further, the lens 616 and the deflector 617 are arranged such that each of a distance from the dispersing surface of the dispersing portion 615 to the lens 616, and a distance from the lens 616 to the deflecting element surface (mirror surface) of the deflecting element 618 of the deflector 617 comes to a focal distance $f_4$ of the lens 616. Accordingly, as shown in FIG. 15B, the light per wavelength dispersed by the dispersing portion 615 comes to a light ray having parallel main light rays in each of the wavelengths by the lens 616, and enters approximately vertically into the deflecting elements 618*a* to 618*e* corresponding to the wavelengths. Further, as shown in FIG. 15A, the input light passing through the converging point on the primary converging surface Sf is dispersed by the dispersing portion 615, and thereafter converges at a height position where the optical axis of the lens 616 and the deflecting element surface of the deflecting element 618 intersect within a yz plane.

The deflector 617 is constructed, for example, by a MEMS mirror array, and the deflecting element 618 is constructed by a micro mirror forming the MEMS mirror array. The deflecting elements 618 are arranged in parallel in the x direction in correspondence to the separated wavelength. The deflecting element 618 can independently controls the mirrors so as to change the incline. Particularly, the deflecting element reflects the incident light per wavelength in a different height direction from the incident direction by changing the incline in the yz plane in FIG. 15A. As shown in FIG. 15B, the light per wavelength enters vertically into the deflecting elements 618*a* to 618*e* as seen from the y axis direction, and is reflected vertically.

The light per wavelength reflected by each of the deflecting elements 618*a* to 618*e* is diffracted by the dispersing portion 615 through the lens 616, and is output to any of the output ports 610*b* to 610*e* of the input and output portion 610 through the light path in the opposite direction to the input light.

In FIG. 15A, a distance position of the input and output port 610*a* from the optical axis of the optical system constructed by the cylindrical lenses 612 and 613 and the lens 614 is $Y_1$. The input light from the input and output port 610*a* is converged onto the primary converging surface Sf as shown by a solid line in FIG. 15A, thereafter comes to parallel lights having a distance $Y_2$ from the optical axis by the lens 614, is dispersed per wavelength by the dispersing portion 615, and converges into the deflecting elements 618*a* to 618*e* per wavelength.

Here, in the case that at least one wavelength light in the lights input to the deflecting elements 618*a* to 618*e* is output from the input and output port 610*d*, a particular wavelength light is reflected in a predetermined direction as shown by a broken line in FIG. 15A by controlling the deflecting direction of the corresponding deflecting element 618. The particular wavelength light reflected by the deflecting element 618 passes through the lens 616, and is output from the input and output port 610*d* via the dispersing portion 615, the lens 614, the cylindrical lenses 613 and 612, and the corresponding micro lens of the micro lens array 611. In the case that a plurality of output wavelength lights exist in the same input and output port 610*d*, a plurality of wavelength lights are combined by the dispersing portion 615.

Next, a description will be in detail given of the eighth embodiment with reference to the accompanying drawings.

Figure 16:
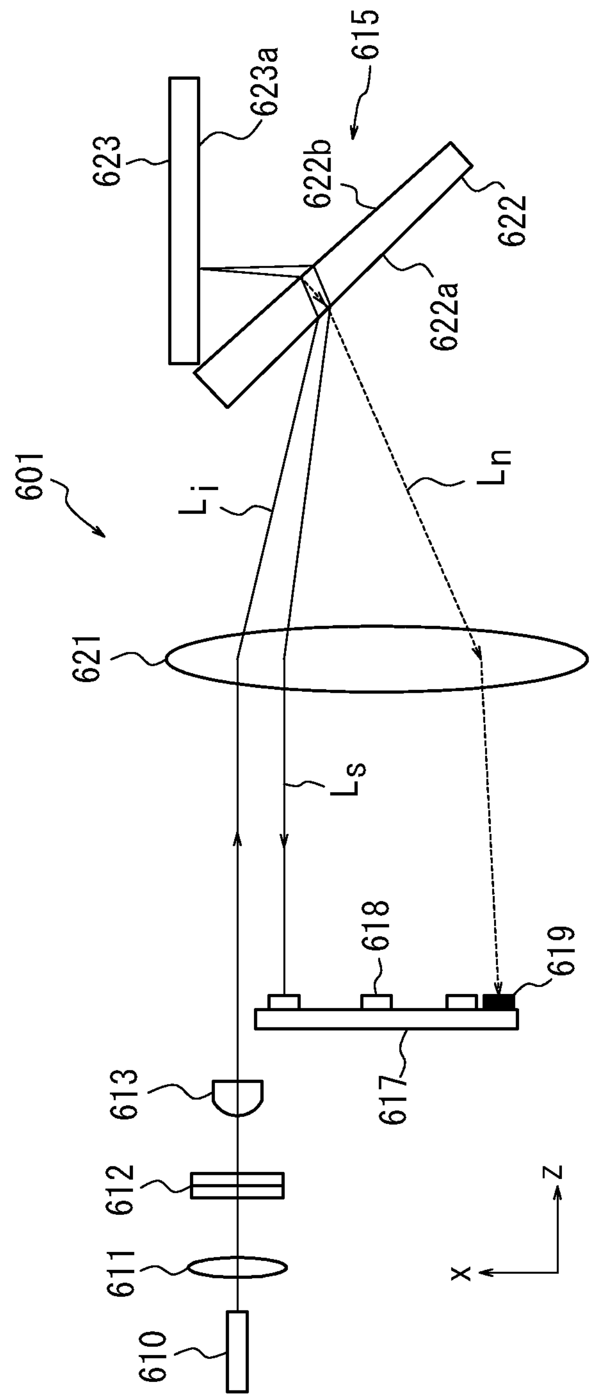
FIG. 16 is a top elevational view showing an outline structure of a wavelength selecting switch according to an eighth embodiment.

FIG. 16 is a top elevational view showing an outline structure of the wavelength selecting switch 601 according to the eighth embodiment of the present invention. The wavelength selecting switch 601 employs the Littman-Metcalf type dispersing portion 615 which is constructed by a dispersing element 622 constituted by transmission type diffraction gratings and a mirror (a reflection element) 623, in the wavelength selecting switch 601 described in FIGS. 15A and 15B. Further, in the wavelength selecting switch 601, the converting lens 621 doubles as the lens 614 and the lens 616 in FIGS. 15A and 15B by folding back the light path of the light dispersed per wavelength by the dispersing portion 615. A description will be in detail given below.

The wavelength selecting switch 601 according to the eighth embodiment is structured such as to include the input and output portion 610, the micro lens array 611, the cylindrical lenses 612 and 613, the converging lens 621, the transmission type dispersing element 622, the mirror (the reflection element) 623 and the deflector 617.

The input and output portion 610, the micro lens array 611, and the cylindrical lenses 612 and 613 are the same optical elements as described in the basic structure mentioned above. The converging lens 621 is arranged between the cylindrical lens 613 and the dispersing element 622, in such a manner that the distance in the z direction between the converging lens 621 and the converging point by the cylindrical lenses 612 and 613. and the distance from the center of the dispersing element 622 become equal to the focal distance of the converging lens 621. Here, the optical axis of the optical system constructed by the micro lens of the micro lens array 611 and the cylindrical lenses 612 and 613 and the optical axis of the converging lens 621 are arranged so as to be shifted in the second direction (x direction). The height positions in the first direction (y direction) of the optical axes are the same. Further, the deflector 617 is arranged at a position where the converging point by the cylindrical lenses 612 and 613 is approximately equal to the position in the z direction in a state in which the deflecting element 618 is directed to the converging lens 621 side, and is arranged so as to be shifted in the second direction (x direction) to the side where the optical axis of the converging lens 621 passes. In other words, the distance between the converging lens 621 and the deflecting element of the deflector 617 is also the focal distance of the converging lens 621.

The dispersing element 622 and the mirror 623 form the dispersing portion 615 having a so-called Littman-Metcalf type configuration. In other words, the m-order transmission diffraction light by the dispersing element 622 is reflected by the mirror 623, and is again exposed to the m-order diffraction by the dispersing element 622 so as to transmit. As mentioned above, by the transmission through the dispersing element twice and the diffraction, the dispersing angle can be enlarged. Here, m is a desired order which is previously defined at a design time, and is the other integers than 0, for example, 1.

According to the structure mentioned above, the input light input from the input and output port 610*a* of the output portion 610 comes to the parallel lights by the micro lens array 611, is converged by the cylindrical lenses 612 and 613, thereafter comes to the parallel beams by the converging lens 621, and enters into the dispersing portion 615. The input light entering into the dispersing portion 615 is exposed twice the m-order diffraction corresponding to the desired order by transmitting twice the dispersing element 622 so as to be dispersed into the light per wavelength. The dispersed lights per wavelength are respectively converged on the different deflecting elements 618 of the deflector 617 by the converging lens 621. The lights per wavelength are reflected at different angles per wavelength by the deflecting element 618, are folded on the light path until being reflected by the deflecting element 618, and are output from the any input and output ports 610*b* to 610*e* of the input portion 610. Hereinafter, the light passing through the light path is called as a normal light.

On the other hand, in a diffraction grating surface (a second surface 622*b* mentioned later) of the dispersing element 622 of the dispersing portion 615, a m-order reflection diffraction light is generated in addition to the m-order desired transmission diffraction light corresponding to the normal light. Hereinafter, the diffraction light having the different order from the normal light, and the light which is reflected by the surface to be transmitted the normal light or which transmits the surface to be reflected are called as a noise light. In the present embodiment, the m-order reflection diffraction light is designed such that the m-order reflection diffraction light does not enter into the deflecting element 618 of the deflector 617. A description will be given below of details thereof.

Figure 17:
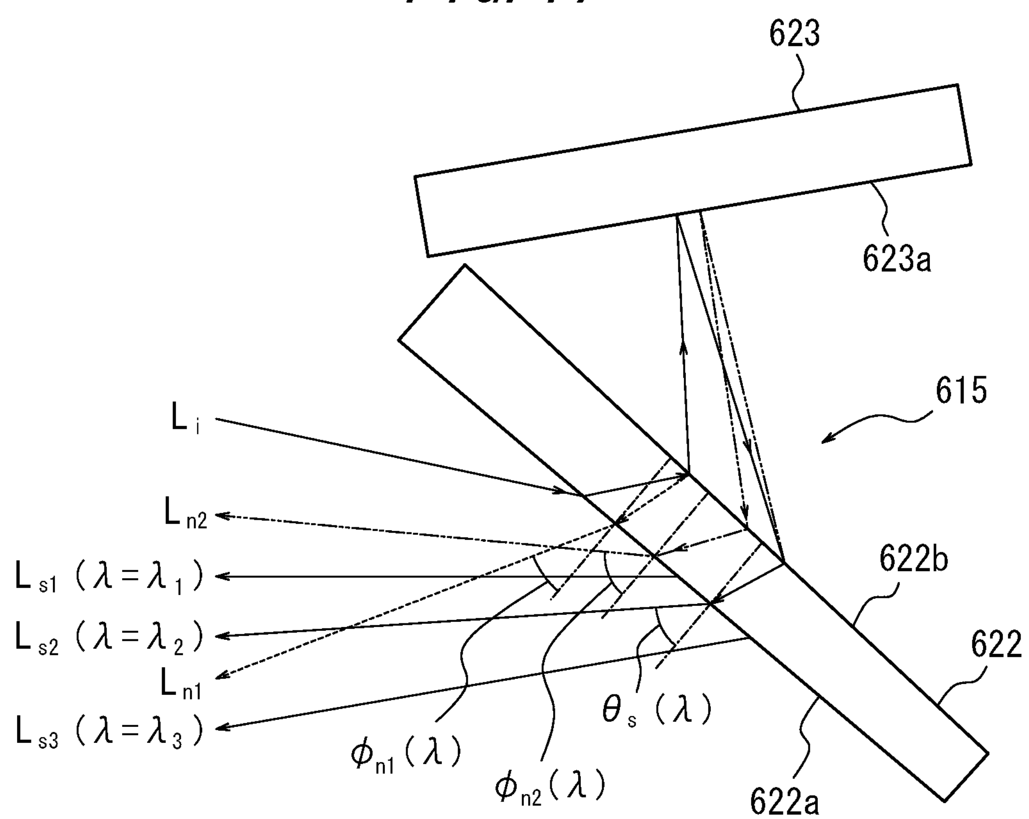
FIG. 17 is a top elevational view describing light paths of a normal light and a noise light in a dispersing portion in FIG. 16.

FIG. 17 is a top elevational view describing the light paths of the normal light and the noise light in the dispersing portion in FIG. 16. In this drawing, $L_i$ denotes a wavelength multiplexed input light, $L_{s1}$, $L_{s2}$ and $L_{s3}$ denote normal lights which are separated per respective wavelengths $\lambda_{s1}$, $\lambda_{s2}$ and $\lambda_{s3}$, and $L_{n1}$ and $L_{n2}$, denote a first noise light and a second noise light. The input light $L_i$ enters into the first surface 622*a* of the dispersing element 622 from an oblique direction at a predetermined angle.

Figure 18:
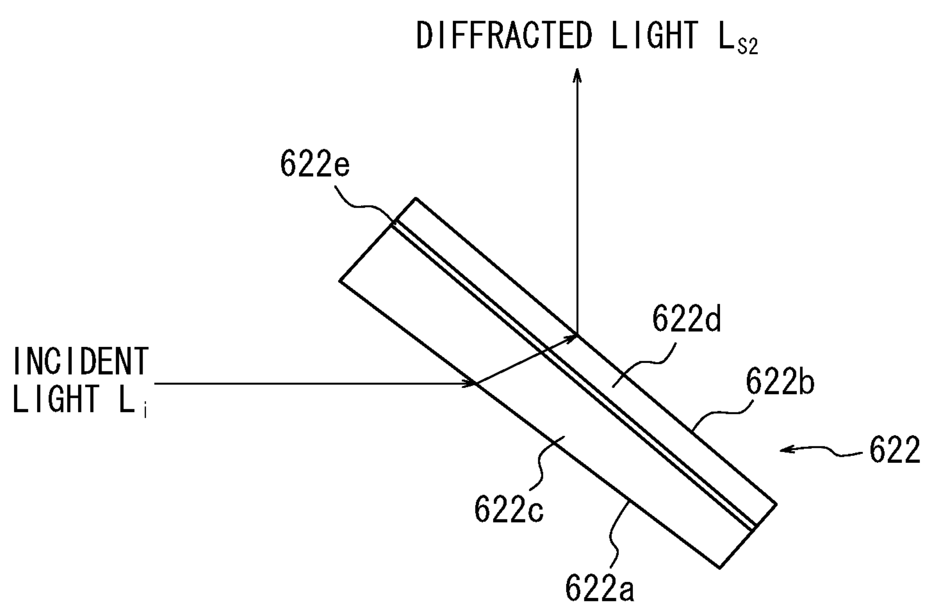
FIG. 18 is a side elevational view showing a structure of a dispersing element in FIG. 16.

FIG. 18 is a view showing a structure of the dispersing element 622 in FIG. 16. In this drawing, the input light $L_i$, and the predetermined wavelength (for example, $\lambda_{s2}$) light in the lights diffracted per wavelength are illustrated. The dispersing element 622 is formed by bonding a transmission type diffraction grating 622*d* and a wedge-shaped prism 622*c* by an adhesive bonding layer 622*e*. The transmission type diffraction grating 622*d* is structured such that one surface of the parallel flat surfaces is set to the diffraction grating surface 622*b*, and the other surface is set to a flat optical surface (hereinafter, refer to as an optical plane) with no diffraction. The wedge-shaped prism 622*c* is constructed by the same material as the transmission type diffraction grating 622*d*, has the optical planes which face to each other, and are not parallel in the optical planes. Further, the adhesive bonding layer 622*e* employs a pressure sensitive adhesive having approximately the same refraction factor as the transmission type diffraction grating 622*d* and the wedge-shaped prism 622*c*.

The diffraction element 622 is not constructed only by the parallel planar transmission type diffraction grating 622*d* which is parallel in its diffraction grating surface to the optical plane, because of the following reasons. In the case that the dispersing element 622 is constructed only by the transmission type diffraction grating 622*d*, the input light, for example, passing through the optical plane is regularly reflected by the diffraction grating surface and the optical plane in the dispersing element 622 respectively, and there is generated a stray light path which receives the m-order diffraction by the diffraction grating surface so as to pass through the diffracting grating surface and emit. In this case, there is generated a problem that the stray light and the normal light form the parallel lights so as to cause interference. In the normal case, the stray light can be suppressed by applying an AR coat onto the optical plane, however, in an optical communication field to which the present invention is applied, since a severe signal quality is requested, a countermeasure by the AR coat is insufficient. Accordingly, the problem of interference is solved by tilting the first surface 622*a* serving as the optical plane of the dispersing element 622 and the second surface 622*b* serving as the diffraction grating surface. In this case, since the diffraction grating having a high quality which is used for the optical communication is manufactured by using a semiconductor process, it is hard to construct the substrate itself as a wedge shape. Therefore, the diffraction grating is manufactured by laminating the transmission type diffraction grating and the wedge-shaped prism.

Further, in the case that a quartz is used as a material of the transmission type diffraction grating 622*d* and the wedge-shaped prism 622*c*, an angle (a wedge angle) between two optical plane of the wedge-shaped prism 622*c* is preferably set to about 4.4 degrees. In this angle, a change of a diffraction angle due to the change of the refraction factor of the dispersing element caused by the temperature change, and a change of the diffraction angle due to the change of a grating constant of the diffraction grating caused by a line expansion are cancelled with each other. Accordingly, even in the case that the temperature of the dispersing element 622 changes within the wavelength selecting switch 601, the emitting angle of the transmission diffraction light does not change. Therefore, the wavelength selecting switch 601 can be used in a wide temperature range without carrying out any position adjustment of the deflector 617.

Figures 19A, 19B:
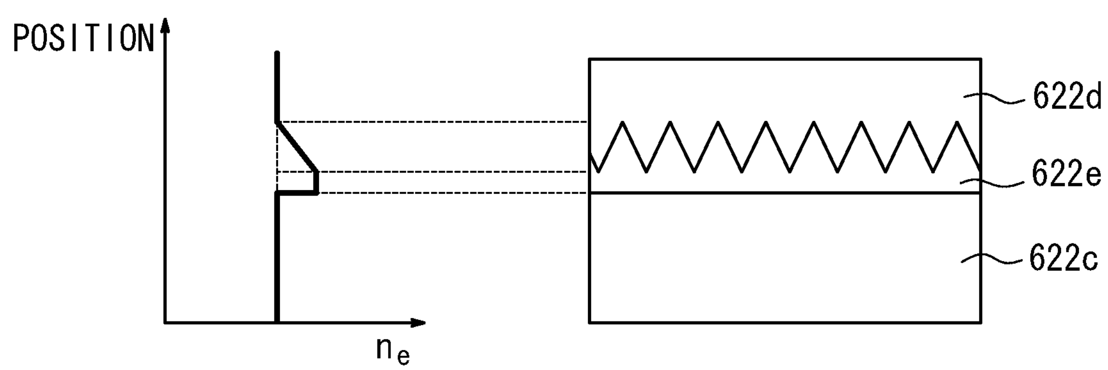
FIGS. 19A and 19B are views describing a joint between a transmission type diffraction grating of the dispersing element in FIG. 18 and a wedge prism.

FIGS. 19A and 19B are views describing the bonding between the transmission type diffraction grating 622*d* of the diffraction grating and the wedge-shaped prism 622*c*, and a change (FIG. 19A) of a refraction factor $n_e$ in relation to a position in a thickness direction of the dispersing element 622 is shown by coordinating with a structure (FIG. 19B) of the dispersing element 622 in the thickness direction. A micro structure which is smaller than the wavelength of the input light is formed in a surface in the adhesive bonding layer 622*e* side of the transmission type diffraction grating 622*d*, as shown in FIG. 19B. As mentioned above, by setting the micro structure, an effective refraction factor change of the adhesive bonding layer 622*e* and the transmission type diffraction grating 622*d* becomes gentle as shown in FIG. 19A, and it is possible to make demand to a refraction factor alignment between the transmission type diffraction grating 622*d* and the pressure sensitive adhesive 622*e* small. As a result, it is possible to suppress a reflection by an interface between the transmission type diffraction grating and the adhesive bonding layer 622*e*. The micro structure is not an essential structure in the present embodiment, and the micro process may not be formed as long as the refraction factor alignment between the transmission type diffraction grating 622*d* and the pressure sensitive adhesive 622*e* has a sufficient precision.

The transmission type diffraction grating 622*d* and the wedge-shaped prism 622*c* may be directly bonded on the basis of an optical contact by precisely grinding the bonded surfaces of the transmission type diffraction grating 622*d* and the wedge-shaped prism 622*c* flat, in place of the adhesive bonding layer 622*e*.

In FIG. 17, the light path of the normal light is as follows. In other words, the input light $L_i$ entering into the dispersing element 622 is refracted by the first surface 622*a* serving as the optical plane of the dispersing element, is exposed to the m-order diffraction by the second surface 622*b* serving as the diffraction grating surface so as to transmit, is reflected by the mirror surface 623*a* of the mirror 623, is again exposed to the m-order diffraction by the diffraction grating surface of the dispersing element 622 so as to transmit, and is emitted as the normal lights $L_{s1}$, $L_{s2}$ and $L_{s3}$ per wavelength. In FIG. 17, $L_{s1}$, $L_{s2}$ and $L_{s3}$ respectively correspond to the different wavelengths $\lambda_1$, $\lambda_2$ and $\lambda_3$ included in the input light, and $\lambda_1$ is the shortest wavelength and $\lambda_3$ is the longest wavelength. In FIG. 17, in the light path of the normal light before being emitted from the dispersing element 622, only the light having the wavelength $\lambda 2$ is shown. Here, m is the other integers than 0, for example, 1.

On the other hand, in the optical system, the first and second noise lights $L_{n1}$ and $L_{n2}$ are generated by the following light path. The first noise light $L_{n1}$ is the light which the input section $L_i$ light is exposed to the m-order diffraction so as to be reflected at a time of entering into the second surface 622*b* of the dispersing element 622 first time. Further, the second noise light $L_{n2}$ is the light which the transmission diffraction light passing through the second surface 522*b* is reflected by the reflection mirror 623, is thereafter exposed to the m-order diffraction so as to be reflected at a time of entering into the diffraction grating surface second time, is further reflected by the mirror 623, and is exposed to the m-order diffraction so as to pass through the second surface 622*b* of the dispersing element 622. The first noise light $L_{n1}$ and the second noise light $L_{n2}$ are designed so that the emitting angle range from the dispersing portion 615 does not lap over the normal light which is diffracted at the desired order m by the diffraction grating 622. If the angle ranges of the lights emitted from the dispersing portion 615 do not overcome, the converging position of the noise light in the deflector does not lap over the converging position of the normal light.

Figure 20:
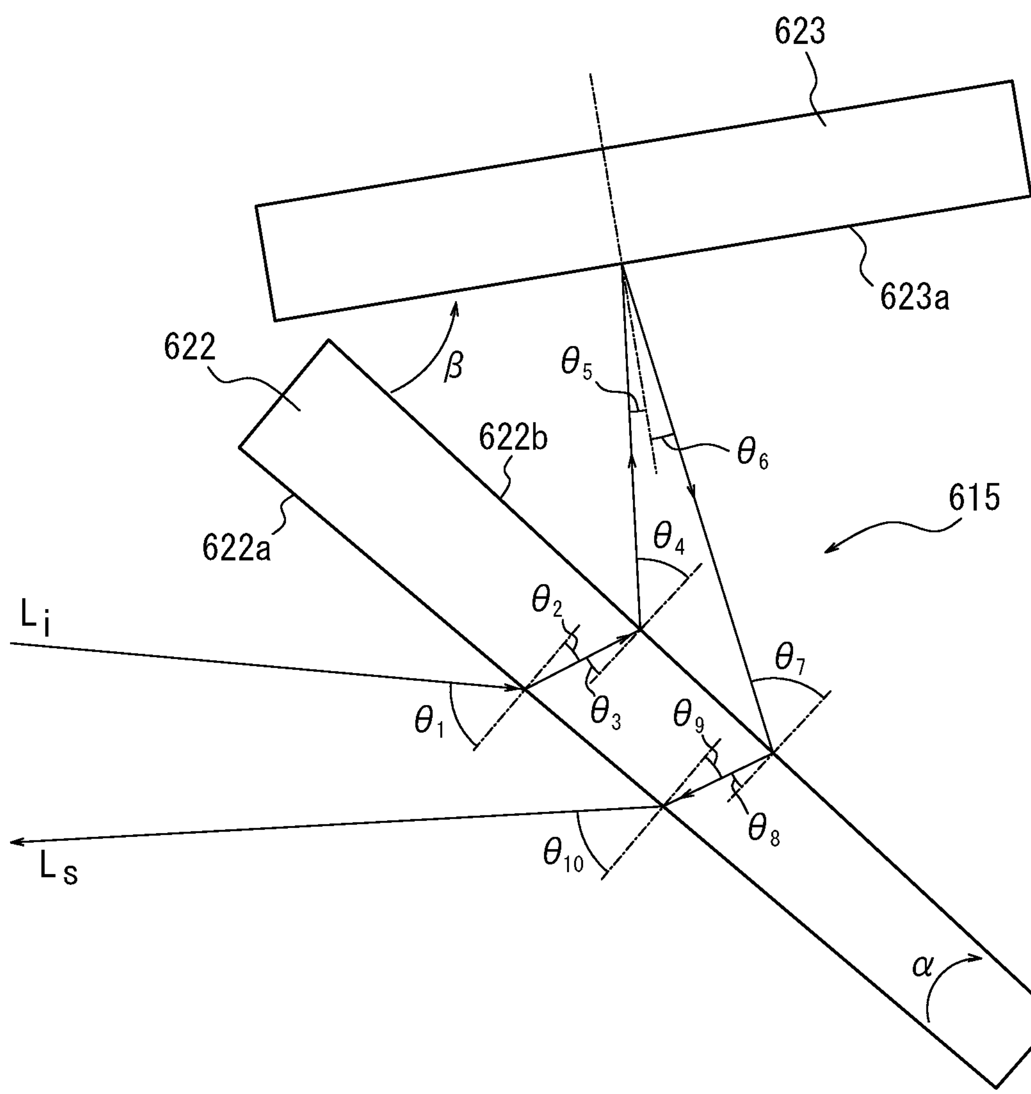
FIG. 20 is a view describing an angular relationship between an optical member constructing the dispersing portion in FIG. 16 and the normal light passing through the dispersing portion.

FIG. 20 is a view describing an angle relationship between the dispersing element 622 and the mirror 623 constructing the dispersing portion 615, and the normal light passing through the dispersing portion. This drawing shows a light path of the normal light $L_s$ about a predetermined wavelength light in the input light $L_i$ In the drawing, $\alpha$ is an angle between the first surface 622*a* serving as the optical plane of the wedge-shaped dispersing element 622, and the second surface 622*b* serving as the diffraction grating surface, and is 4.42 degrees as mentioned above. $\beta$ is an angle between the mirror 623*a* of the mirror 623 and the second surface 622*b* of the dispersing element 622. Further, $\theta_1$ and $\theta_2$ are respectively an incident angle and an emitting angle in relation to the first surface 622$a$ of the dispersing element 622 of the input light $L_i$. $\theta_3$ and $\theta_4$ are respectively an incident angle in relation to the second surface 622$b$ of the dispersing element 622 of the normal light passing through the first surface, and an emitting angle of the normal light exposed to the m-order diffraction. $\theta_5$ and $\theta_6$ are respectively an incident angle and a reflecting angle in relation to the reflection surface 623$a$ of the normal light. $\theta_7$ and $\theta_8$ are respectively an incident angle in relation to the second surface 622$b$ of the dispersing element 622 and an emitting angle of the m-order diffraction transmission diffracted light, in the normal light reflected by the reflection surface 623$a$. $\theta_9$ and $\theta_{10}$ are respectively an incident angle and an emitting angle in relation to the first surface 622$a$ of the normal light passing through the second surface of the dispersing element 622 by being exposed to the diffraction. With regard to $\alpha$ and $\beta$, a direction of an arrow in the drawing is set to positive, and with regard to the other angles, the direction of the light ray from the vertical line of each of the surface is set to positive when the direction is clockwise.

The angles $\alpha$, $\beta$, and $\theta_1$ to $\theta_{10}$ satisfy the following relational expression.

$$n(\lambda)\sin\theta_2(\lambda) = \sin\theta_1(\lambda) \tag{1}$$

$$\theta_3(\lambda) = \theta_2(\lambda) - \alpha \tag{2}$$

$$n(\lambda)\sin\theta_3(\lambda) - \sin\theta_4(\lambda) = \frac{m_1\lambda}{d} \tag{3}$$

$$\theta_5(\lambda) = \theta_4(\lambda) + \beta \tag{4}$$

$$\theta_6(\lambda) = -\theta_5(\lambda) \tag{5}$$

$$\theta_7(\lambda) = \theta_6(\lambda) - \beta \tag{6}$$

$$n(\lambda)\sin\theta_8(\lambda) - \sin\theta_7(\lambda) = \frac{m_2\lambda}{d} \tag{7}$$

$$\theta_9(\lambda) = \theta_8(\lambda) + \alpha \tag{8}$$

$$\sin\theta_{10}(\lambda) = n(\lambda)\sin\theta_9(\lambda) \tag{9}$$

Here, $\lambda$ is a wavelength of the normal light, $n(\lambda)$ is a refraction factor of the member of the dispersing element, d is a grating constant of the diffraction grating, and $m_1$ and $m_2$ are order of diffraction, for example, 1 in the present embodiment. If $\alpha$, $\beta$ and $\theta_1(\lambda)$ are given, $\theta_2$ to $\theta_{10}$ are sequentially defined by the expressions (1) to (9).

Figure 21:
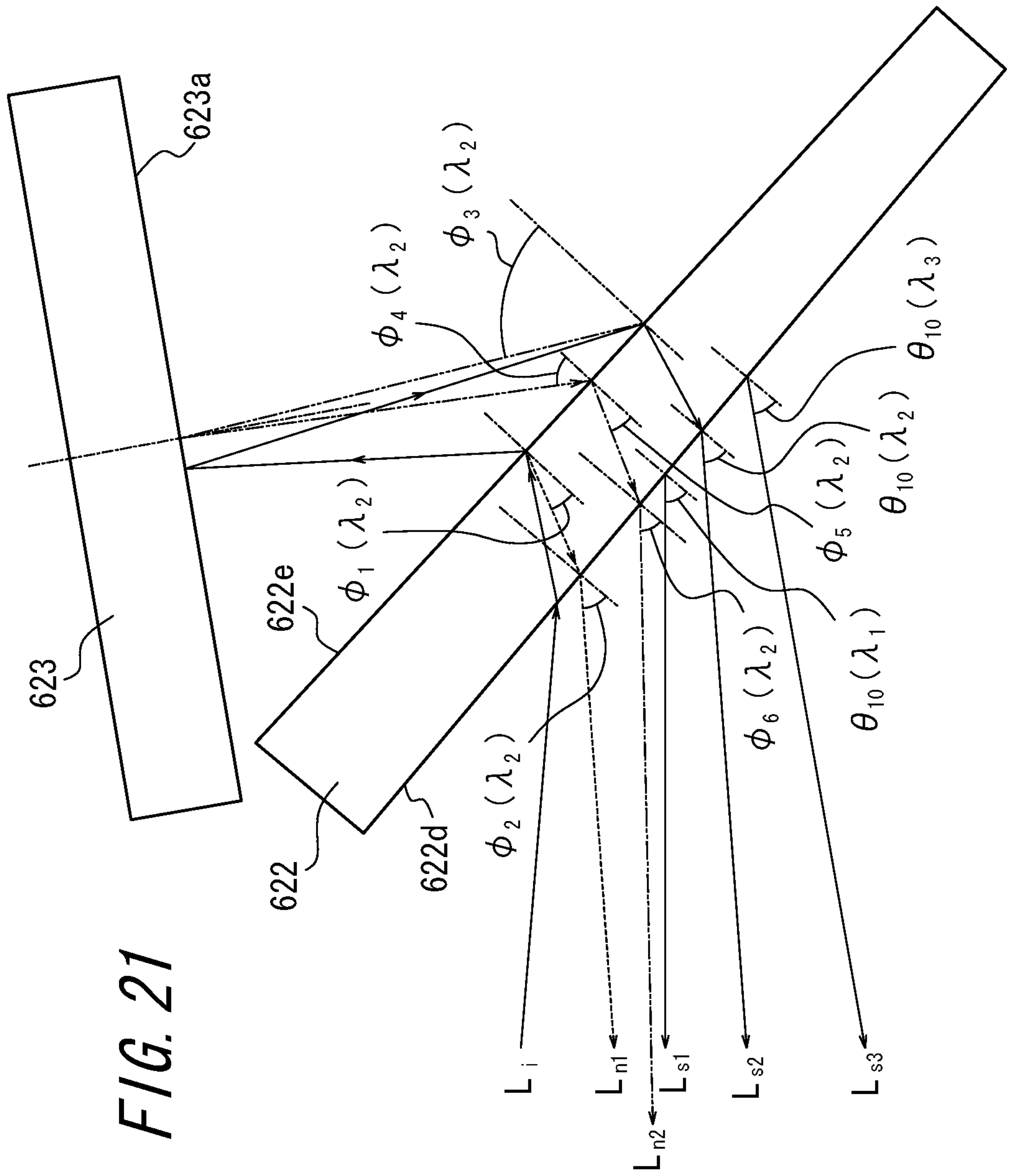
FIG. 21 is a view describing an angular relationship between a noise light generated in the dispersing portion in FIG. 16 and the normal light.

FIG. 21 is a view describing an angular relationship between the noise light and the normal light which are generated in the dispersing portion in FIG. 16. Emitting angles $\theta_{10}(\lambda_1)$, $\theta_{10}(\lambda_2)$ and $\theta_{10}(\lambda_3)$ from the first surface 622$a$ of the dispersing element 622 of the normal lights $L_{s1}$, $L_{s2}$ and $L_{s3}$ are angles which are defined on the basis of the expressions (1) to (9) in the case that the angles $\alpha$, and $\beta$ and the angle $\theta_1$ are given. Further, as the first noise light $L_{n1}$ and the second noise light $L_{n2}$, the light path in the case of the wavelength $\lambda_2$ is shown representatively. In FIG. 21, $\phi_1(\lambda_2)$ is a diffraction angle of reflection in the second surface 622$b$ of the first noise light $L_{n1}$ which the normal light is reflected by being exposed to the m-order diffraction by the second surface 622$b$ of the dispersing element 622, and $\phi_2(\lambda_2)$ is an emitting angle of the first noise light $L_{n1}$ reflection diffracted by the second surface 622$b$ at a time of passing through the first surface 622$a$ of the dispersing element 622. Further, $\phi_3(\lambda_2)$ is a diffraction angle of reflection in the second surface 622$b$ of the second noise light $L_{n2}$ which the normal light transmission diffracted by the second surface 622$b$ of the dispersing element 622 is reflected by the mirror 623$a$ and is thereafter reflected by being exposed to the m-order diffraction at a time of entering into the second surface 622$b$ second time. Further, $\phi_4(\lambda_2)$ and $\phi_5(\lambda_2)$ are respectively an incident angle and a reflection angle in relation to the second surface 622$b$, at a time when the second noise light $L_{n2}$ reflection diffracted by the second surface 622$b$ is again reflected by the mirror surface 623$a$ and passes through the second surface 622$b$ of the dispersing element 622 by being exposed to the m-order diffraction. Further, $\phi_6(\lambda_2)$ is an emitting angle at a time when the second noise light $L_{n2}$ transmission diffracted by the second surface 622$b$ of the dispersing element 622 passes through the first surface 622$a$ of the dispersing element 622.

$\phi_1(\lambda)$ to $\phi_6(\lambda)$ satisfy the following relational expression by using $\alpha$ and $\beta$ and $\theta_1$ to $\theta_{10}$ obtained by the expressions (1) to (9).

$$\sin\theta_3(\lambda) + \sin\phi_1(\lambda) = \frac{m_3\lambda}{dn(\lambda)} \tag{10}$$

$$\sin\phi_2(\lambda) = n(\lambda)\sin(\phi_1(\lambda) + \alpha) \tag{11}$$

$$\sin\phi_3(\lambda) + \sin\theta_7(\lambda) = \frac{m_4\lambda}{d} \tag{12}$$

$$\phi_4(\lambda) = -\phi_3(\lambda) - 2\beta \tag{13}$$

$$n(\lambda)\sin\phi_5(\lambda) - \sin\phi_4(\lambda) = \frac{m_5\lambda}{d} \tag{14}$$

$$\sin\phi_6(\lambda) = n(\lambda)\sin(\phi_5(\lambda) + \alpha) \tag{15}$$

Here, $m_3$, $m_4$ and $m_5$ indicate the order of the diffraction, for example, 1 in the present embodiment. According to the expression (11), the emitting angle $\phi_2(\lambda)$ from the dispersing portion 615 of the first noise light $L_{n1}$ can be obtained. Further, according to the expression (15), the emitting angle $\phi_6(\lambda)$ from the dispersing portion 615 of the second noise light $L_{n2}$ can be obtained.

Figure 22A:
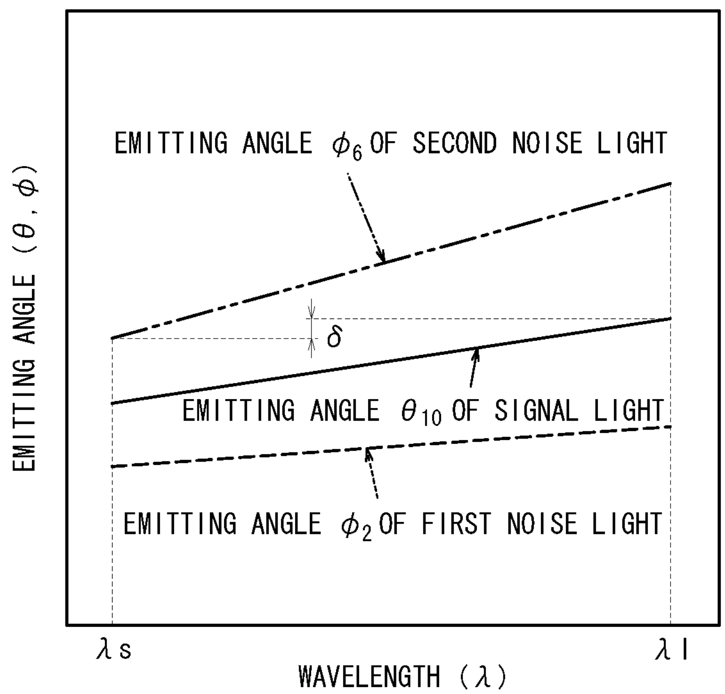
FIG. 22A is a view showing a relationship of an outgoing light in the normal light and the noise light in relation to a wavelength (λ) in the case that interference is generated between the normal light and the noise light.
Figure 22B:
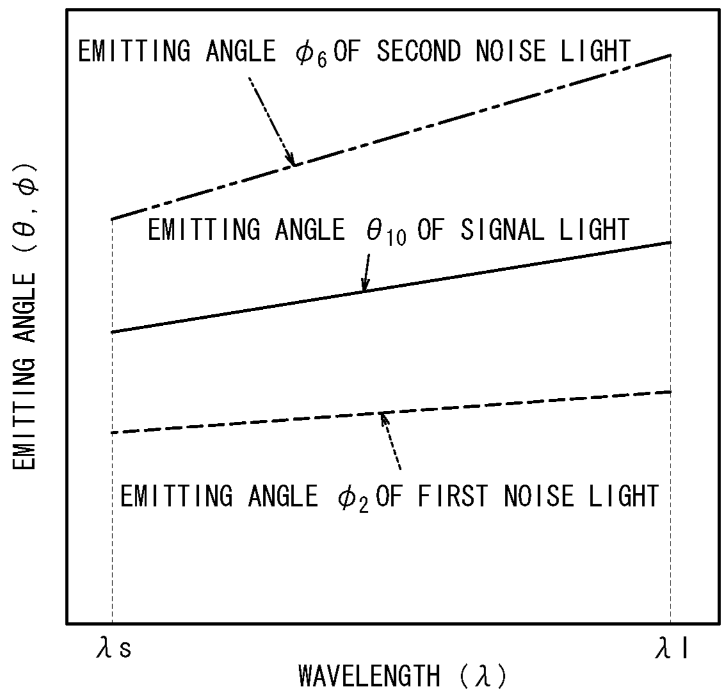
FIG. 22B is a view showing a relationship of an outgoing angle (θ, ϕ) in the normal light and the noise light in relation to the wavelength (λ) in the eighth embodiment.

In the deflector 617, in order to prevent the first noise light $L_{n1}$ and the second noise light $L_{n2}$ from entering into the deflecting element 618 into which the normal light $L_2$ enters, it is necessary for the emitting angle range of the normal light about all the wavelengths $\lambda$ of the wavelength multiplexed input light, and the emitting angle range of the first noise light $L_{n1}$ and the second noise light $L_{n2}$ about all the wavelength to be prevented from overlapping. FIG. 22A is a view showing a relationship of the emitting angles ($\theta$, $\Phi$) in relation to the wavelength ($\lambda$) of the normal light and the noise light in the case that an interference of the normal light and the noise light is generated. Further, FIG. 22B is a view showing a relationship of the emitting angles ($\theta_{10}$, $\phi_2$ and $\phi_6$) in relation to the wavelength ($\lambda$) of the normal light and the noise light in the eighth embodiment. An overlapping portion ($\delta$) exists between the emitting angle of the normal light and the emitting angle of the noise light in the wavelength range between the maximum value $\lambda_1$ and the minimum value $\lambda_s$ of the wavelength $\lambda$ of the input light as shown in FIG. 22A, a noise light undesirably enters into the deflecting element 618 of the deflector 617. It is desirable that the emitting angles of the normal light and the noise light are completely separated as shown in FIG. 22B.

In other words, in the case that the maximum value of the wavelength $\lambda$ of the input light is set to $\lambda_1$, the minimum value is set to $\lambda_s$, and the emitting angles from the dispersing portion 615 of the normal light $L_s$ diffracted by the desired order, the first noise light $L_{n1}$ and the second noise light $L_{n2}$ about the respective wavelengths $\lambda$ of the input light are respectively set to $\theta_o(\lambda)(=\theta_{10})$, $\phi_{o1}(\lambda)(=\phi_2)$ and $\phi_{o2}(\lambda)(=\phi_6)$, these factors may satisfy the following expressions (16) and (17).

$$\max_{\lambda_s\le\lambda\le\lambda_1}\phi_{o1}(\lambda) < \min_{\lambda_s\le\lambda\le\lambda_1}\theta_o(\lambda) \text{ or } \max_{\lambda_s\le\lambda\le\lambda_1}\theta_o(\lambda) < \min_{\lambda_s\le\lambda\le\lambda_1}\phi_{o1}(\lambda) \quad (16)$$

$$\max_{\lambda_s\le\lambda\le\lambda_1}\phi_{o2}(\lambda) < \min_{\lambda_s\le\lambda\le\lambda_1}\theta_o(\lambda) \text{ or } \max_{\lambda_s\le\lambda\le\lambda_1}\theta_o(\lambda) < \min_{\lambda_s\le\lambda\le\lambda_1}\phi_{o2}(\lambda) \quad (17)$$

wherein $$\max_{\lambda_s\le\lambda\le\lambda_1} f(\lambda),\ \min_{\lambda_s\le\lambda\le\lambda_1} f(\lambda)$$

are maximum and minimum value of $f(\lambda)$ in the range of $\lambda_s \le \lambda \le \lambda_1$.

If the incident angle $\theta_1$ of the input light, the angle $\alpha$ (=4.42 degrees), the refraction factor $n(\lambda)$ of the medium of the $\beta$ dispersing element 622, and the parameter of the grating period d of the diffraction grating are given, $\theta_o(\lambda)(=\theta_{10})$, $\phi_{o1}(\lambda)(=\phi_2)$ and $\phi_{o2}(\lambda)(=\phi_6)$ can be calculated on the basis of the expressions (1) to (15). By appropriately setting the parameters, the expressions (16) and (17) can be satisfied in relation to the maximum value $\lambda_1$ and the minimum value $\lambda_s$ of the desired wavelength of the wavelength selecting switch.

Further, as shown in FIG. 16, a light absorbing body 619 is provided as a noise light inhibiting portion at a position where a noise light $L_n$ generated in the dispersing portion 615 enters into an outer side where the reflection element 618 is not arranged on the deflector 617. The light absorbing body 619 is structured such as to inhibit the noise light from being emitted to the output port on the basis of the reflection in the wavelength selecting switch 601. Specifically, the light absorbing body can be formed by using a material including carbon such as a carbon sheet, or a material obtained by mixing a coloring matter having an infrared ray absorbing characteristic to a resin. Here, a member having a reflection surface for reflecting the noise light in a direction that the noise light does not enter into the output ports 610$b$ to 610$e$ may be provided as the noise inhibiting portion in place of the light absorbing body 619. Further, an incident interface of the light absorbing body 619 may be processed as the reflection surface.

Embodiment 1

Table 1 shows design examples 1 to 4 of the dispersing portion 615 of the wavelength selecting switch on the basis of the present invention. In the embodiment, a frequency of the signal light is in a range between 191.3 and 196.3 THz.

TABLE 1

| Parameter | Design Example 1 | Design Example 2 | Design Example 3 | Design Example 4 |
|---|---|---|---|---|
| Medium | Quart | Quart | Quart | Quart |
| 1/d | 950 | 950 | 950 | 950 |
| $\theta_1$ | 59.2 | 47.79 | 64.35 | 52.72 |
| $\alpha$ | 2 | 2 | 4.42 | 4.42 |
| $\beta$ | 43.31 | 53.05 | 43.22 | 53.07 |
| $\theta_{10}$ | 49.28-55.99 | 40.94-46.53 | 54.71-62.35 | 44.90-50.72 |
| $\phi_2$ | 42.64-45.61 | 52.76-56.42 | 47.44-50.61 | 57.45-61.50 |
| $\phi_6$ | 56.70-73.21 | 34.52-39.94 | 63.47-90 | 38.36-43.90 |

In all the design examples 1 to 4 of Table 1, the angle range does not overlap between the emitting angle ($\theta_{10}$) of the normal light and the emitting angle ($\phi_2$, $\phi_6$) of the noise light. Particularly, in the design example 2 and the design example 4, since the incident angle $\theta_1$ of the input light does not lap over the angle range of the noise light, these design examples are advantageous in a point that the cross talk is not generated by the return of the noise light having the particular wavelength into the input port. Further, in the design example 3 and the design example 4, since the angle (wedge angle) $\alpha$ formed by the first surface 622$a$ and the second surface 622$b$ of the dispersing element 622 is set to 4.42 degrees, the refraction factor change of the medium and the change of the grating constant due to the linear expansion act so as to cancel the influences applied to the emitting angle with each other in the case that the temperature change is generated within the casing of the wavelength selecting switch 601. Therefore, the design 4 is more preferable among the design examples 1 to 4.

As mentioned above, according to the present embodiment, since the normal light $L_s$ which is diffracted at the desired order by the diffraction grating, and the noise light $L_n$ which is diffracted at the different order or the different mode from the desired order, are structured such that the emitting angle ranges from the dispersing portion 615 do not overlap, the normal light and the noise light do not enter in an overlapping manner on the deflecting element 618 of the deflector 617. Therefore, a ripple is not generated by the interference between the normal light and the noise light having the same wavelength, on the basis of the incident of the noise light into any output port 610$b$ to 610$e$. Accordingly, it is possible to prevent a transmission band characteristic from being deteriorated due to the undesired diffraction on the diffraction grating surface of the wavelength selecting switch.

Further, since each of the optical members is designed in such a manner as to efficiently pass through the desired path on the interface, a light intensity as the noise light becomes smaller if a frequency of passing through a different path from the desired path is increased. The noise light is efficiently output from the output port in the reciprocating optical system as mentioned above, in the case that the path from the deflector 617 toward the output port becomes in reverse to the path from the input port to the deflector 617. Therefore, in the case of setting a frequency of passing in the different path from the desired path to n, and setting a rate of the different path from the desired path uniformly to S for simplifying, from the input port to the deflector 617, the light intensity of the noise light is in proportion to 2n power of S. Since the noise light path shown by the present embodiment is guided to the deflector 617 with only one different path from the desired path, in each of the interfaces within the dispersing portion, attenuation of the light intensity is smaller than the other paths, and the noise light path is particularly important.

Further, a diffraction efficiency of the diffraction grating is generally designed so as to be the best in the vicinity of a Littrow angle. Further, in the case that a certain incident angle is a Littrow condition for the m-order diffraction of the transmission, this case satisfies by itself the Littrow condition of the m-order diffraction of the reflection. Accordingly, the signal light and the noise light in the present embodiment are necessarily emitted approximately in the same direction from the dispersing portion by designing the optical system of the wavelength selecting switch attaching importance only to the efficiency, and deterioration of the transmission band characteristic is generated. Therefore, in order to inhibit the transmission band characteristic from being deteriorated, it is effective to positively use the structure in the present embodiment.

Further, since the light absorbing member absorbing the noise light is provided as the noise light inhibiting portion for inhibiting the noise light from emitting to the output port in the portion where the deflecting element 618 is not arranged in the deflecting portion 617, the noise light reflected by a part of the deflecting portion approximately existing on the same plane as the deflecting element 618 is prevented from entering as the stray light into the output port.

Further, it is possible to prevent the cross talk from being generated by the return of the noise light having the particular wavelength to the input port, by setting the incident angle of the input light to the dispersing portion so as not to lap over the angle range of the noise light, as shown by the design example 4 of the embodiment.

Ninth Embodiment

Figure 23:
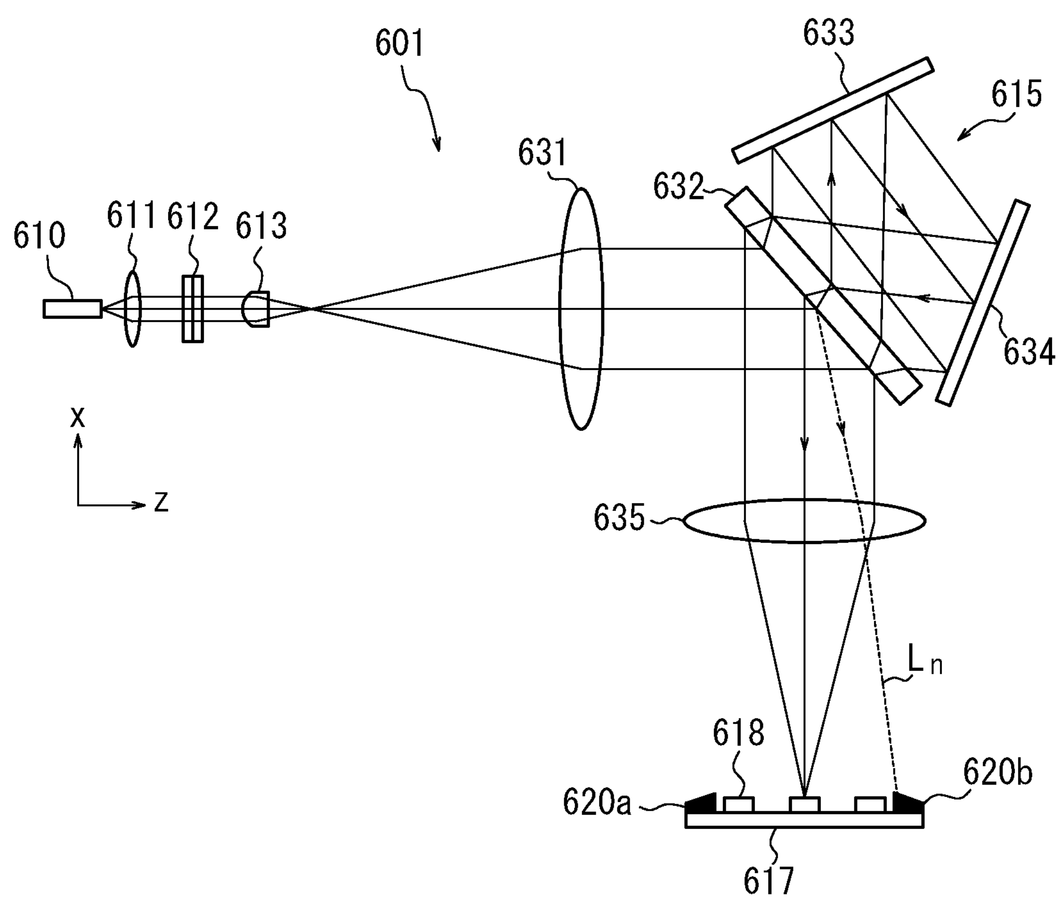
FIG. 23 is a top elevational view showing an outline structure of a wavelength selecting switch according to a ninth embodiment.

FIG. 23 is a top elevational view showing an outline structure of a wavelength selecting switch according to a ninth embodiment of the present invention. In the present embodiment, the dispersing portion 615 in the basic structure mentioned above is constructed by combining a dispersing element 632 and two mirrors 633 and 634. A lens 631 and a lens 635 which are arranged in a front stage and a rear stage of the dispersing portion 615 are constructed by a spherical convex lens, and respectively correspond to the lenses 614 and 616 in the basic structure.

In FIG. 23, among the wavelength multiplexed input lights emitting from the input and output portion 610, only the light path of the normal light having the particular wavelength is shown by a solid line. Further, the noise light $L_n$ which the normal light passing through the optical axis is regularly reflected (that is, reflected in O order) by the dispersing element 632 is shown by a broken line. The broken line only shows an example of the light path of the noise light, however, the wavelength selecting switch 601 according to the present embodiment is designed in such a manner that the emitting angle range from the dispersing portion 615 of the noise light which is regularly reflected by the dispersing element 632 does not lap over the emitting angle range from the dispersing portion 615 of the normal light which is diffracted in the desired order by the dispersing portion 615.

Figure 24:
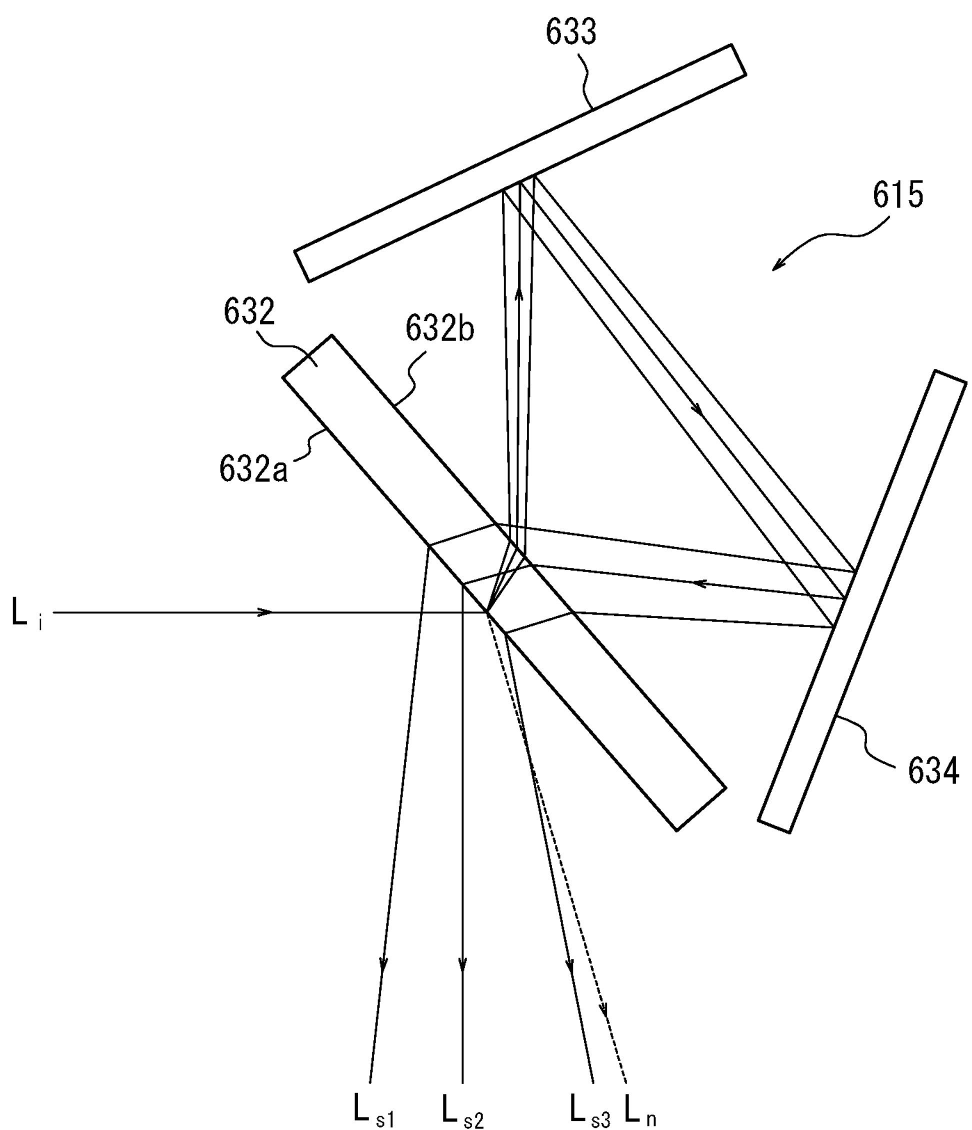
FIG. 24 is a top elevational view describing light paths of the normal light and the noise light in a dispersing portion in FIG. 23.

FIG. 24 is a top elevational view describing the light path of the normal light and the noise light in the dispersing portion 615 in FIG. 23. In this drawing, $L_i$ denotes the wavelength multiplexed input light, $L_{s1}$, $L_{s2}$ and $L_{s3}$ respectively denote the normal lights which are separated per wavelengths $\lambda_{s1}$, $\lambda_{s2}$ and $\lambda_{s3}$, and $L_n$ denotes the noise light. The input light $L_i$ enters into the dispersing element 632 at a predetermined angle. The dispersing element 632 is a diffraction grating in which a first surface 632*a* in an incident side of the input light $L_i$ is a diffraction grating surface, and a second surface 632*b* opposed to the first surface is an optical plane. The first surface 632*a* and the second surface 632*b* are not parallel therebetween.

The wavelength multiplexed input light $L_i$ which is input from the input port 610*a* of the input and output portion 610 is exposed to the m-order diffraction by the first surface 632*a* so as to transmit and be dispersed into the lights $L_{s1}$, $L_{s2}$, and $L_{s3}$ per wavelengths, and is reflected on the second surface 632*b* so as to transmit. The lights $L_{s1}$, $L_{s2}$, and $L_{s3}$ per wavelengths passing through the dispersing element 632 are reflected sequentially by the first mirror (the first reflection element) 633 and the second mirror (the second reflection element) 634. The lights per wavelengths reflected by the second mirror 634 enter into the second surface 632*b* of the dispersing element 632 so as to be reflected, and is further exposed to the -m-order diffraction by the first surface 632*a* so as to transmit. As mentioned above, in the present embodiment, the light exposed to the desired m-order and -m-order diffractions by the diffraction grating surface 632*a* of the dispersing element is called as the normal light.

On the other hand, when the wavelength multiplexed input light $L_i$ enters into the first surface 632*a* of the dispersing element 632 first time, the regularly reflected light comes to the noise light $L_n$ which is emitted from the dispersing portion 615 at a close angle to the normal light.

Figure 25:
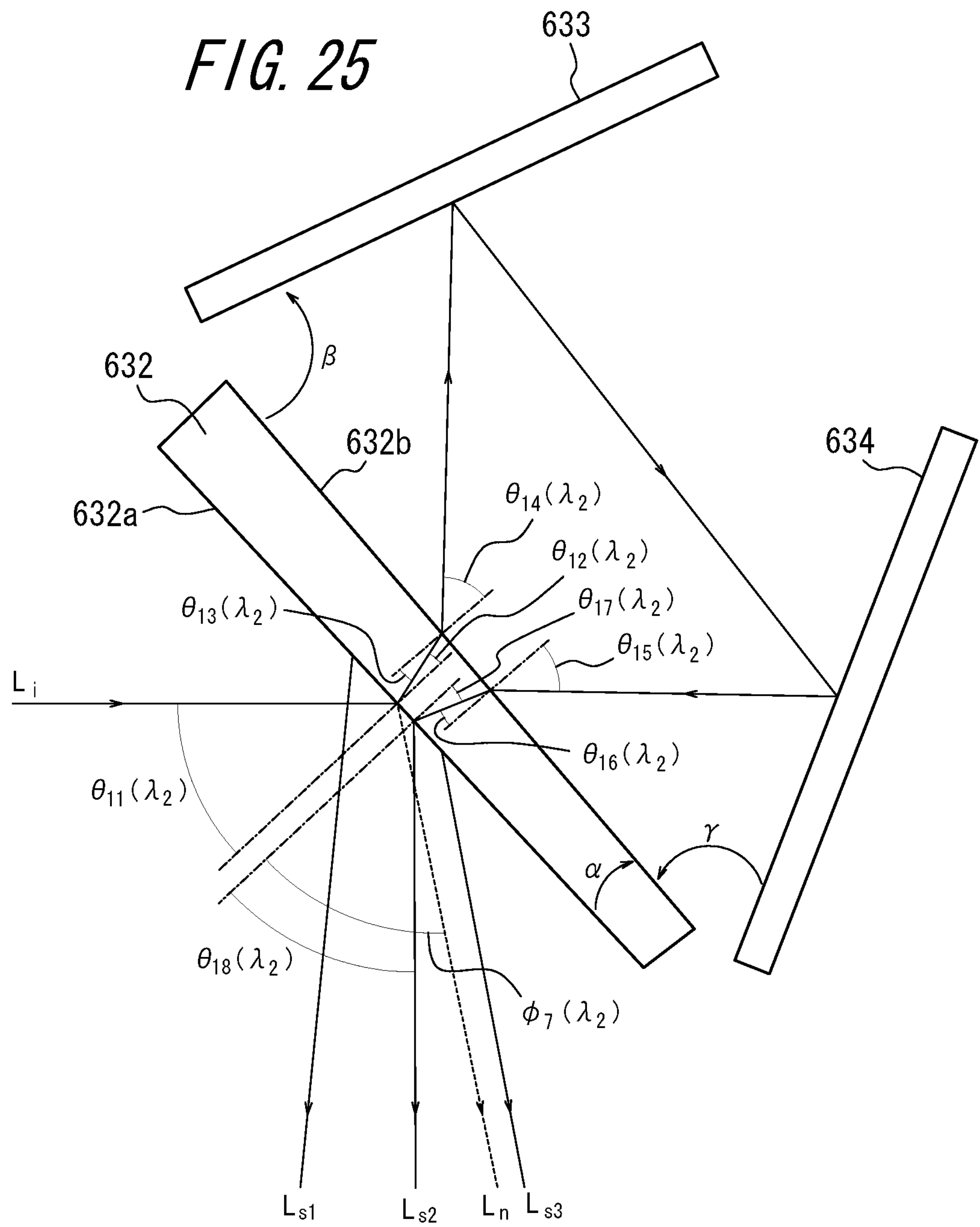
FIG. 25 is a view describing an angular relationship between the noise light generated in the dispersing portion in FIG. 23 and the normal light.
Figure 26:
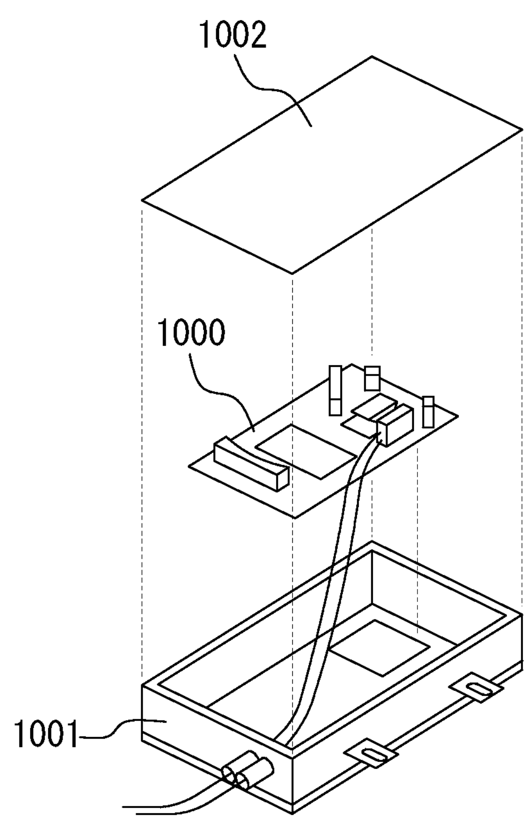
FIG. 26 is an exploded perspective view showing an outline structure of a conventional wavelength selecting switch.
Figure 27:
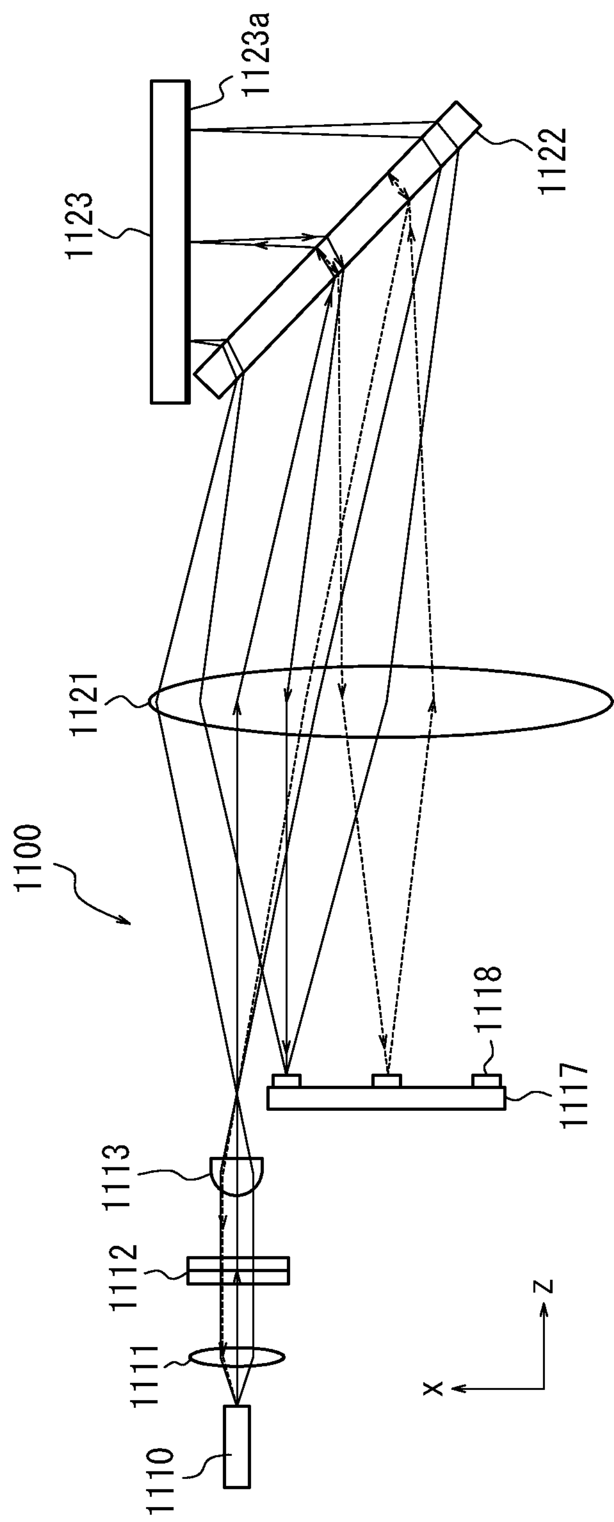
FIG. 27 is a view showing an outline structure of a wavelength selecting switch having a dispersing portion of Littman-Metcalf configuration.

FIG. 25 is a view describing an angle relationship between the noise light and the normal light which are generated in the dispersing portion in FIG. 23. The drawing shows a light path of the normal light $L_{s2}$ about a predetermined wavelength in the input light $L_i$. In FIG. 25, $\alpha$ is an angle between the first surface 632*a* and the second surface 632*b* of the wedge-shaped dispersing element 622, and is set to 4.42 degrees. $\beta$ is an angle between the mirror surface of the mirror 633 and the second surface 632*b* of the dispersing element 632, and $\gamma$ is an angle between the mirror surface of the mirror 634 and ht second surface 632*b* of the dispersing element 632. Further, $\theta_{11}$ and $\theta_{12}$ respectively denote an incident angle of the input light $L_i$ in relation to the first surface 632*a* of the dispersing element 632 and an emitting angle of the m-order transmission diffraction light of the input light $L_i$. $\theta_{13}$ and $\theta_{14}$ respectively denote an incident angle and an emitting angle of the normal light passing through the first surface 632*a* in relation to the second surface 632*b* of the dispersing element 632. $\theta_{15}$ and $\theta_{16}$ respectively denote an incident angle at which the normal lights sequentially reflected by the mirrors 633 and 634 after emitting from the dispersing element 632 enter into the second surface 632*b* of the dispersing element 632, and an emitting angle of the normal light which passes through the second surface 632*b*. $\theta_{17}$ and $\theta_{18}$ respectively denote an incident angle of the normal light which enters into the first surface 632*a* after passing through the second surface 632*b* of the dispersing element 632, and an emitting angle of the transmission diffraction light which is exposed to the -m-order diffraction by the first surface 632*a*. Further, $\phi_7$ denotes a reflection angle of the noise light $L_n$ obtained by the regular reflection of the input light $L_i$ by the first surface of the dispersing element 632.

The angles $\alpha$, $\beta$, $\gamma$, $\theta_{11}$ to $\theta_{18}$ and $\phi_7$ mentioned above satisfy the following relational expression.

$$n(\lambda)\sin\theta_{12}(\lambda) - \sin\theta_{11}(\lambda) = \frac{m_6\lambda}{d} \quad (18)$$

$$\theta_{13}(\lambda) = \theta_{12}(\lambda) - \alpha \quad (19)$$

$$\sin\theta_{14}(\lambda) = n(\lambda)\sin\theta_{13}(\lambda) \quad (20)$$

$$\theta_{15}(\lambda) = 2(\beta + y - 90) + \theta_{14}(\lambda) \quad (21)$$

$$n(\lambda)\sin\theta_{16}(\lambda) - \sin\theta_{15}(\lambda) \quad (22)$$

$$\theta_{17}(\lambda) = \theta_{16}(\lambda) + \alpha \quad (23)$$

$$n(\lambda)\sin\theta_{17}(\lambda) - \sin\theta_{18}(\lambda) = \frac{m_7\lambda}{d} \quad (24)$$

$$\sin\theta_{11}(\lambda) + \sin\theta_7(\lambda) = \frac{m_8\lambda}{d} \quad (25)$$

Here, $\lambda$ denotes a wavelength of the normal light, $n(\lambda)$ denotes a reflection factor of the member of the dispersing element, d denotes a grating constant of the diffraction grating, and $m_6$, $m_7$ and $m_8$ denote orders of diffraction, for example, −1, 1 and 0 respectively in the present embodiment. If the angles $\alpha$ (=4.42 degrees), $\beta$ and $\gamma$, and the incident angle $\theta_{11}$ of the input light $L_i$ are given, $\theta_{12}$ to $\theta_{18}$ and $\phi_7$ are sequentially defined by the expressions (18) to (25).

In order to prevent the noise light $L_n$ from entering into the deflecting element 618 into which the normal light $L_s$ enters, in the deflector 617, it is necessary for the emitting angle ranges of the normal light $L_s$ about the wavelengths $\lambda$ of all the wavelength multiplexed input lights to be prevented from lapping over the emitting angel ranges of the noise lights $L_n$ about all the wavelengths $\lambda$. In other words, in the case of setting the maximum value and the minimum value of the wavelength $\lambda$ of the input light $L_i$ to $\lambda_1$ and $\lambda_s$, and setting the emitting angles from the dispersing portion 61 of the normal light $L_s$ and the noise light $L_n$ which are diffracted by the desired order, about the wavelengths $\lambda$ of the input light to $\theta_o(\lambda)$ (=$\theta_{18}(\lambda)$) and $\phi_o(\lambda)$ (=$\phi_7(\lambda)$), respectively, the factors may satisfy the following expression (26).

$$\max_{\lambda_s\le\lambda\le\lambda_1}\phi_o(\lambda) < \min_{\lambda_s\le\lambda\le\lambda_1}\theta_o(\lambda) \text{ or } \max_{\lambda_s\le\lambda\le\lambda_1}\theta_o(\lambda) < \min_{\lambda_s\le\lambda\le\lambda_1}\phi_o(\lambda) \quad (26)$$

In relation to the parameters of the incident angle $\theta_{11}$ of the input light $L_i$, the angles $\alpha$ (=4.42 degrees), $\beta$ and $\gamma$, the refraction factor $n(\lambda)$ of the medium of the dispersing element 632, and the grating constant d of the diffraction grating, $\theta_o(\lambda)$(=$\theta_{18}$) and $\phi_o(\lambda)$(=$\phi_7$) can be calculated on the basis of the expressions (18) to (24). By appropriately setting these parameters, the expression (26) can be satisfied in relation to the maximum value $\lambda_1$ and the minimum value $\lambda_s$ of the desired wavelength of the wavelength selecting switch.

Further, as shown in FIG. 23, reflecting members 620*a* and 620*b* serving as a noise light inhibiting portion are provided at a position where the noise light $L_n$ generated by the dispersing portion 615 enters into an outer side where the deflecting element 618 is not arranged on the deflector 617. The reflecting members 620*a* and 620*b* have reflecting surfaces which reflect the noise light in a direction that the noise light does not enter into the output ports 610*b* to 610*e*, and inhibit the noise light $L_n$ from being emitted to the output port. The other structures and operations are the same as the eighth embodiment, and the same reference numerals are attached to the same constructing elements, and a description thereof will be omitted.

As described above, according to the present embodiment, even in the case that the dispersing portion 615 constructed by using the diffraction grating and two mirrors 633 and 634 is used as shown in FIGS. 23 and 25, the normal light $L_s$ diffracted at the desired order by the diffraction grating surface of the dispersing element 632 is prevented from lapping over the noise light $L_n$ diffracted at the different order or according to the different mode from the desired order, in the emitting angle range from the dispersing portion 615, in the same manner as the eighth embodiment. Therefore, the normal light and the noise light do not enter in an overlapping manner on the deflecting element 618 of the deflector 617. Accordingly, the noise light does not enter into any of the output ports 610*b* to 610*e*, and the ripple due to interference between the normal light and the noise light is not generated. Therefore, it is possible to prevent the transmission band characteristic caused by the undesired diffraction on the diffraction grating of the wavelength selecting switch from being deteriorated.

Further, since the portion where the deflecting element 618 is not arranged in the deflecting portion 617 is provided with the reflecting members 620*a* and 620*b* having the reflecting surfaces which reflect the noise light in the direction that the noise light does not enter into the output ports 610*b* to 610*e*, as the noise light inhibiting portion for inhibiting the noise light from emitting to the output port, it is possible to inhibit the noise light reflected by a part of the deflecting portion existing on approximately the same plane as the deflecting element 618 from entering into the output port as the stray light.

It is apparent for those skilled in the art that the present invention can be variously changed and replaced within the scope and the range of the present invention. Accordingly, the present invention should not be understood to be limited by the embodiments mentioned above, but can be variously modified and changed without deflecting from the scope of the claims.

For example, the optical systems shown in the first and fourth embodiments, the optical system shown in the second embodiment, and the optical system shown in the third embodiment respectively have the different structures, however, each of the optical systems is only one example, and does not restrict each of the structures of the light path compensating portions mentioned above. In other words, the structures of the light path compensating portions shown in the first and fourth embodiments can be applied to the optical system shown in the second or third embodiment. On the contrary, the structures of the light path compensating portions shown in the second and third embodiments can be applied to the optical systems shown in the first, fourth and fifth embodiments.

More specifically, in the arrangement of each of the members within the casing 118 in the first embodiment, the compensating plate 116 may be rotated by using the magnetic body 330 such as the third embodiment, in place of the driving of the compensating plate 116 by the actuator 117. Further, in the second embodiment, the reflection element 212*b* may be rotated by using the magnetic body 330 such as the third embodiment, in place of the driving of the rotation of the reflection element 212*b* by the actuator 217. Further, the optical fiber array may be constructed by a light guide. Further, the first, second and third converging elements 113*a*, 113*b* and 113*c* are not limited to the lenses, but can employ a converging mirror, a diffraction type converting element and the like as long as the converting elements achieve the converging action. Further, the reflection mirror for folding the light path may be arranged or not be arranged as occasion demands. Further, as long as the light flux input from the input port is constructed by the parallel light fluxes, the light fluxes may not be necessarily made in parallel by a collimate element such as the micro lens array.

In the seventh embodiment, the deflecting portion 550 may be supported by the support portion 571 in such a manner as to directly deflect the light which is wavelength dispersed by the dispersing portion 530 by the deflecting portion 550 by omitting the reflection prism 581. Further, the opening portion 571*b* formed in the support portion 571 may be formed as various hole shapes, or may be formed as a notched shape which is open in the top face plate 560*b* side or the bottom face plate 560*f* side of the casing 560. Further, the opening portion 571*b* may be formed by a transparent member such as glass in a whole of the support portion 571, as long as the opening portion transmits the input light and the output light.

Further, since the dispersing portion 530 and the converging lens 540 is comparatively larger in the project area of the part in comparison with the other optical parts, and the parts layout is restricted, at least the dispersing portion 530 and the converging lens 540 may be supported by the optical base plate 570 attached to the back face plate 560*e*, and the other optical parts may be supported by the other optical base plate, for example, attached to the bottom face plate **560*f***.

Further, the converging lens 540 may employ a converging mirror, or a diffraction type converging element as long as the converging action can be achieved. Further, in each of the embodiments, the micro lens array 520 may not be necessarily arranged. Further, the dispersing portion is not limited to the transmission type disperse element or the Littman-Metcalf configuration, but can employ a reflection type diffraction grating, Grism, a super prism and the like.

Further, in the eighth and ninth embodiments, the structure of the dispersing portion 615 is not limited to the exemplified structure, but can be applied to various dispersing portion structures.

Further, the input and output portion 610 is not limited to the portion having one input port, but can be structured such that a plurality of input ports are provided. Further, in place of the cylindrical lenses 612 and 613, one spherical convex lens may be arranged. Further, the ninth embodiment may be structured such that the cylindrical lenses 612 and 613 and the lens 631 are not provided, and the input light collimated by the micro lens of the micro lens array 611 is directly entered into the dispersing portion 615.

Further, in the eighth and ninth embodiment, the preferable angle between two non-parallel surfaces of the dispersing element 622 is set to 4.42 degrees, however, the effect of the present invention can be obtained at the other angles than this angle.

REFERENCE NUMERALS

100, 200, 300, 400 wavelength selecting switch
101, 201, 301 optical unit for wavelength selecting switch
109, 209, 309, 409 optical fiber array
110, 210, 310, 410 input and output port
**110*a*** input port
**110*b*** output port
111, 211, 311, 411 lens array
112, 412 dispersing portion
**113*a*, 213*a*, 313*a*** first converging element
**113*b*, 213*b*, 313*b*** second converging element
**113*c*, 213*c*, 313*c*** third converging element
114 mirror portion
115, 215, 315 deflecting portion
116, 316, 416 compensating plate
117, 217 actuator
118, 218, 318 casing
119, 219, 319 window
120, 220, 320 deflecting portion casing
121, 221 adjusting portion
122, 322 support body
123, 323 rotary shaft
124 elastic body
125 stopper
**212*a*** discharging element
**212*b*** reflection element
**212*c*** reflection element moving member
312 Grism
**314*a*** first mirror portion
**314*b*** second mirror portion
326 temperature compensating prism
327, 427 retaining portion
328, 428 magnet
330 elastic body
441 pressure sensitive adhesive sealing portion
442 ultraviolet light curable pressure sensitive adhesive
**442*a*** first liquid
**442*b*** second liquid
443 transparent window
444 magnet for pressure sensitive adhesive
445 magnetic bead
**510*a*** input port
**510*b*-510*e*** output port
530 dispersing portion
531 dispersing element
533 folding mirror
540 converging lens
541 primary converging lens
550 deflecting portion
**551*a*-551*e*** deflecting element
560 casing
**560*b*** top face plate
**560*c*, 560*d*** side face plate
**560*e*** back face plate
**560*f*** bottom face plate
561 support table
562 screw
563 sealant
565 screw
570 optical base plate
**570*a*, 570*b*, 570*c*, 570*d*, 570*e*** support surface
571 support portion
**571*a*** support surface
**571*b*** opening portion
580 folding mirror
581 reflection prism
601 wavelength selecting switch
610 input and output portion
**610*a*-610*e*** input and output port
611 micro lens array
612 cylindrical lens
613 cylindrical lens
614 lens
615 dispersing portion
616 lens
617 deflector
618 deflecting element
619 light absorbing body
**620*a*, 620*b*** reflecting member
621 converging lens
622 dispersing element
**622*d*** transmission type diffraction grating
**622*c*** wedge-shaped prism
**622*b*** adhesive bonding layer
**622*a*** first surface
**622*e*** second surface
623 mirror
631 lens
632 dispersing element
633 first mirror
634 second mirror
635 lens
**633*a*** reflecting surface
Y1, Y2 distance from optical axis
$L_i$ input light
$L_s$, $L_{s1}$, $L_{s2}$, $L_{s3}$ normal light
$L_n$, $L_{n1}$, $L_{n2}$ noise light
Sf primary converging surface
Sm deflecting element surface

The invention claimed is:

1. A wavelength selecting switch comprising:
at least one input port for emitting an input light;
a lens array for converting light from the at least one input port into parallel lights;

a dispersing portion which disperses the input light into a plurality of wavelengths;

a converging element which receives the plurality of wavelengths dispersed in a wavelength dispersion direction, and which converges each wavelength dispersed by the dispersing portion;

a deflecting portion which independently deflects each wavelength converged by the converging element;

a plurality of output ports which outputs the light deflected by the deflecting portion as one or more output lights;

an optical bench including a support surface, which supports at least the dispersing portion and the converging element; and a casing which accommodates and retains the optical bench, and which includes first and second orthogonal faceplates;

wherein the optical bench is attached to the first faceplate, whereby the support surface is orthogonal to a surface of the second faceplate, which has the greatest project area of the casing.

2. The wavelength selecting switch according to claim 1, wherein the at least one input port and the output ports are arranged linearly, wherein the deflecting portion is supported by a support portion which protrudes out of the support surface of the optical bench among the input port, the output port and the converging element, and wherein a light transmission portion transmitting the input light and the output light between the input and output ports and the converging element is formed in the support portion.

3. The wavelength selecting switch according to claim 2, further comprising a primary converging lens forming a primary converging point, the primary converging lens being arranged among the input port, the output port and the converging element, wherein the support portion is arranged whereby the light transmitting portion is positioned at the primary converging point or in the vicinity thereof, and wherein the dispersing portion, the converging element and the deflecting portion are arranged whereby the input light from the input port is dispersed by the dispersing portion through the primary converging lens and the converging element, and the dispersed light is deflected by the deflecting portion through the converging element, and is output as the output light from the output port through the dispersing portion and the converging element.

4. The wavelength selecting switch according to claim 1, wherein the support surface is orthogonal to the wavelength dispersion direction.

5. The wavelength selecting switch according to claim 1, wherein the converging element comprises an optical lens including an optical axis; and wherein the optical axis of the optical lens is parallel to the support surface.

6. The wavelength selecting switch according to claim 1, wherein the deflecting portion extends from the support surface, and comprises a plurality of deflecting elements arranged linearly in an arranging direction, which is parallel to the second faceplate.

7. The wavelength selecting switch according to claim 6, further comprising a a reflection prism for reflecting the wavelengths from the converging element to the deflecting elements orthogonal to the first faceplate; wherein the reflection prism extends vertically from the support surface.

8. The wavelength selecting switch according to claim 1, wherein the input and output ports are mounted on the support surface, and are arranged linearly in a direction parallel to the support surface.

9. The wavelength selecting switch according to claim 1, wherein the support surface comprises:

a first support surface supporting the converging element;

a second support surface supporting the dispersing portion; and a third support surface at an incline to the first support surface supporting each input port and each output port.

10. The wavelength selecting switch according to claim 9, further comprising a folding mirror for reflecting the wavelengths from the converging element to the deflecting elements orthogonal to the first faceplate.

* * * * *